(12) United States Patent
Sasada et al.

(10) Patent No.: US 6,548,126 B1
(45) Date of Patent: Apr. 15, 2003

(54) 2,3-DIFLUOROPHENYL DERIVATIVE HAVING NEGATIVE DIELECTRIC ANISOTROPY, LIQUID CRYSTAL COMPOSITION, AND LIQUID CRYSTAL DISPLAY DEVICE

(75) Inventors: Yasuyuki Sasada, Tokyo (JP); Shuichi Matsui, Chiba (JP); Hiroyuki Takeuchi, Chiba (JP); Yasuhiro Kubo, Chiba (JP); Etsuo Nakagawa, Chiba (JP)

(73) Assignee: Chisso Corporation, Osaka (JP)

( * ) Notice: Subject to any disclaimer, the term of this patent is extended or adjusted under 35 U.S.C. 154(b) by 95 days.

(21) Appl. No.: 09/635,846

(22) Filed: Aug. 11, 2000

(30) Foreign Application Priority Data

Aug. 31, 1999 (JP) .............................. 11-245891

(51) Int. Cl.$^7$ ...................... C09K 19/30; C09K 19/34; C07C 25/13
(52) U.S. Cl. .............. 428/1.1; 252/299.61; 252/299.63; 570/127; 570/129
(58) Field of Search ...................... 428/1.1; 252/299.61, 252/299.63, 299.01; 570/127, 129

(56) References Cited

U.S. PATENT DOCUMENTS 6,190,576 B1 * 2/2001 Andou et al. .......... 252/299.63
6,395,353 B2 * 5/2002 Yanai et al. .................. 428/1.1

FOREIGN PATENT DOCUMENTS

| EP | 0916639 | 5/1999 |
|---|---|---|
| EP | 0982388 A1 | 3/2000 |
| JP | 5-112778 | 5/1993 |
| JP | 10-237075 | 9/1998 |

* cited by examiner

*Primary Examiner*—Shean C. Wu
(74) *Attorney, Agent, or Firm*—Wenderoth, Lind & Ponack, L.L.P.

(57) ABSTRACT

The invention is to provide liquid crystalline compounds having a negative and extremely large dielectric anisotropy value and a small optical anisotropy value at the same time; liquid crystal compositions comprising the compound; and liquid crystal display devices fabricated by using the liquid crystal composition; the liquid crystalline compounds have 2,3-dihalogenophenylene moiety and are expressed by formula (1)

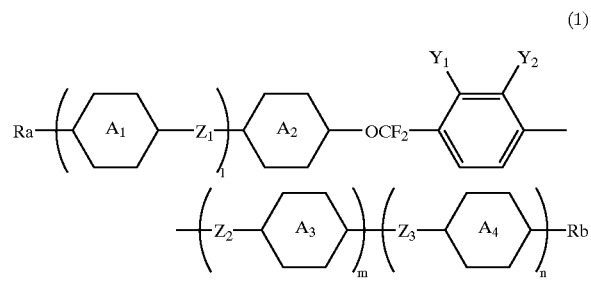

(1)

wherein Ra and Rb each independently represents a linear or branched alkyl having 1 to 10 carbon, any methylene in the alkyl may be replaced by —O—, —S—, —CH=CH—, or —C≡C—, but —O— is not successive, and any hydrogen in the alkyl may be replaced by halogen; rings $A_1$ to $A_4$ each independently represents trans-1,4-cyclohexylene, cyclohexene-1,4-diyl, pyridine-1,4-diyl, pyrimidine-2,5-diyl, or 1,4-phenylene, wherein at least one hydrogen in these rings may be replaced by halogen, and any nonadjacent methylene in cyclohexane ring may be replaced by —O—; $Y_1$ and $Y_2$ each independently represents F or Cl; $Z_1$, $Z_2$ and $Z_3$ each independently represents a single bond, —CH$_2$CH$_2$—, —(CH$_2$)$_4$—, —COO—, —OCO—, —CH$_2$O—, —OCH$_2$—, —CF$_2$O—, or —OCF$_2$—; and l, m and n each independently is 0, 1 or 2, and the sum of l+m+n is 3 and less.

22 Claims, No Drawings

2,3-DIFLUOROPHENYL DERIVATIVE HAVING NEGATIVE DIELECTRIC ANISOTROPY, LIQUID CRYSTAL COMPOSITION, AND LIQUID CRYSTAL DISPLAY DEVICE

TECHNICAL FIELD

This invention relates to new liquid crystalline compounds and liquid crystal compositions. More specifically, this invention relates to the liquid crystalline compounds having difluoromethyleneoxy moiety, liquid crystal compositions comprising the compounds, and liquid crystal display devices fabricated by using the liquid crystal composition.

BACKGROUND ART

Liquid crystal display devices fabricated by using liquid crystalline compounds (the term "liquid crystalline compounds" is used in this specification as a generic term for the compounds which have a liquid crystal phase and the compounds which do not have a crystal phase but are useful as a component of liquid crystal compositions) have widely been used for the display of computers, television sets, and the like.

For the purpose of reducing electric power consumption and decreasing the leakage of an electromagnetic wave, the liquid crystal compositions are required to lower their driving voltage. The driving voltage (threshold voltage) is known to be a function of a dielectric anisotropy value and an elastic constant as is shown in the following equation (M. F. Leslie, Mol. Cryst. Liq. Cryst., 12, 57 (1970)):

$$V_{th} = \pi (K/\epsilon_0 \Delta\epsilon)^{1/2}$$

wherein Vth is threshold voltage, $\epsilon_0$ is a dielectric constant in vacuum, K is an elastic constant, and $\Delta\epsilon$ is dielectric anisotropy.

That is, in order to lower the driving voltage, it is required 1) to increase the dielectric anisotropy value, and 2) to decrease the elastic constant. It is generally difficult to adjust the elastic constant value of the liquid crystalline compounds, and a method of enlarging the dielectric anisotropy value is principally employed for lowering the driving voltage. Accordingly, new liquid crystalline compounds having a large value of dielectric anisotropy have been expected.

From some time ago, a most serious problem on the liquid crystal display devices is a narrow viewing angle, and various display modes have been proposed in recent years for the purpose of improving it. In-plane switching (IPS) display devices proposed in 1995 greatly widened the viewing angle compared with conventional display devices (Liquid Crystal Conference in Japan 2A07 (1995), ASIA DISPLAY '95, 557(1995), and ASIA DISPLAY '95, 707 (1995)). The characteristic of this mode is that various liquid crystal compositions can be utilized regardless of positive or negative in the dielectric anisotropy value.

In 1997, an attempt utilizing a vertical alignment (VA) cell was reported (SID 97 DIGEST, 845 (1997) and the display devices of this mode has also considerably wide viewing angle compared with conventional display devices. The characteristic of this mode is that the liquid crystal compositions having a negative dielectric anisotropy value can be utilized.

As a compound having a negative and large dielectric anisotropy value and a comparatively small optical anisotropy value, compound (13) in the following has been known (V. Reiffenrath et al., Liq. Cryst., 5 (1), 159 (1989)). It is reported that the dielectric anisotropy value ($\Delta\epsilon$) of this compound is -4.1 and the optical anisotropy value ($\Delta n$) is 0.18.

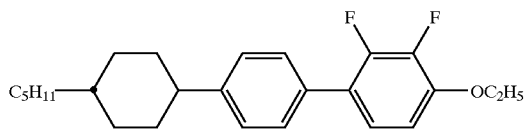

(13)

Whereas compound (13) has a large dielectric anisotropy value, an optical anisotropy value is large. Then, it could not satisfy the values required for IPS mode or VA mode.

According to Maier and Meier, a dielectric anisotropy value and an optical anisotropy value are regarded as a function of the order parameters (W. Maier and G. Meier, Z. Naturf. (a), 16, 262 (1961)). Namely, it is possible to decrease the optical anisotropy value by the decrease of the order parameters. As the optical anisotropy value and the dielectric anisotropy value are generally proportional in a single liquid crystal molecule, decreasing the optical anisotropy value will cause a decrease of the dielectric anisotropy value. Therefore, a new compound having a unique property which decreases only the optical anisotropy value without a large decrease of the dielectric anisotropy value has been expected.

Compound (14) having cyano has also been known as a compound having a small optical anisotropy value (R. Eidenschink et al., Angew. Chem., 96, 151 (1984)). It has both a large dielectric anisotropy value and a small optical anisotropy value. However, the liquid crystal compositions containing the compound for IPS mode and VA mode have considerably low contrast, as specific resistance is small and temperature dependence of a voltage holding ratio is very large. Thus, such compound is unsuitable as liquid crystalline compound in the use of the liquid crystal composition for IPS mode or VA mode.

(14)

DISCLOSURE OF INVENTION

In view of the several characteristics required for the liquid crystal compositions described above, the object of this invention is to provide liquid crystalline compounds having a negative and extremely large dielectric anisotropy value and a small optical anisotropy value at the same time, to provide liquid crystal compositions comprising the compound, and to provide liquid crystal display devices fabricated by using the liquid crystal composition.

As a result in the diligent research and development of the present inventors to solve the subject described above, they found that the compounds with two rings, three rings or four rings, having both a moiety in which two rings are bridged by —$CF_2O$— bonding group and a moiety of 2,3-difluoro-1,4-phenylene at the same time, have not only a negative and large dielectric anisotropy value but also are excellent in miscibility with other compounds, have high specific resistance and a high voltage holding ratio, and are stable physically and chemically, and then they completed this invention.

SUMMARY OF INVENTION

Namely, this invention contains items [1] to [22].

[1] A liquid crystalline compound expressed by formula (1)

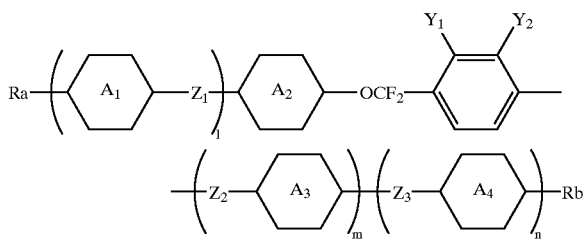

(1)

wherein Ra and Rb each independently represents a linear or branched alkyl having 1 to 10 carbon, any methylene in the alkyl may be replaced by —O—, —S—, —CH=CH—, or —C≡C—, but —O— is not successive, and any hydrogen in the alkyl may be replaced by halogen; rings $A_1$ to $A_4$ each independently represents trans-1,4-cyclohexylene, cyclohexene-1,4-diyl, pyridine-1,4-diyl, pyrimidine-2,5-diyl, or 1,4-phenylene, wherein at least one hydrogen in these rings may be replaced by halogen, and any nonadjacent methylene in cyclohexane ring may be replaced by —O—; $Y_1$ and $Y_2$ each independently represents F or Cl; $Z_1$, $Z_2$ and $Z_3$ each independently represents a single bond, —$CH_2CH_2$—, —$(CH_2)_4$—, —COO—, —OCO—, —$CH_2O$—, —$OCH_2$—, —$CF_2O$—, or —$OCF_2$—; and l, m and n each independently is 0, 1 or 2, and the sum of l+m+n is 3 and less.

[2] A liquid crystalline compound described in item [1], wherein in formula (1), $Y_1$ and $Y_2$ are fluorine.

[3] A liquid crystalline compound described in item [1], wherein in formula (1), $Y_1$ and $Y_2$ are fluorine and ring $A_2$ is trans-1,4-cyclohexylene.

[4] A liquid crystalline compound described in item [1], wherein in formula (1), $Y_1$ and $Y_2$ are fluorine and ring $A_2$ is cyclohexene-1,4-diyl.

[5] A liquid crystalline compound described in item [1], wherein in formula (1), $Y_1$ and $Y_2$ are fluorine and ring $A_2$ is 1,4-phenylene in which hydrogen in the ring may be replaced by fluorine.

[6] A liquid crystalline compound described in item [1], wherein, in formula (1), l=1, m=n=0, ring $A_1$ and ring $A_2$ are trans-1,4-cyclohexylene, $Z_1$ is a single bond, and $Y_1$ and $Y_2$ are fluorine.

[7] A liquid crystalline compound described in item [1], wherein in formula (1), l=1, m=n=0, ring $A_1$ is trans-1,4-cyclohexylene, and ring $A_2$ is cyclohexene-1,4-diyl, $Z_1$ is a single bond, and $Y_1$ and $Y_2$ are fluorine.

[8] A liquid crystalline compound described in item [1], wherein in formula (1), l=1, m=n=0, ring $A_1$ is trans-1,4-cyclohexylene, ring $A_2$ is 1,4-phenylene in which hydrogen in the ring may be replaced by fluorine, $Z_1$ is a single bond, and $Y_1$ and $Y_2$ are fluorine.

[9] A liquid crystalline compound described in item [1], wherein in formula (1), l=n=0, m=1, ring $A_2$ is trans-1,4-cyclohexylene, $A_3$ is 1,4-phenylene in which hydrogen in the ring may be replaced by fluorine, $Z_2$ is a single bond, and $Y_1$ and $Y_2$ are fluorine.

[10] A liquid crystalline compound described in item [1] wherein in formula (1), l=n=0, m=1, ring $A_2$ is cyclohexene-1,4-diyl, ring $A_3$ is 1,4-phenylene in which hydrogen in the ring may be replaced by fluorine, $Z_2$ is a single bond, and $Y_1$ and $Y_2$ are fluorine.

[11] A liquid crystalline compound described in item [1], wherein in formula (1), l=m=1, n=0, and $Y_1$ and $Y_2$ are fluorine.

[12] A liquid crystalline compound described in item [1] wherein in formula (1), l=2, m=n=0, and $Y_1$ and $Y_2$ are fluorine.

[13] A liquid crystal composition characterized in that it comprises at least one of the liquid crystalline compounds described in any one of items [1] to [12].

[14] A liquid crystal composition characterized in that it comprises, as a first component, at least one liquid crystalline compound described in any one of items [1] to [12], and comprises, as a second component, at least one compound selected from the group of compounds consisting of formulae (2), (3) and (4).

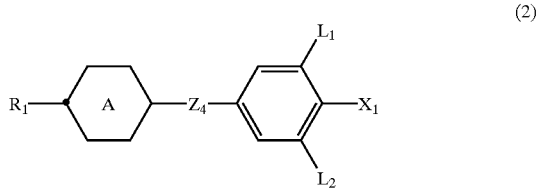

(2)

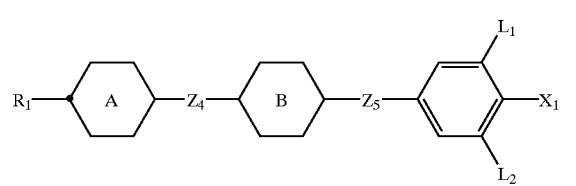

(3)

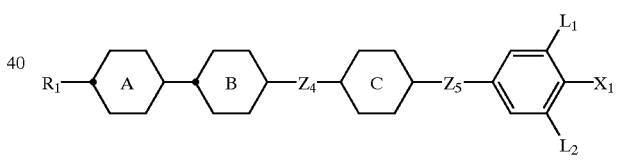

(4)

wherein $R_1$ represents alkyl having 1 to 10 carbon, any nonadjacent —$CH_2$— in the alkyl may be replaced by —O— or —CH=CH—, and any hydrogen in the alkyl may be replaced by fluorine; $X_1$ represents fluorine, chlorine, —$OCF_3$, —$OCF_2H$, —$CF_3$, —$CF_2H$, —$CFH_2$, —$OCF_2CF_2H$ or —$OCF_2CFHCF_3$; $L_1$ and $L_2$ each independently represents hydrogen or fluorine; $Z_4$ and $Z_5$ each independently represents —$(CH_2)_2$—, —$(CH_2)_4$—, —COO—, —$CF_2O$—, —$OCF_2$—, —CH=CH— or a single bond; ring A and ring B each independently represents trans-1,4-cyclohexylene, 1,3-dioxane-2,5-diyl or 1,4-phenylene in which hydrogen may be replaced by fluorine, ring C represents trans-1,4-cyclohexylene or 1,4-phenylene in which hydrogen may be replaced by fluorine.

[15] A liquid crystal composition characterized in that it comprises, as a first component, at least one liquid crystalline compound described in any one of items [1] to [12], and as a second component, at least one compound selected from the group of compounds consisting of formulae (5) and (6).

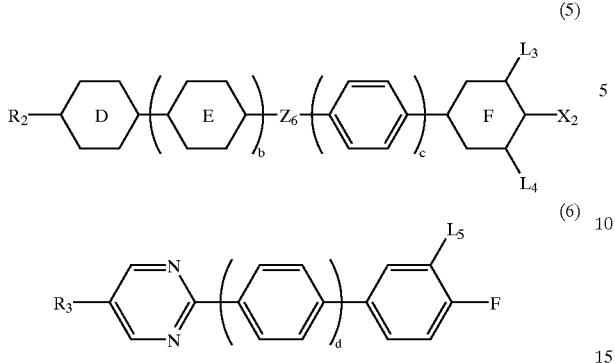

(5)

(6)

wherein $R_2$ and $R_3$ each independently represents alkyl having 1 to 10 carbon, any nonadjacent —$CH_2$— in the alkyl may be replaced by —O— or —CH=CH—, and any hydrogen in the alkyl may be replaced by fluorine; $X_2$ represents —CN or —C≡C—CN; ring D represents trans-1,4-cyclohexylene, 1,4-phenylene, 1,3-dioxane-2,5-diyl, or pyrimidine-2,5-diyl; ring E represents trans-1,4-cyclohexylene, 1,4-phenylene in which hydrogen may be replaced by fluorine, or pyrimidine-2,5-diyl; ring F represents trans-1,4-cyclohexylene or 1,4-phenylene; $Z_6$ represents —($CH_2$)$_2$—, —COO—, —$CF_2$O—, —$OCF_2$— or a single bond; $L_3$, $L_4$ and $L_5$ each independently represents hydrogen or fluorine; b, c and d each independently 0 or 1.

[16] A liquid crystal composition characterized in that it comprises, as a first component, at least one liquid crystalline compound described in any one of items [1] to [12], and as a second component, at least one compound selected from the group of compounds consisting of formulae (7), (8) and (9).

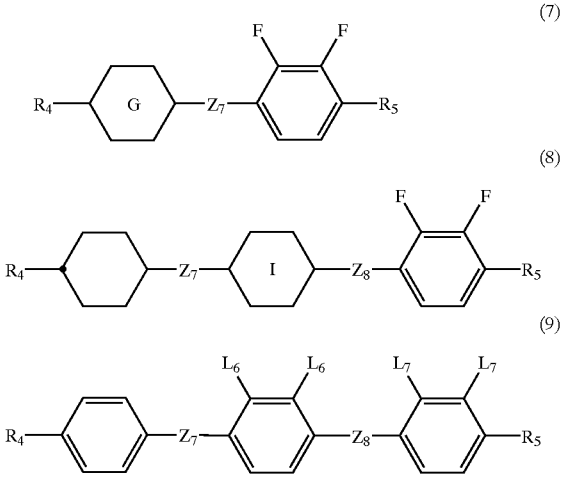

(7)

(8)

(9)

wherein $R_4$ and $R_4$ each independently represents alkyl having 1 to 10 carbon, any nonadjacent —$CH_2$— in the alkyl may be replaced by —O— or —CH=CH—, and any hydrogen in the alkyl may be replaced by fluorine; ring G and ring I each independently represents trans-4-cyclohexylene or 1,4-phenylene; $L_6$ and $L_7$ each independently represents hydrogen or fluorine but both of them are not hydrogen at the same time; $Z_7$ and $Z_8$ each independently represents —($CH_2$)$_2$—, —COO— or a single bond.

[17] A liquid crystal composition characterized in that it comprises, as a first component, at least one liquid crystalline compound described in any one of items [1] to [12], and as a second component, at least one compound selected from the group of compounds consisting of formulae (2), (3) and (4) as described above, and as a third component, at least one compound selected from the group of compounds consisting of formulae (10), (11) and (12).

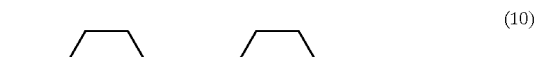

(10)

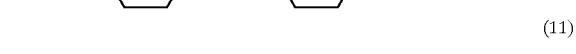

(11)

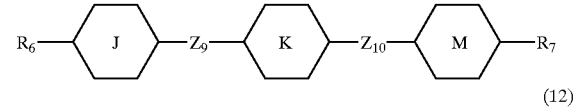

(12)

wherein $R_6$ and $R_7$ each independently represents alkyl having 1 to 10 carbon, any nonadjacent —$CH_2$— in the alkyl may be replaced by —O— or —CH=CH—, and any hydrogen in the alkyl may be replaced by fluorine; ring J, ring K and ring M each independently represents trans-1,4-cyclohexylene, pyrimidine-2,5-diyl, or 1,4-phenylene in which hydrogen may be replaced by fluorine; $Z_9$ and $Z_{10}$ each independently represents —C≡C—, —COO—, —($CH_2$)$_2$-, —CH=CH— or a single bond.

[18] A liquid crystal composition characterized in that it comprises, as a first component, at least one liquid crystalline compound described in any one of items [1] to [12], and as a second component, at least one compound selected from the group of compounds consisting of formulae (7), (8) and (9) as described above, and as a third component, at least one compound selected from the group of compounds consisting of formulae (10), (11) and (12) as described above.

[19] A liquid crystal composition characterized in that it comprises, as a first component, at least one compound described in any one of items [1] to [12], and as a second component, at least one compound selected from the group of compounds consisting of formulae (2), (3) and (4) as described above, and as a third component, at least one compound selected from the group of compounds consisting of formulae (7), (8) and (9) as described above.

[20] A liquid crystal composition characterized in that it comprises, as a first component, at least one compound described in any one of items [1] to [12], and as a second component, at least one compound selected from the group of compounds consisting of formulae (2), (3) and (4) as described above, and as a third component, at least one compound selected from the group of compounds consisting of formulae (5) and (6) as described above, and as a fourth component, at least one compound selected from the group of compounds consisting of formulae (7), (8) and (9) as described above.

[21] A liquid crystal composition characterized in that it further comprises one or more optically active compound in addition to the liquid crystal composition described in any one of items [13] to [20].

[22] A liquid crystal display device fabricated by using the liquid crystal composition described in any one of items [13] to [21].

DETAILED DESCRIPTION

In the liquid crystalline compounds expressed by formula (1), the following compounds expressed by formulae (1-1) to (1-6) have especially suitable characteristics.

In these formulae, Ra, Rb, rings $A_1$, $A_2$, $A_3$, and $A_4$ have the same meaning as described above.

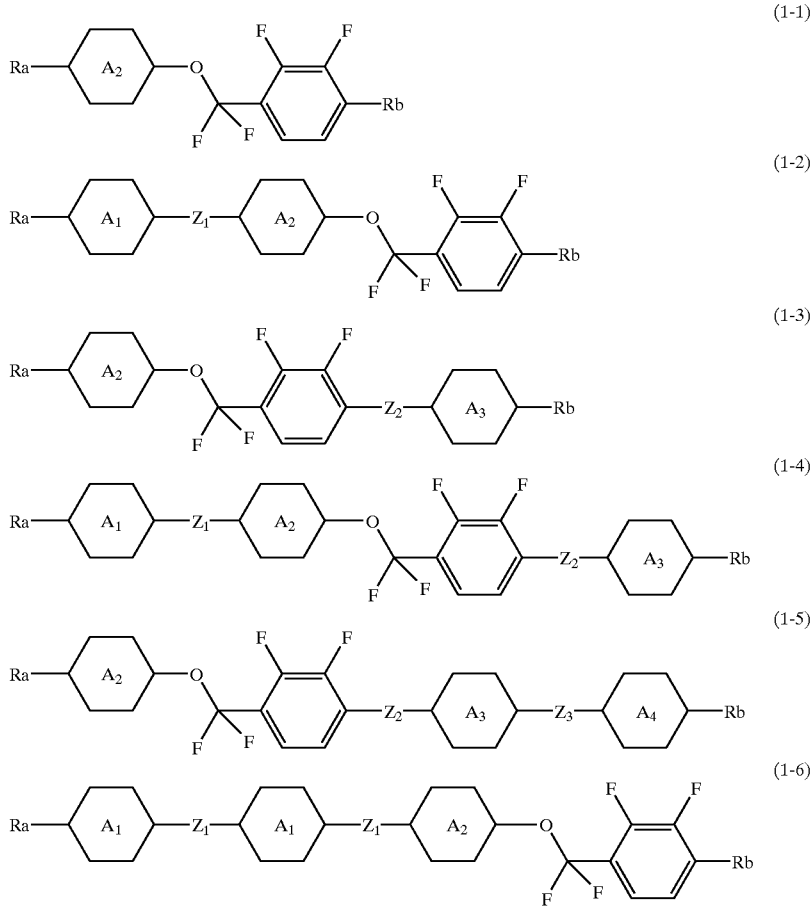

In formula (1), Ra and Rb are preferably alkyl, alkoxy, alkoxyalkyl, alkoxyalkoxy, alkenyl, alkynyl, alkenyloxy, halogen-substituted alkyl, halogen-substituted alkenyl, halogen-substituted alkenyloxy, halogen-substituted alkoxy, halogen-substituted alkynyl and the like. Compounds having alkyl, alkoxy, alkoxyalkyl, alkoxyalkoxy, halogen-substituted alkyl or halogen-substituted alkoxy as Ra and Rb, are chemically stable, while compounds having alkenyl or alkynyl as Ra and Rb, have fairly large optical anisotropy.

Compounds having, alkyl, alkoxy or alkenyl as Ra and Rb are preferable due to their low viscosity. In the use for display devices of IPS mode or VA mode, compounds having alkyl or alkoxy as Rb are most preferable because high chemical stability and a large dielectric anisotropy value are required.

In formula (1), $Z_1$, $Z_2$ and $Z_3$ are preferably a single bond, —$CH_2CH_2$—, —$CH_2$—, —$OCH_2$—, —$(CH_2)_4$—, —COO—, —OCO—, —$CF_2O$— or —$OCF_2$—. When $Z_1$, $Z_2$ and $Z_3$ each independently is a single bond, such compounds have a nematic phase over the wide range of temperature together with low viscosity.

$Y_1$ and $Y_2$ represent fluorine or chlorine, and fluorine is more preferable because such compounds have larger negative dielectric anisotropy. Especially when both $Y_1$ and $Y_2$ are fluorine, such compounds have the largest negative dielectric anisotropy value.

Rings $A_1$, $A_2$, $A_3$, and $A_4$ each independently is preferably trans-1,4-cyclohexylene, 1,3-dioxane-2,5-diyl, tetrahydropyrane-2,5-diyl, 1,4-phenylene, or fluorine-substituted 1,4-phenylene, pyridazine-3,6-diyl, pyridine-2, 5-diyl, or pyrimidine-2,5-diyl, and 1,4-cyclohexylene is most preferable to obtain compounds with low viscosity. Compounds which ring $A_1$, $A_2$ or $A_3$ is 1,3-dioxane-2,5-diyl are preferable because they have has a small elastic constant value (K) and they lower driving voltage in the liquid crystal display devices with TN mode including IPS mode and VA mode. Compounds which ring $A_1$, $A_2$, $A_3$ or $A_4$ is fluorine-substituted 1,4-phenylene, pyridazine-3,6-diyl, pyridine-2, 5-diyl, or pyrimidine-2,5-diyl have a larger dielectric anisotropy value.

The compounds expressed by formula (1) of this invention can be produced by the suitable combination of known procedures of organic synthetic chemistry. The known procedures of organic chemistry can be found by referring to books such as Organic Synthesis, Organic Reactions, and Shin-Jikken Kagaku Kouza (Course of New Chemical Experiment). Their typical examples are shown below.

Compound (3) of formula (1) having ester as a bonding group can be synthesized by reacting various phenol or alcohol (2) with carboxylic acid derivative (1) which can be produced by a known method in the literature, and by carrying out a dehydrating condensation. The dehydrating condensation can be preferably conducted by a known dehydrating agent (for example, dicyclohexylcarbodiimide etc.). It can also be preferably produced by leading carboxylic acid (1) into acid anhydride followed by reacting with phenol or alcohol (2) under the basic conditions.

The ester derivative (3) can be derived to compound (4) by a known sulfurizing agent such as Lawesson's reagent. Compound (5) of formula (1) in which a bonding group is $OCF_2$ can be synthesized by fluorinating thiocarbonyl of compound (4) by a fluorinating reagent such as hydrogen fluoride-pyridine (M.Kuroboshi et al., Chem. Lett., 827, 1992) or diethylaminosulphur trifluoride (William H. Bunnelle et al., J. Org. Chem., 1990, 55, 768).

Compound (8) in which ring $A_2$ is 1-cyclohexene-1,4-diyl and a bonding group is ester in formula (1) can be synthesized by deriving carboxylic acid derivative (1) which can be produced by a known procedure in the literature, into its acid chloride (6) and by reacting with trimethylsilyl enol ether (7) in the presence of mercury chloride (II) (Kenneth J. Shea et al., J. Am. Chem. Soc. 1987, 109, 447).

The ester derivative (8) can be derived to compound (9) by use of a known sulfurizing agent such as Lawesson's reagent. Compound (10) in which a bonding group is $OCF_2$ in formula (1) can be synthesized by fluorinating thiocarbonyl of compound (9) using a fluorinating agent.

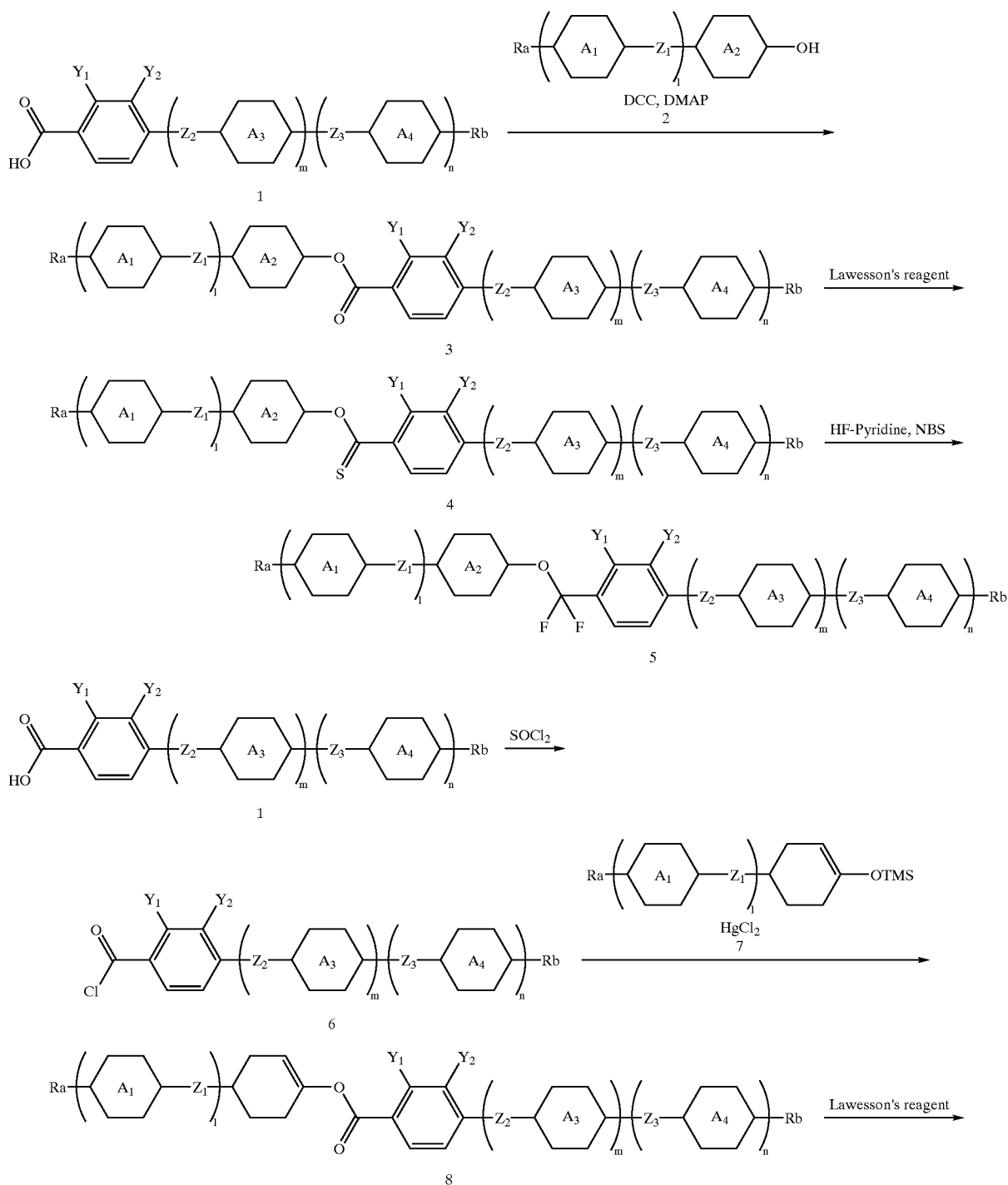

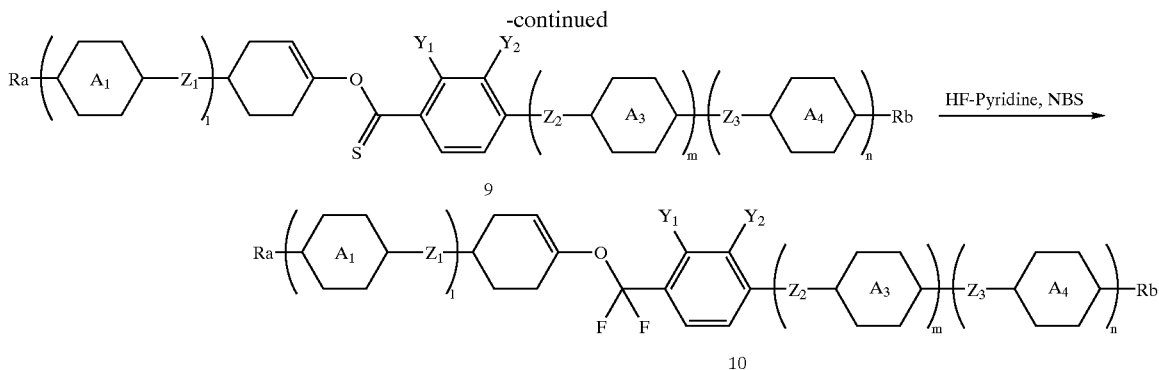

The introduction of 1,3-dioxane-2,5-diyl to the moiety of rings $A_1$, $A_2$, $A_3$ and $A_4$ can be conducted according to the method of H. M. Vorbrodt or R. Eidenschink (H. M. Vorbrodt, J. Prakt. Chem., 323, 902 (1981); R. Eidenschink, DE—OS-3306960 (1983)).

As the liquid crystalline compounds of this invention thus obtained have a large negative dielectric anisotropy value, low voltage driving of the liquid crystal display devices can be realized.

The liquid crystalline compounds are superior as a component of nematic liquid crystal compositions, as they are sufficiently stable physically and chemically under the conditions where the liquid crystal display devices are ordinarily used, they can be readily mixed with various liquid crystal materials, and they have excellent miscibility even at low temperatures.

As these compounds have a large negative dielectric anisotropy value together with relatively a small optical anisotropy value, they can most preferably be used as a component of the liquid crystal compositions for IPS mode and VA mode.

Followings are an explanation of the liquid crystal composition of this invention. The liquid crystal composition provided by this invention may contain only a first component comprising at least one compound expressed by formula (1). In addition to the first component, it is preferable to mix, as a second component, at least one compound (hereafter defined as a second component A) selected from the group of compounds expressed by above-mentioned formulae (2), (3) and (4) and/or at least one compound (hereafter defined as a second component B) selected from the group of compounds expressed by formulae (5) and (6). Further, in order to adjust threshold voltage, a temperature range of a liquid crystal phase, an optical anisotropy value, a dielectric anisotropy value, and viscosity, at least one compound selected from the group of compounds expressed by formulae (10), (11) and (12) can be mixed as a third component. Each component of the liquid crystal composition used in this invention may be a relative compound containing corresponding isotope elements, as there is no significant difference in their physical properties.

Among the second component A, (2-1) to (2-9) for the preferable examples of compounds expressed by formula (2), (3-1) to (3-94) for the preferable examples of compounds expressed by formula (3), and (4-1) to (4-33) for the preferable examples of compounds expressed by formula (4) can be illustrated, respectively.

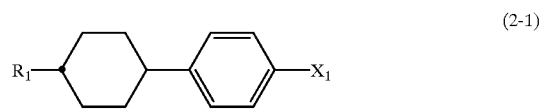
(2-1)

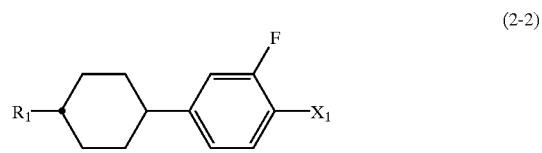
(2-2)

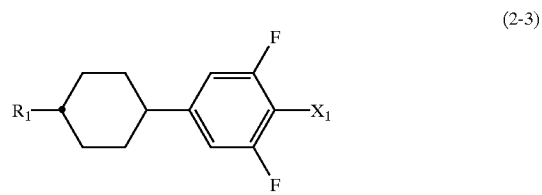
(2-3)

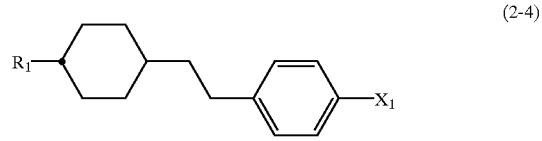
(2-4)

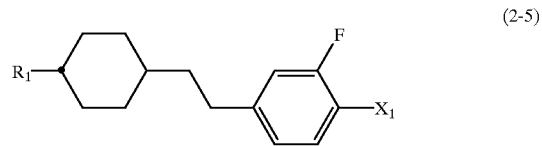
(2-5)

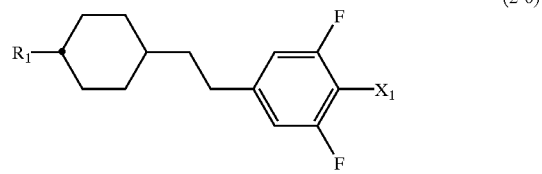
(2-6)

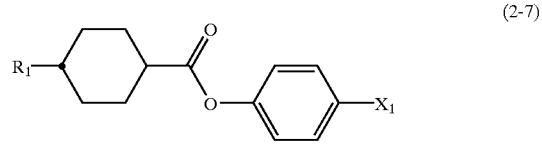
(2-7)

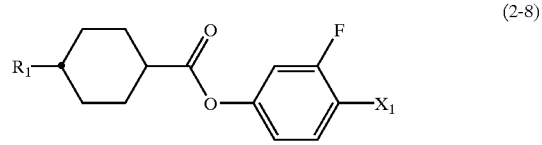
(2-8)

(2-9) 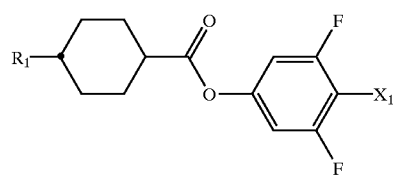
(3-1) 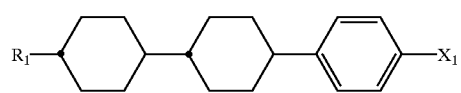
(3-2) 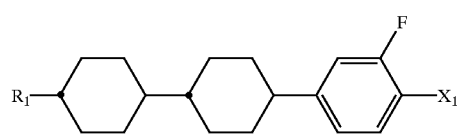
(3-3) 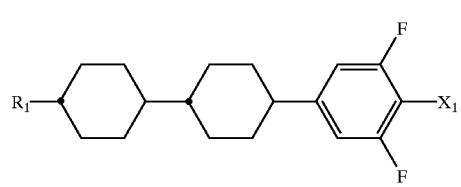
(3-4) 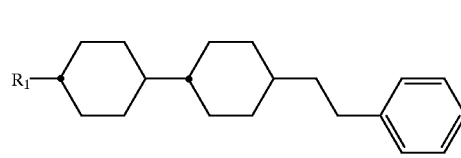
(3-5) 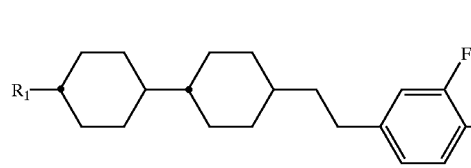
(3-6) 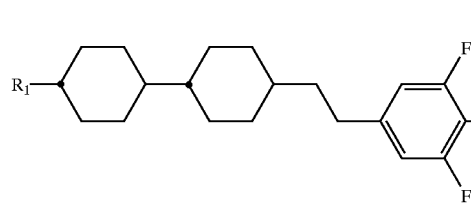
(3-7) 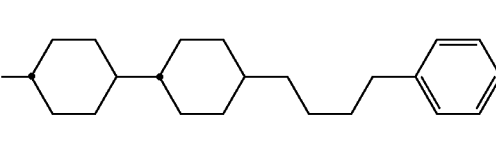
(3-8) 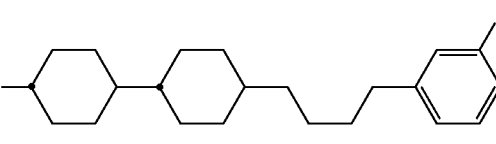
(3-9) 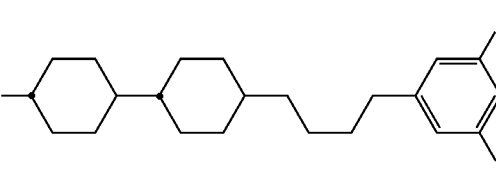
(3-10) 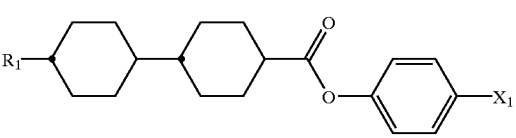
(3-11) 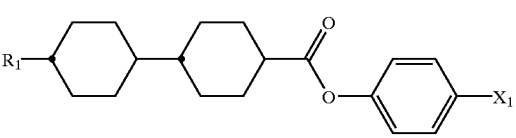
(3-12) 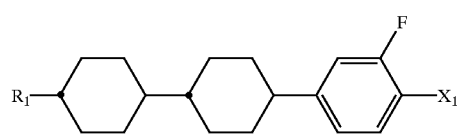
(3-13) 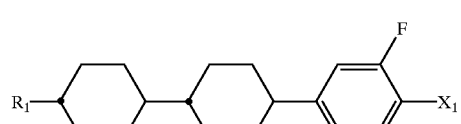
(3-14) 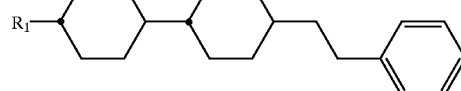
(3-15) 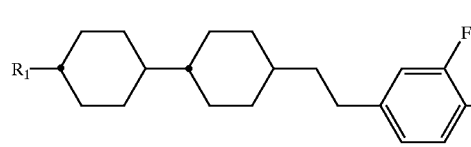
(3-16) 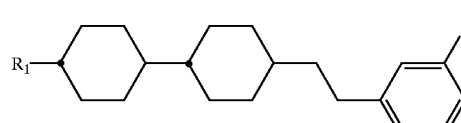
(3-17) 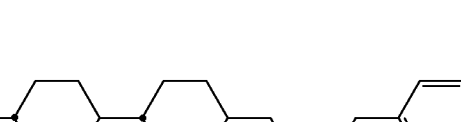
(3-18) 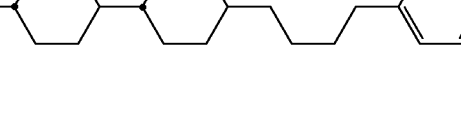

(3-19)
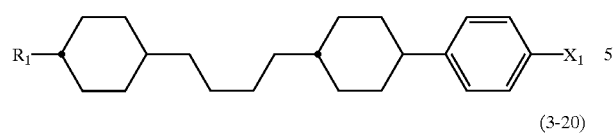
(3-20)
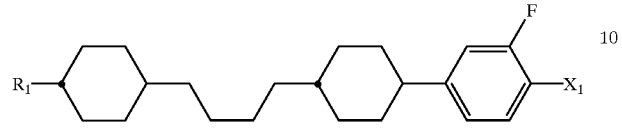
(3-21)
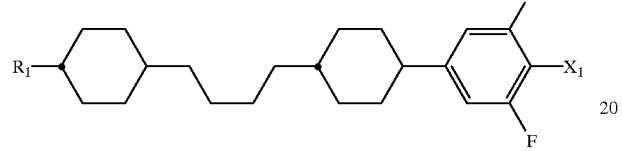
(3-22)
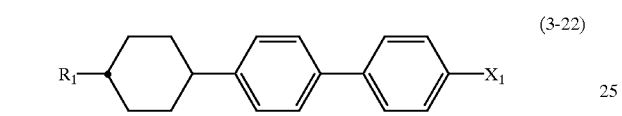
(3-23)
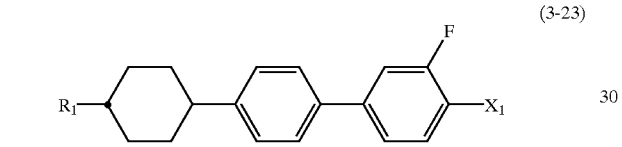
(3-24)
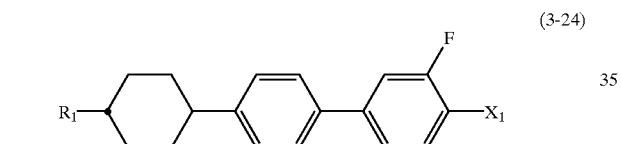
(3-25)
(3-26)
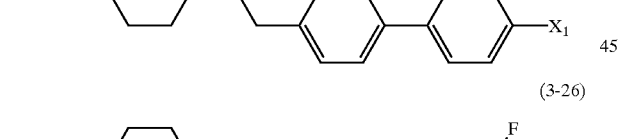
(3-27)
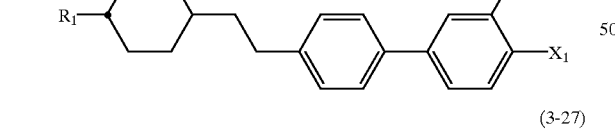
(3-28)
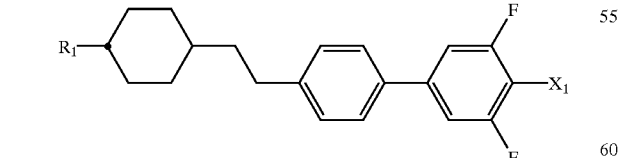
(3-29)
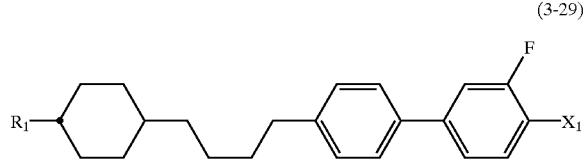
(3-30)
(3-31)
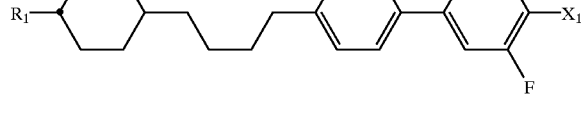
(3-32)
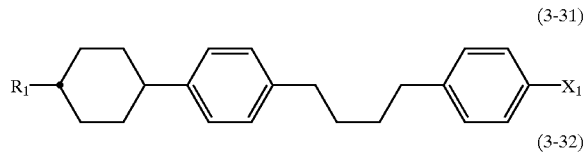
(3-33)
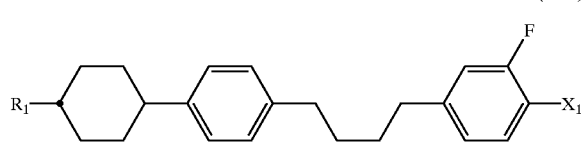
(3-34)
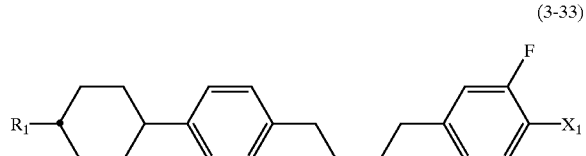
(3-35)
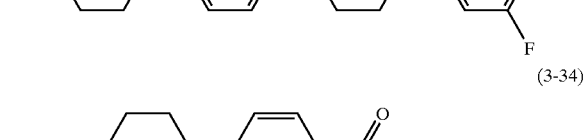
(3-36)
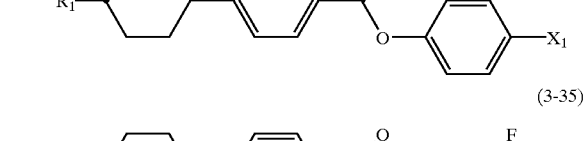
(3-37)
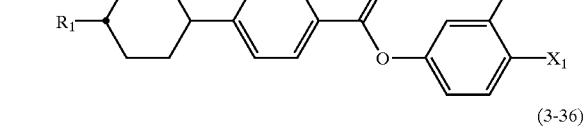

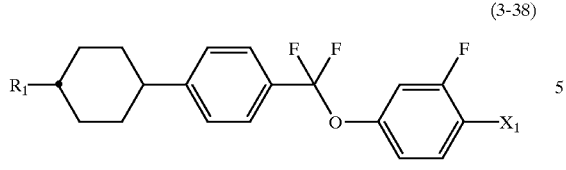
(3-38)
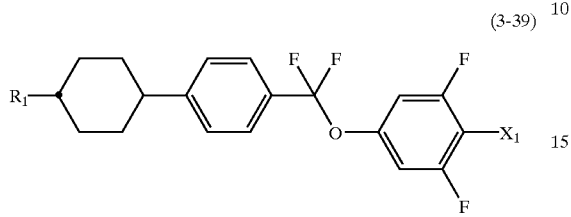
(3-39)
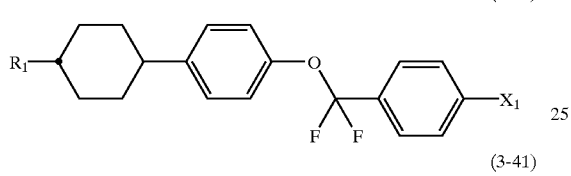
(3-40)
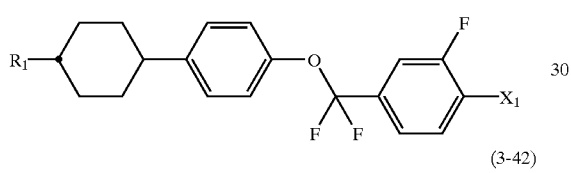
(3-41)
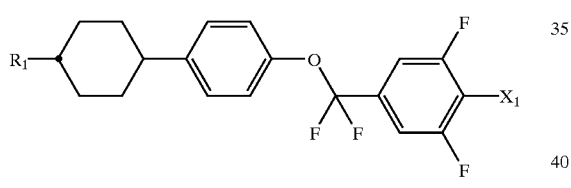
(3-42)
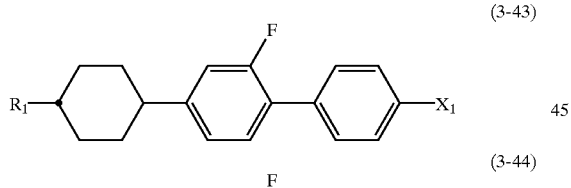
(3-43)
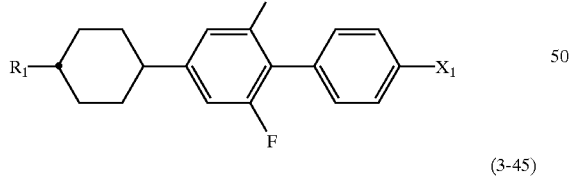
(3-44)
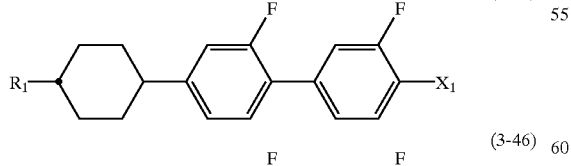
(3-45)
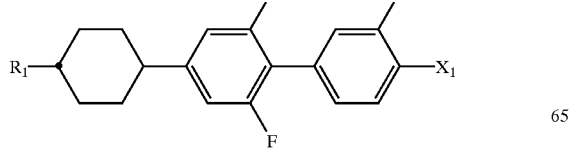
(3-46)
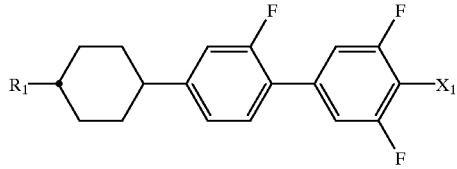
(3-47)
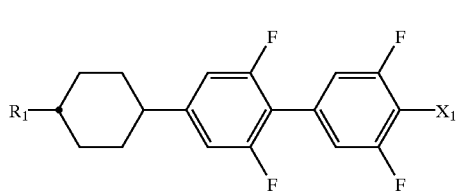
(3-48)
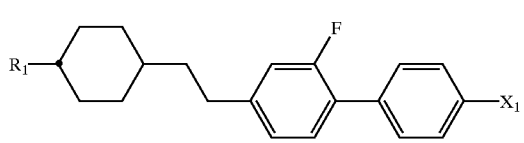
(3-49)
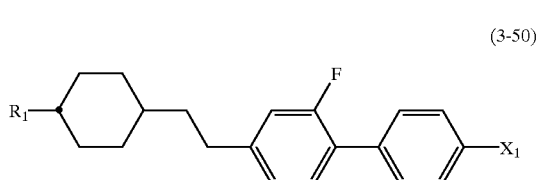
(3-50)
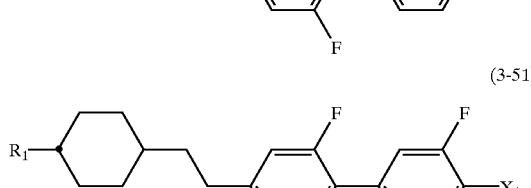
(3-51)
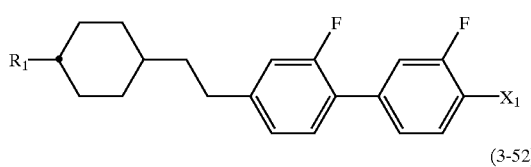
(3-52)
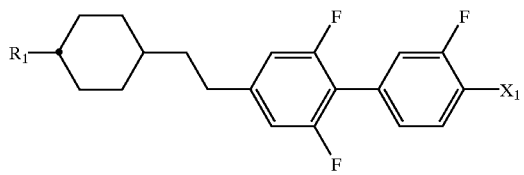
(3-53)
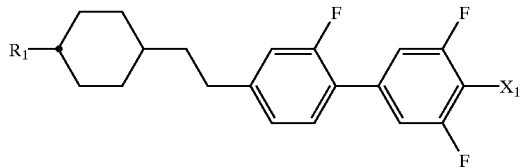
(3-54)
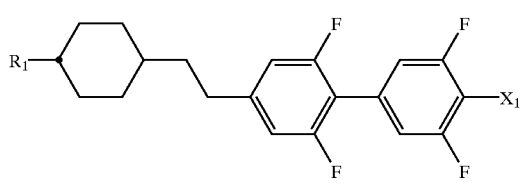

(3-55)
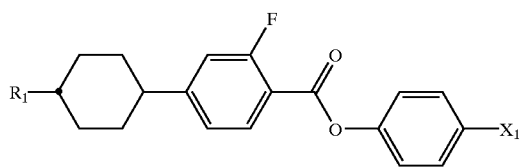
(3-56)
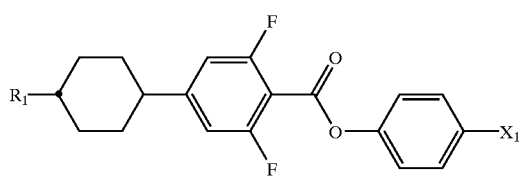
(3-57)
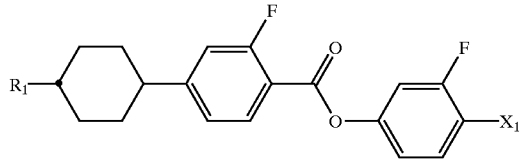
(3-58)
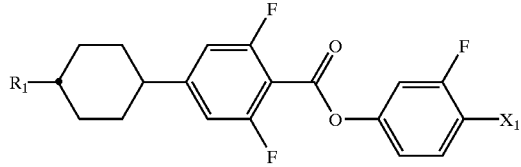
(3-59)
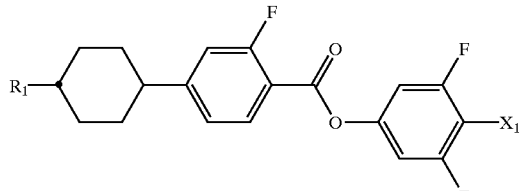
(3-60)
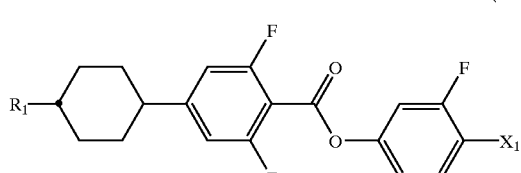
(3-61)
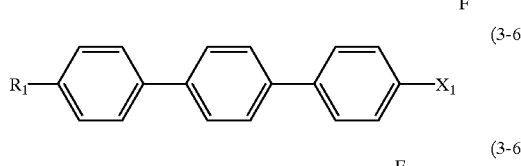
(3-62)
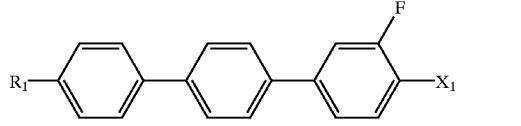
(3-63)
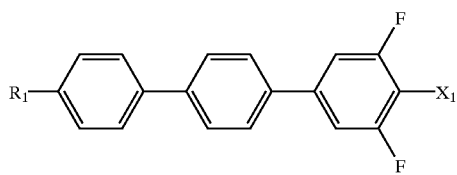
(3-64)
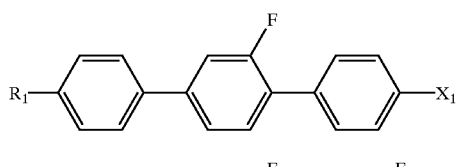
(3-65)
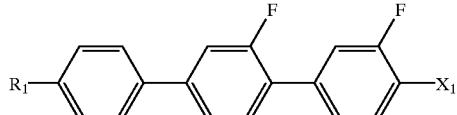
(3-66)
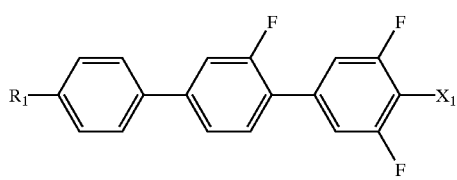
(3-67)
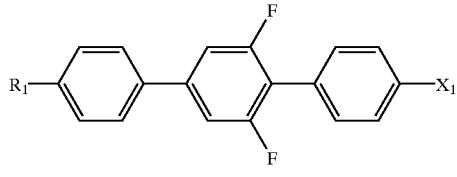
(3-68)
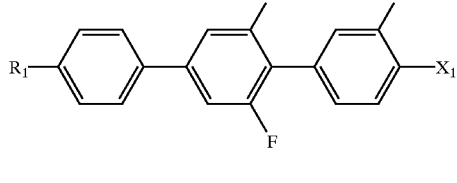
(3-69)
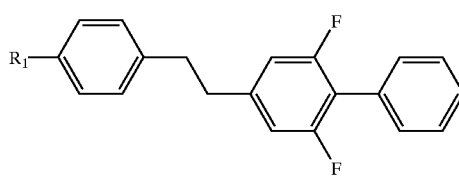
(3-70)
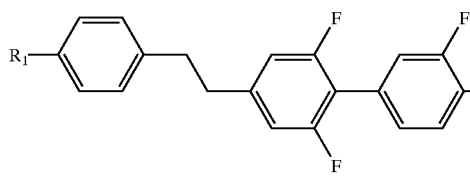
(3-71)
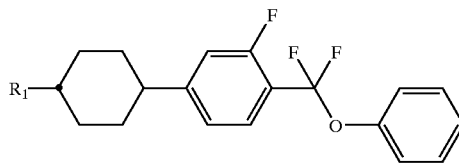

(3-72)
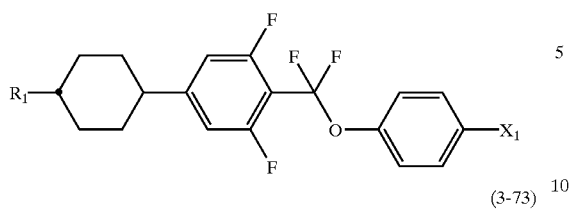
(3-73)
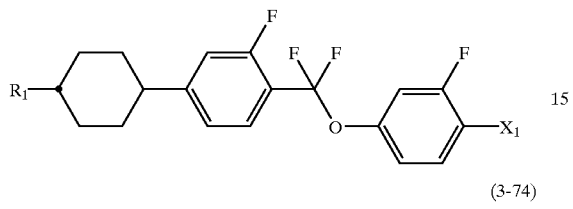
(3-74)
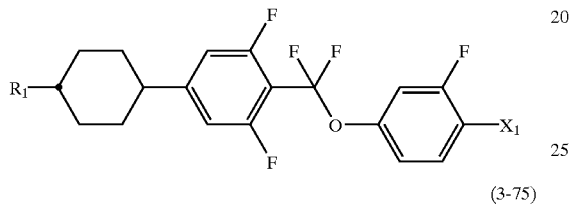
(3-75)
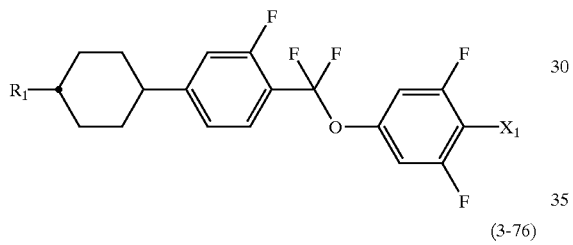
(3-76)
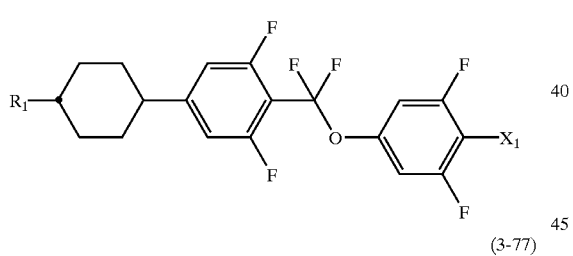
(3-77)
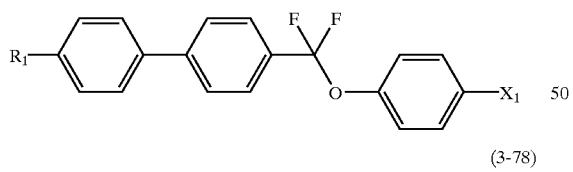
(3-78)
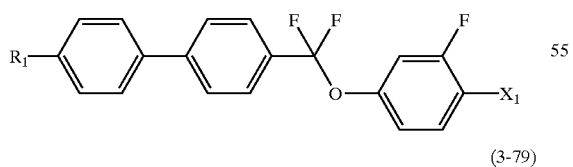
(3-79)
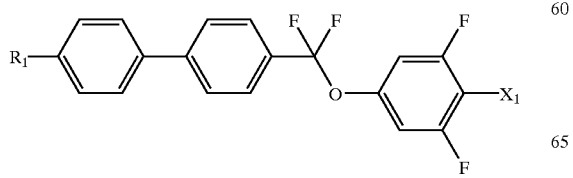
(3-80)
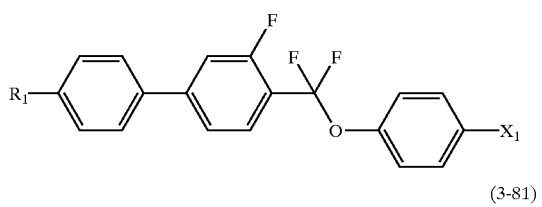
(3-81)
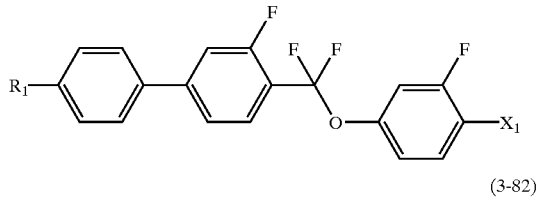
(3-82)
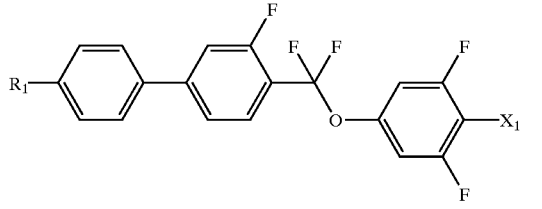
(3-83)
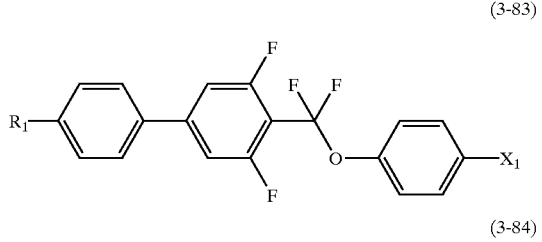
(3-84)
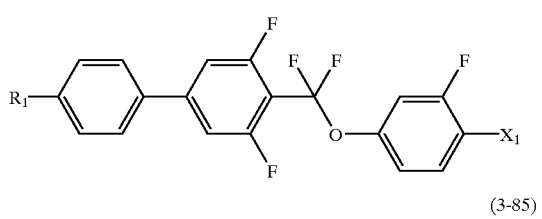
(3-85)
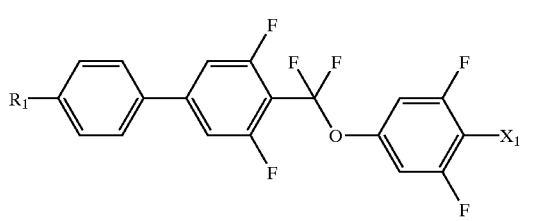
(3-86)
(3-87)
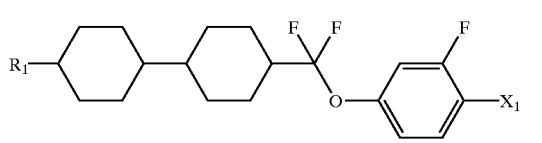

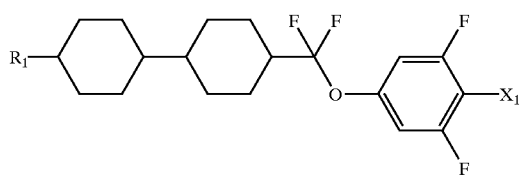 (3-88)
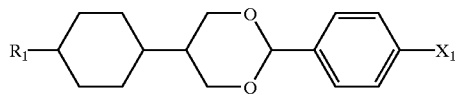 (3-89)
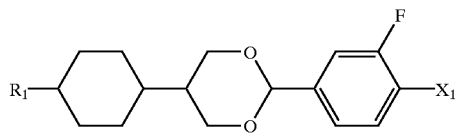 (3-90)
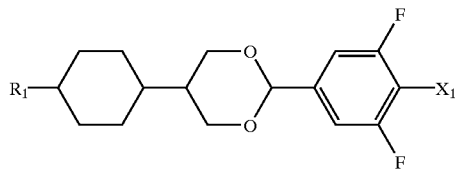 (3-91)
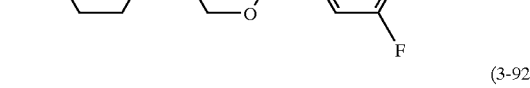 (3-92)
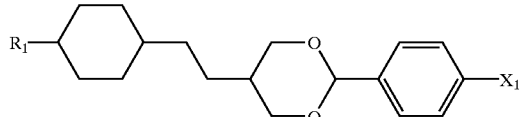 (3-93)
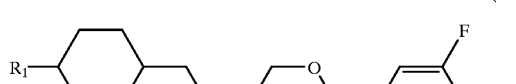 (3-94)
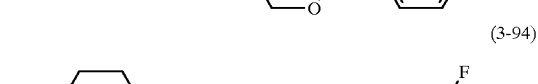 (3-95)
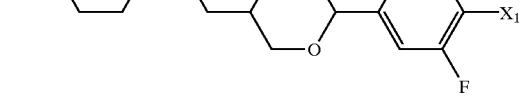 (3-96)
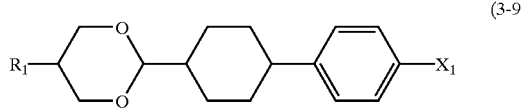 (3-97)
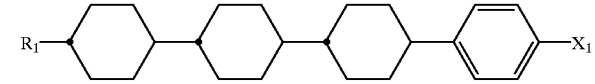 (4-1)
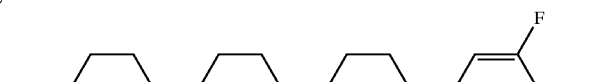 (4-2)
 (4-3)
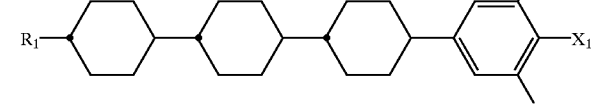 (4-4)
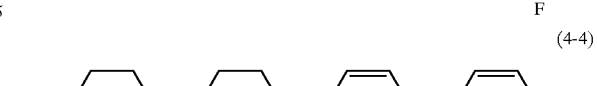 (4-5)
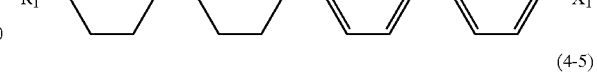 (4-6)
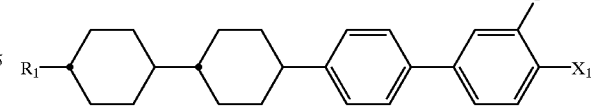 (4-7)
 (4-8)
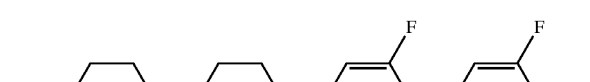 (4-9)

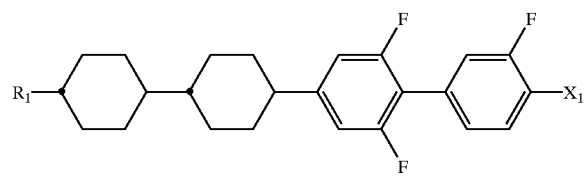
(4-10)
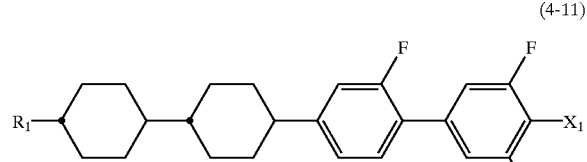
(4-11)
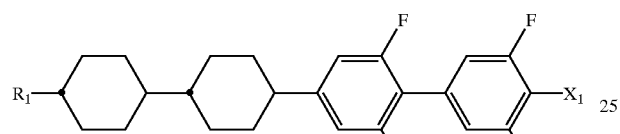
(4-12)
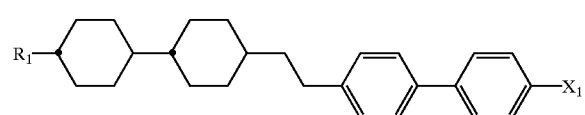
(4-13)
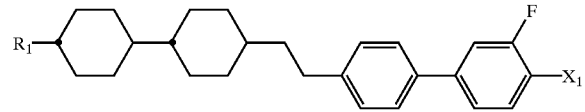
(4-14)
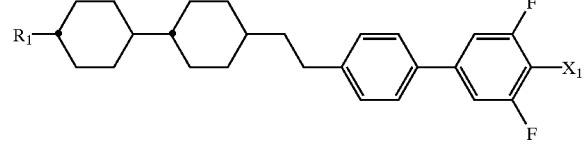
(4-15)
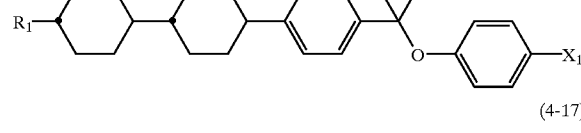
(4-16)
(4-17)
(4-18)
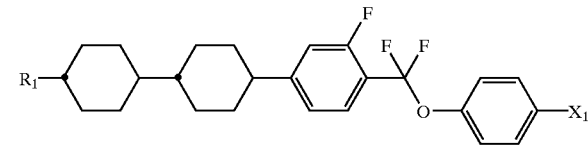
(4-19)
(4-20)
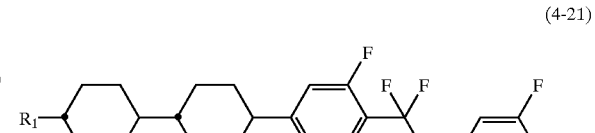
(4-21)
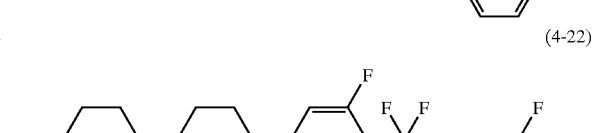
(4-22)
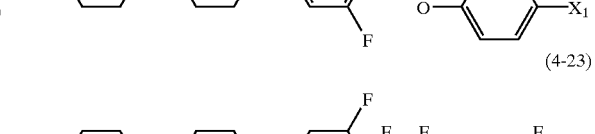
(4-23)
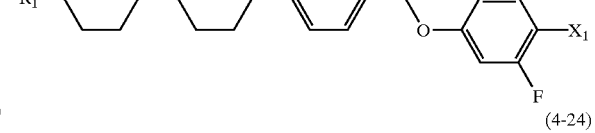
(4-24)
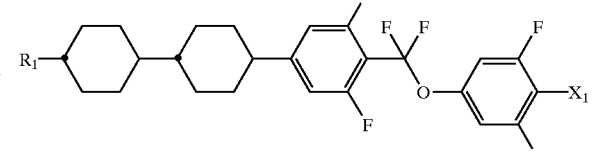
(4-25)
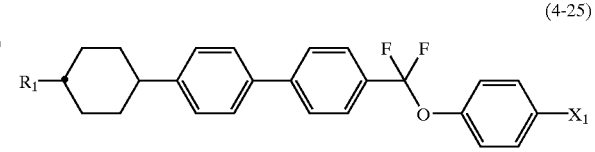
(4-26)
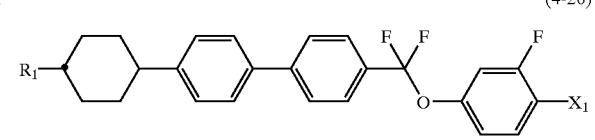
(4-27)
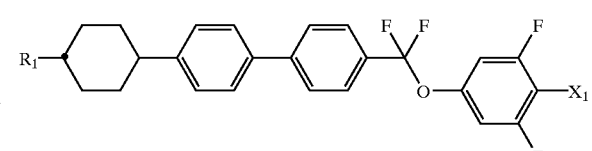

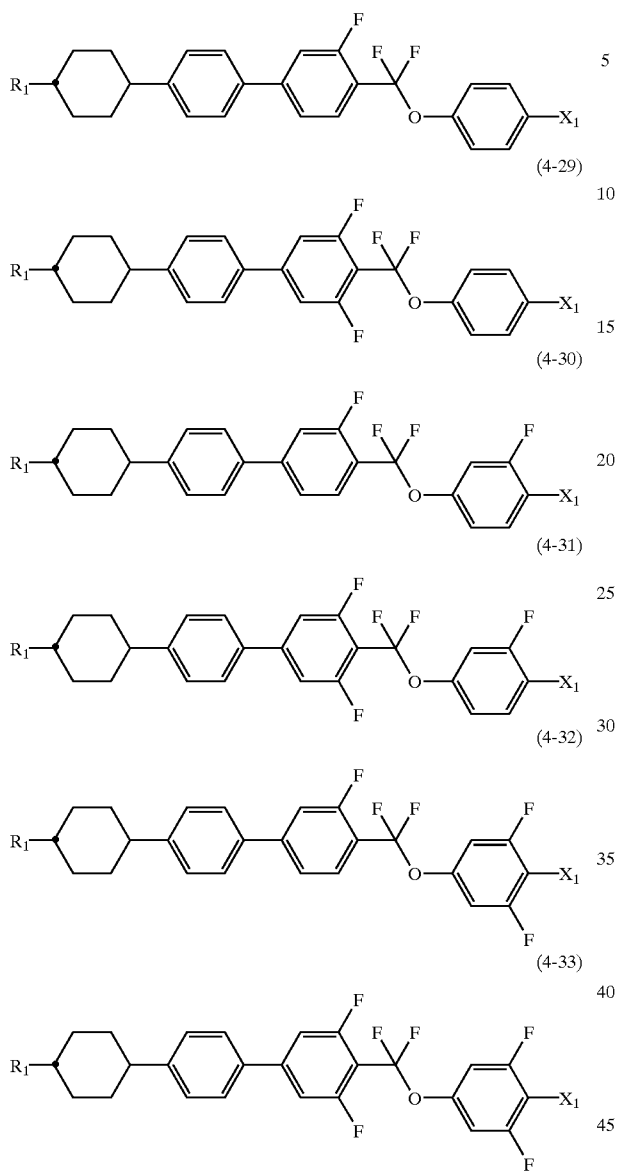

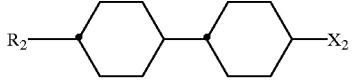
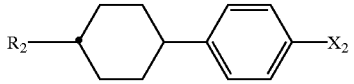
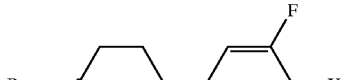
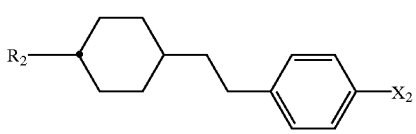
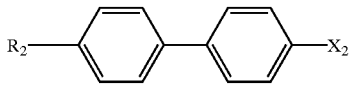
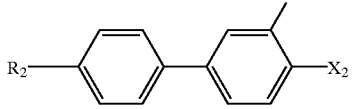
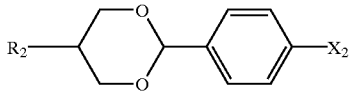
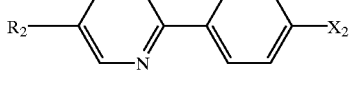
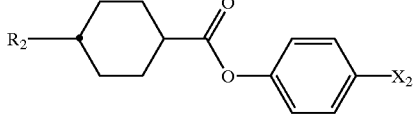
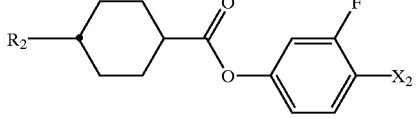
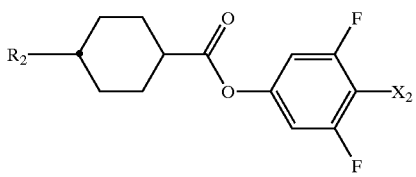
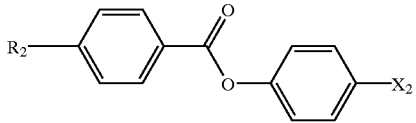

wherein $R_1$ and $X_1$ have the same meaning as described above.

These compounds expressed by formulae (2) to (4) are principally used for the liquid crystal compositions for TFT because of a positive dielectric anisotropy value and excellent thermal and chemical stability. In case of preparing the liquid crystal composition for TFT, the amount of the compound is suitable in the range of 1 to 99% by weight, preferably 10 to 97% by weight, more preferably 40 to 95% by weight, based on the total weight of the liquid crystal composition. The compounds expressed by formulae (10) to (12) may be further added to adjust viscosity.

Then, as the preferable example of the compounds expressed by formulae (5) and (6) in the second component B, (5-1) to (5-40) and (6-1) to (6-3) can be illustrated, respectively.

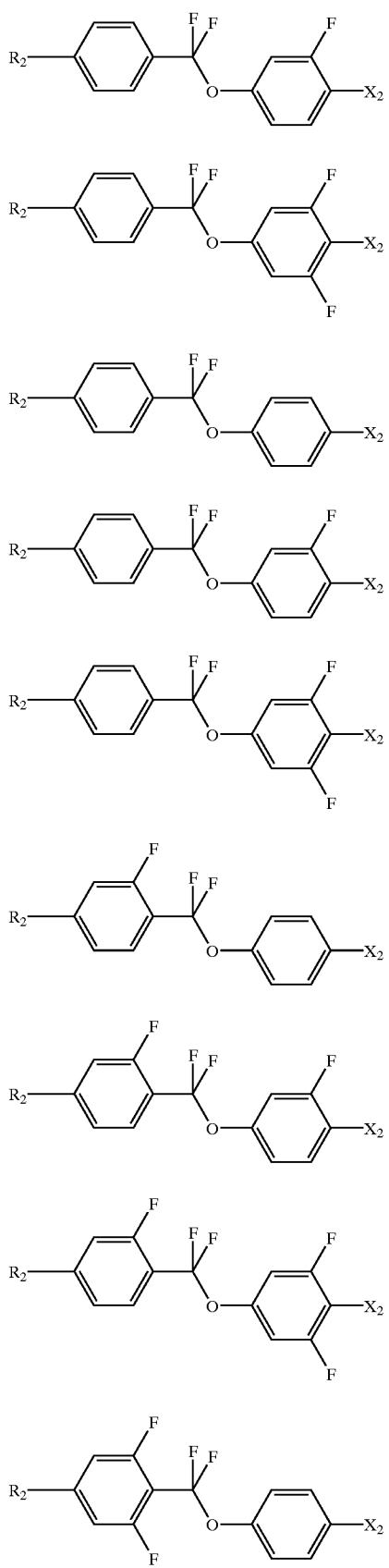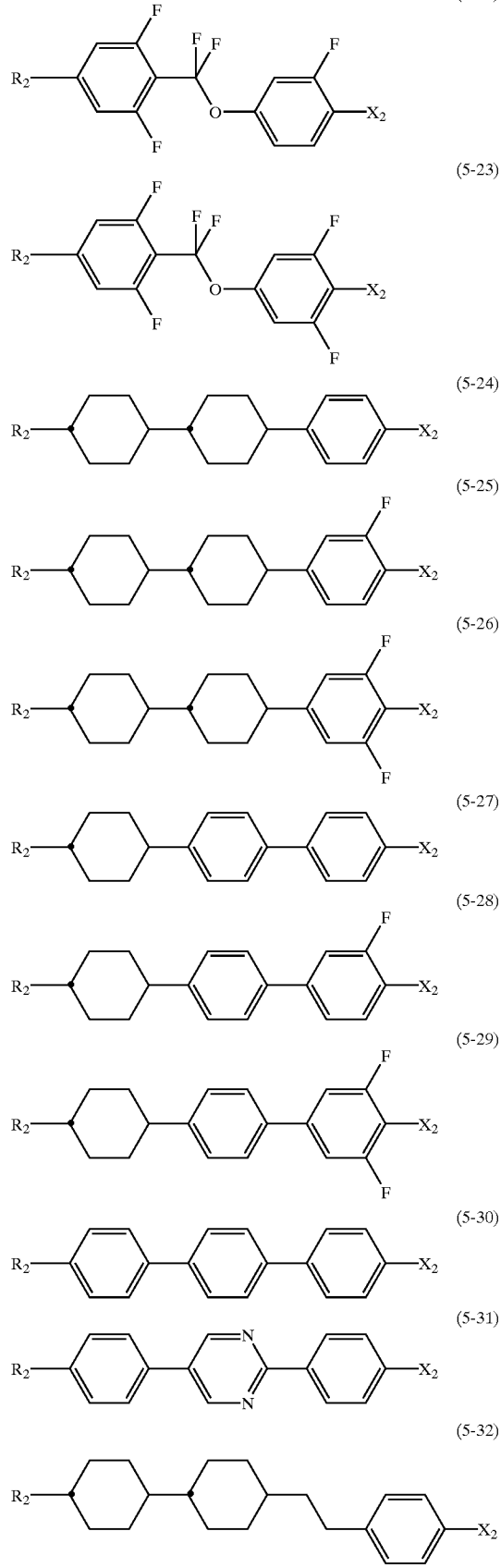

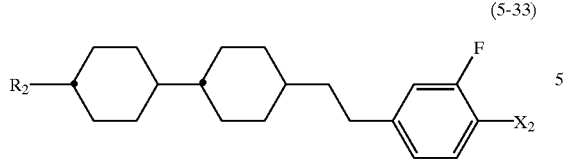
(5-33)
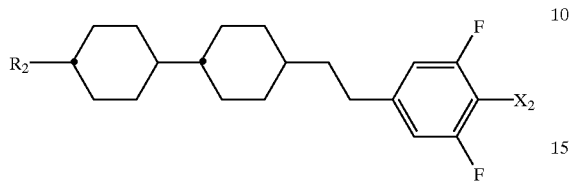
(5-34)
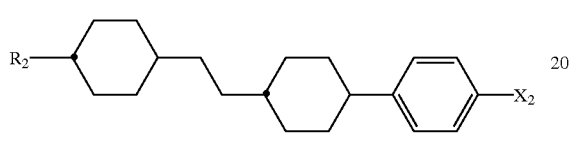
(5-35)
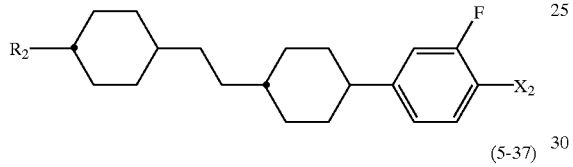
(5-36)
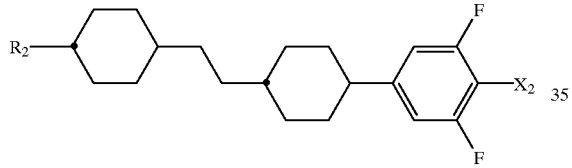
(5-37)
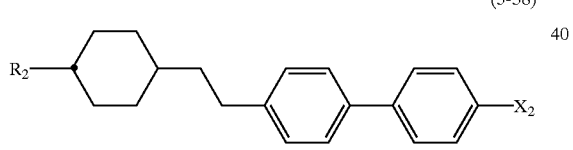
(5-38)
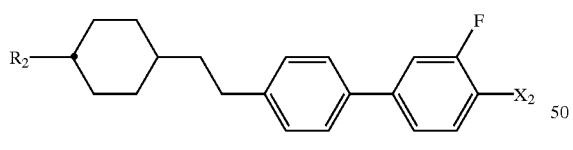
(5-39)
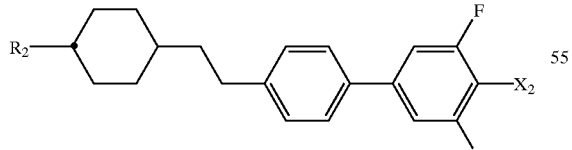
(5-40)
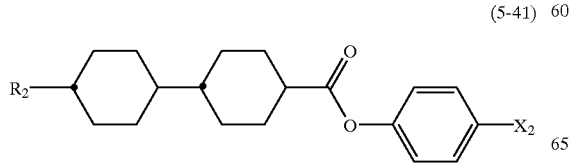
(5-41)
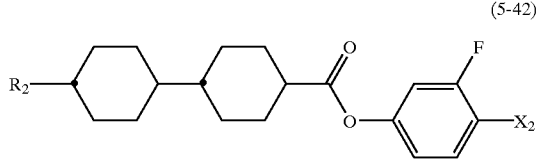
(5-42)
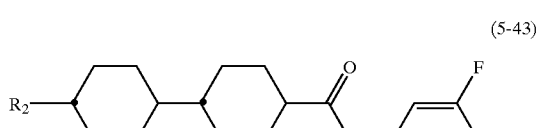
(5-43)
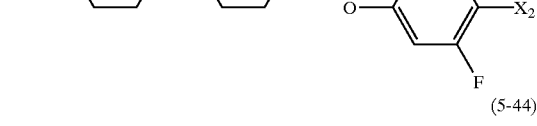
(5-44)
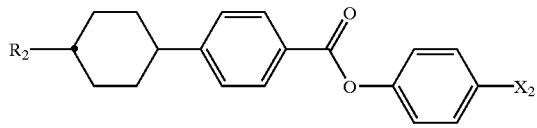
(5-45)
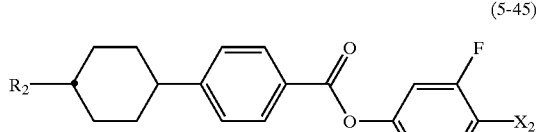
(5-46)
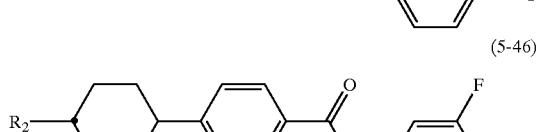
(5-47)
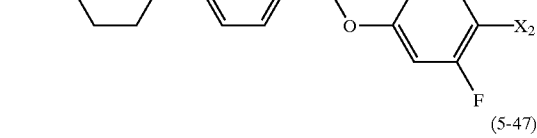
(5-48)
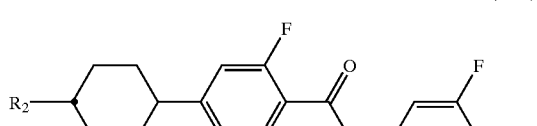
(5-49)
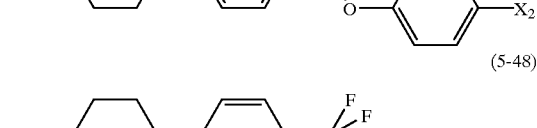
(5-50)
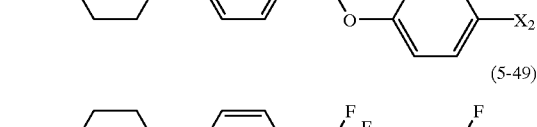
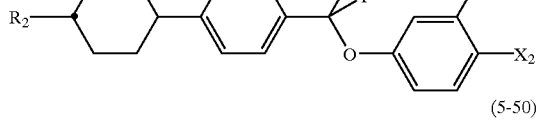
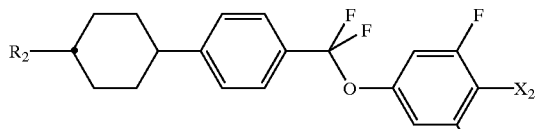

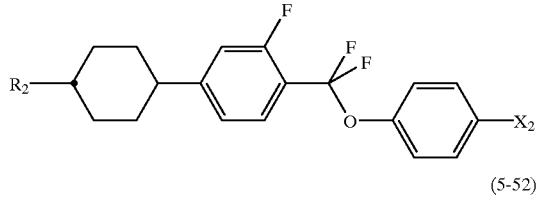
(5-51)

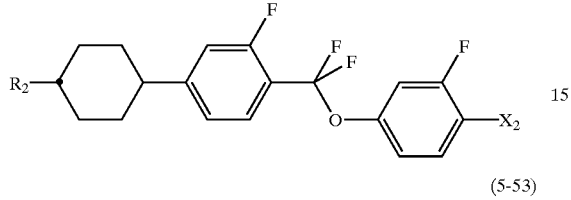
(5-52)

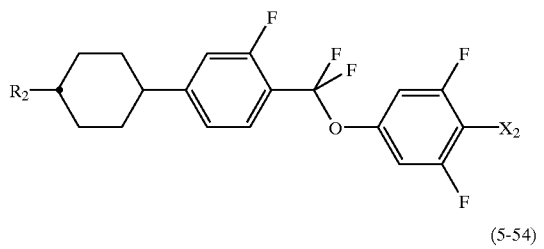
(5-53)

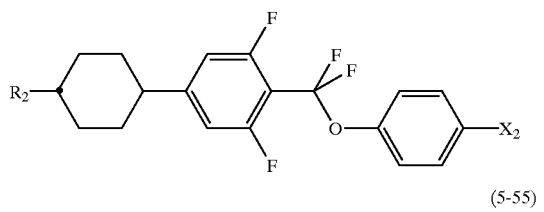
(5-54)

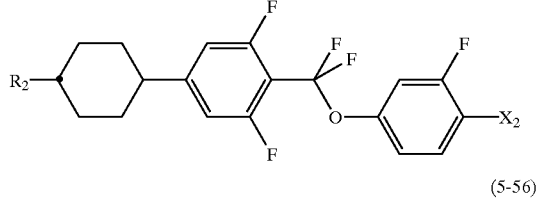
(5-55)

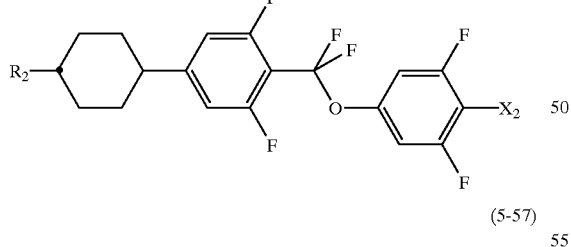
(5-56)

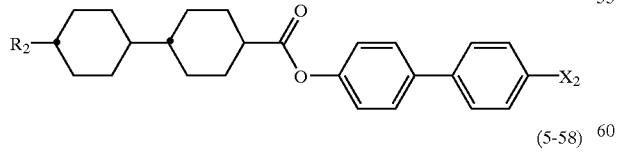
(5-57)

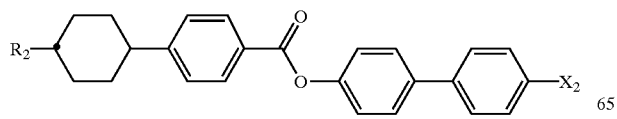
(5-58)

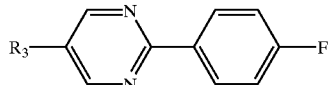
(6-1)

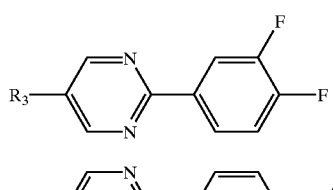
(6-2)

(6-3)

wherein $R_2$, $R_3$ and $X_2$ have the same meaning as described above.

The compounds expressed by formula (5) and (6) are used principally for the liquid crystal compositions for STN and TN, because their dielectric anisotropy values are positive and the values are extremely large. These compounds are used as a component of the compositions especially with an aim to lower threshold voltage. Also they can be used for the object to adjust viscosity, to adjust an optical anisotropy value, and to widen a temperature range of a liquid crystal phase, or for the further object to improve steepness. In case of preparing the liquid crystal compositions for STN or TN, the amount of compounds expressed by formulae (5) and (6) is suitable in the range of 0.1 to 99.9% by weight, preferably 10 to 97% by weight, and more preferably 40 to 95% by weight. A third component described later can be mixed for the object of adjusting threshold voltage, a temperature range of a liquid crystal phase, an optical anisotropy value, an dielectric anisotropy value, viscosity or the like.

In case of preparing liquid crystal compositions having a negative dielectric anisotropy value, which are used for vertical alignment mode (VA mode) and so on, it is preferable to mix at least one compound (hereafter referred to as a second component C) selected from the group of compounds expressed by formulae (7) to (9). Preferable examples of the compound expressed by formulae (7) to (9) of a second component C can be illustrated as (7-1) to (7-3), (8-1) to (8-5), and (9-1) to (9-3), respectively.

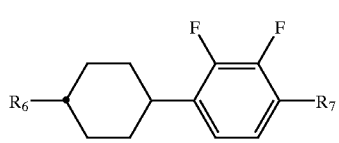
(7-1)

(7-2)

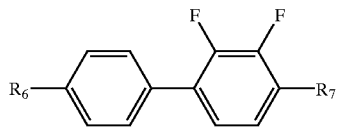
(7-3)

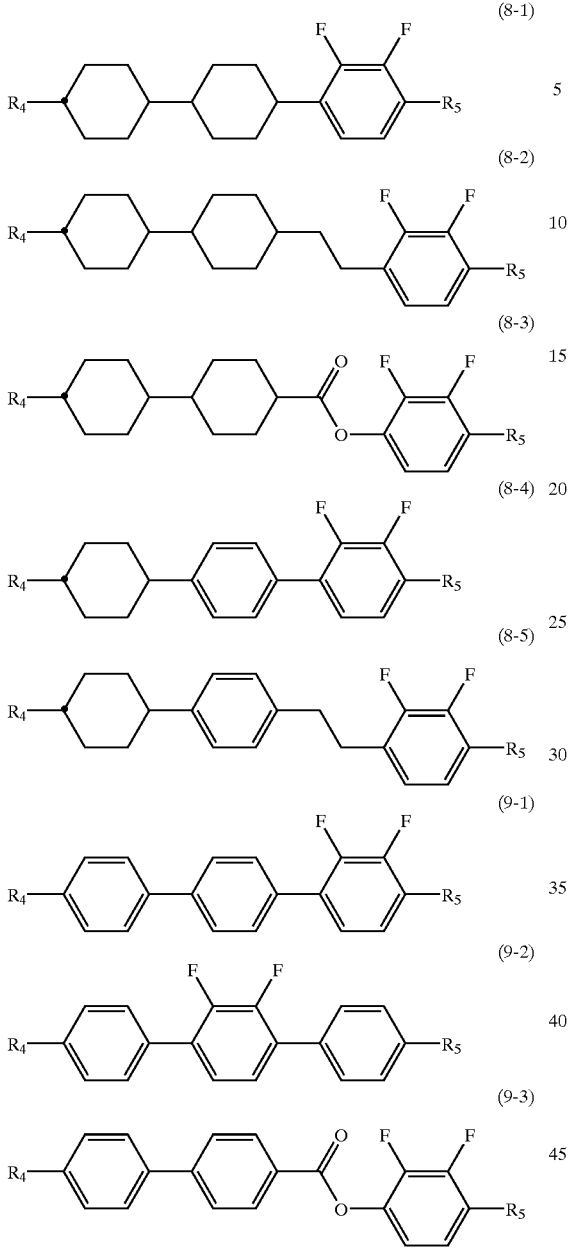

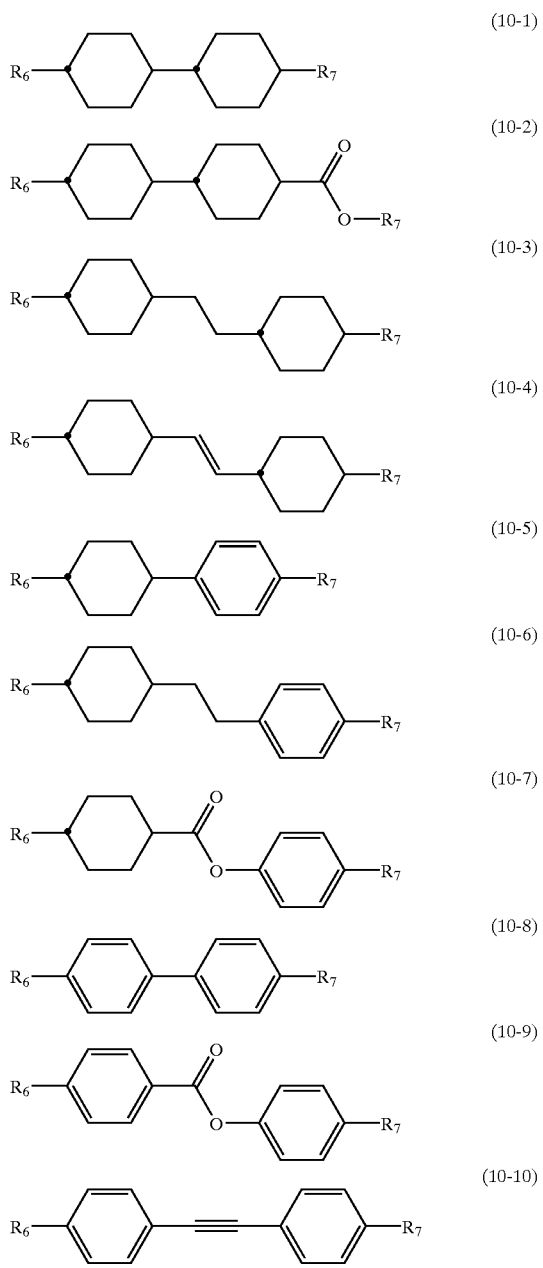

wherein $R_4$ and $R_5$ have the same meaning as described above.

The compounds expressed by formulae (7) to (9) have a negative dielectric anisotropy value. The compounds expressed by formula (7) are principally used for the object of adjusting threshold voltage, viscosity or an optical anisotropy value because they are two ring type compounds. The compounds expressed by formula (8) are used for the object of widening a nematic range by elevating clearing point etc. for the object of lowering threshold voltage and enlarging an optical anisotropy value.

The compounds expressed by formulae (7) to (9) are principally used in the liquid crystal compositions for VA mode requiring a negative dielectric anisotropy value. Increasing the amount makes threshold voltage of the composition small but makes viscosity large. Therefore, it is preferred to use them in a small amount as far as the requirement of threshold voltage is satisfied. However, if the content is less than 40% by weight, voltage driving might be impossible as the absolute value of a dielectric anisotropy value is 5 and less. The amount of the compounds expressed by formulae (7) to (9) is preferably 40% by weight or more in case of preparing the compositions for VA mode, more preferably the range of 50 to 95% by weight. Also the compounds expressed by formulae (7) to (9) are sometimes mixed to the compositions having a positive dielectric anisotropy value for the object of controlling an elastic constant and a voltage-transmission curve of the composition. In this case, the amount of the compounds expressed by formulae (7) to (9) is preferably 30% and less by weight.

As to a third component of the liquid crystal composition of this invention, examples of preferred compounds expressed by formulae (10) to (12) can be illustrated as (10-1) to (10-11), (11-1) to (11-18) and (12-1) to (12-6), respectively.

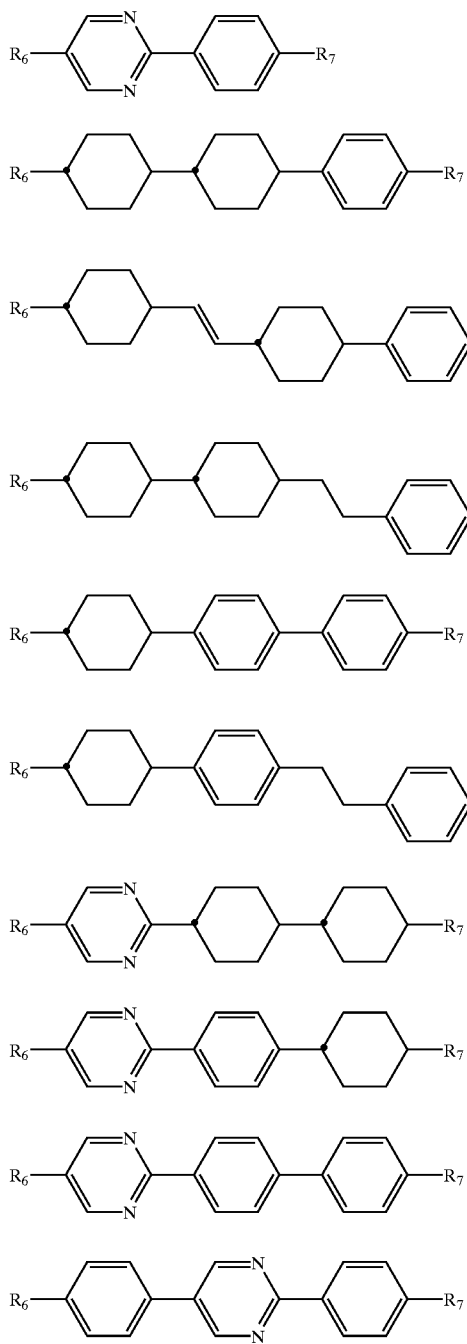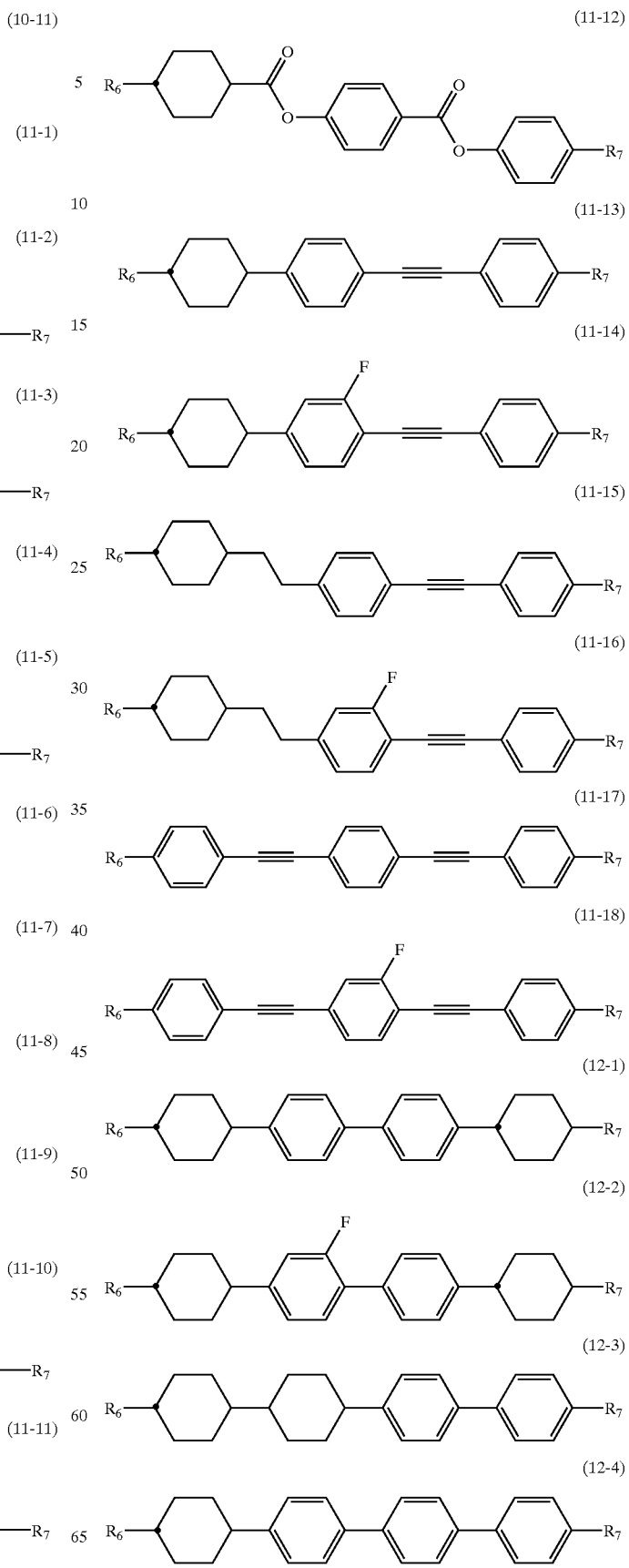

-continued (12-5)

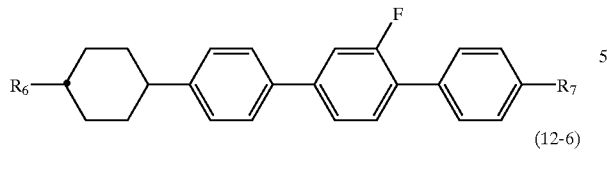

(12-6)

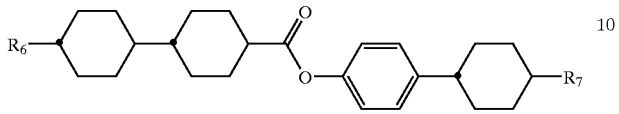

wherein R₆ and R₇ have the same meaning as described above.

In the compounds expressed by formulae (10) to (12), the absolute value of dielectric anisotropy is small and close to a neutral. The compounds expressed by formula (10) are principally used for the object of adjusting viscosity or an optical anisotropy value. And the compounds expressed by formulae (11) and (12) are used for the object of widening a nematic range by elevating a clearing point etc. or adjusting an optical anisotropy value.

Increasing the amount of compounds expressed by formulae (10) to (11) makes threshold voltage of the liquid crystal composition large and makes viscosity small. Therefore, it is desirable to use a large quantity of the compounds as far as the requirement for threshold voltage is fulfilled. In case of preparing the liquid crystal compositions for TFT, the amount of compound expressed by formulae (10) to (12) is preferably 40% and less by weight, more preferably 35% and less by weight. And in case of preparing the liquid crystal compositions for STN or TN, the amount of the compound expressed by formulae (10) to (12) is preferably 70% and less by weight, more preferably 60% and less by weight.

The liquid crystal compositions provided according to this invention preferably comprise at least one liquid crystalline compound expressed by formula (1) in the amount of 0.1 to 99% by weight to have excellent characteristics.

The liquid crystal compositions are generally prepared by known methods, for example, by dissolving various components each other at high temperature. They are optimized and improved, according to an intended usage, by adding appropriate additives, if necessary. Such additives are well known to a person skilled in the art and reported in the literature in detail. Usually a chiral dopant which has effects to prevent a reverse twist by inducing a helical structure in liquid crystals and by adjusting a twist angle to the required value, is added. Examples of the chiral dopant used in this case can be illustrated as follows.

symbol:C15

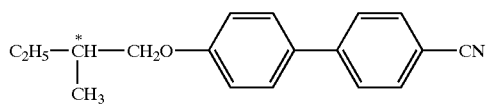

symbol:CB15

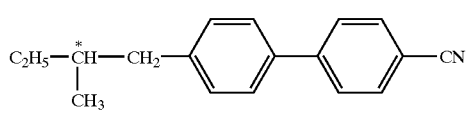

symbol:CM21

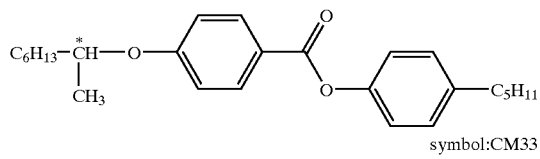

symbol:CM33

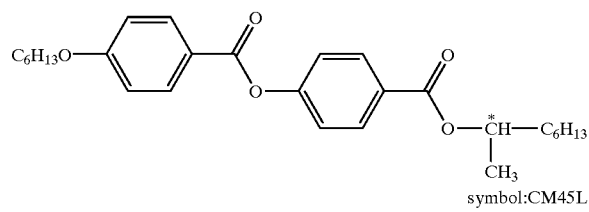

symbol:CM45L

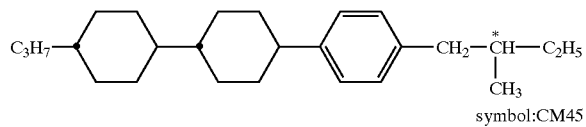

symbol:CM45

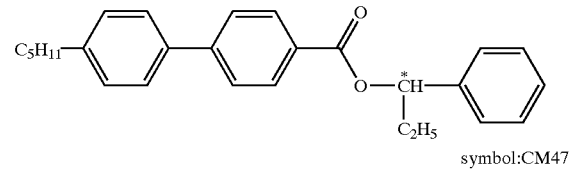

symbol:CM47

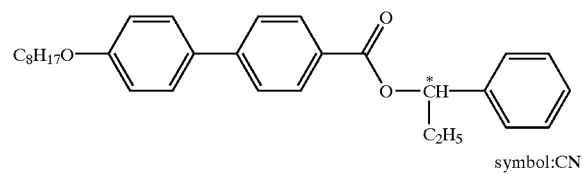

symbol:CN

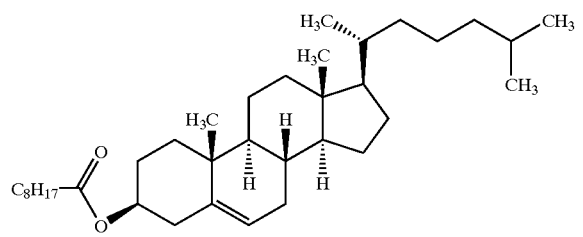

In the liquid crystal compositions of this invention, their pitch of a twist is usually adjusted by the addition of these optically active compounds. For the liquid crystal compositions for TFT and TN, the pitch of twisting is preferably adjusted in the range of 40 to 200 μm. For the liquid crystal compositions for STN, it is preferably adjusted in the range of 6 to 20 μm. And for the bistable TN mode, it is preferably adjusted in the range of 1.5 to 4 μm. Two or more optically active agents can be added for the purpose of adjusting temperature dependence of the pitch.

The liquid crystal compositions can be used for GH mode by the addition of dichroic dyes such as melocyanines, styryls, azos, azomethines, azoxys, quinophthalones, anthraquinones, or tetrazines. The compositions of this invention can be used for NCAP which is fabricated by microcapsulation of nematic liquid crystals, for polymer dispersion mode liquid crystal display device (PDLCD) which is fabricated by forming three dimensional polymer network in liquid crystals such as polymer network liquid crystal device (PNLCD). Moreover, they also can be used for birefringence control mode (ECB) or DS mode.

EXAMPLES

This invention will be explained below by examples in more detail.

Example 1

Preparation of 2,3-difluoro-1-(4-(4-propylcyclohexyl)phenyloxy)difluoromethyl-4-ethoxybenzene [Compound expressed by formula (1) wherein Ra is propyl, Rb is ethoxy, l=1, m=n=0, ring $A_1$ is trans-1,4-cyclohexane, $Z_1$ is a single bond, $A_2$ is 1,4-phenylene, both $Y_1$ and $Y_2$ are fluorine; Compound No.66]

First Step

In a 1 L three-neck flask, 6.60 g of 2,3-difluoro-4-ethoxybenzoic acid (a) and 7.06 g of 4-(4-propyl-1-cyclohexyl)phenol (b) were dissolved in 450 mL of methylene chloride. 4.09 g of 4-dimethylaminopyridine was added thereto and stirred for 1 hour at room temperature. A solution of 7.60 g of N,N-dicyclohexylcarbodiimide dissolved in 195 mL of methylene chloride was added thereto and stirred overnight. Then diethyl ether was added and the precipitated urea was filtered off, saturated aqueous solution of sodium chloride was added and was stirred for 1 hour. The organic layer separated was washed with 3N hydrochloric acid and saturated aqueous solution of sodium bicarbonate, and was dried over anhydrous sodium sulfate. The solvent was distilled off under reduced pressure to give 13.1 g of 4-(4-propylcyclohexyl)phenyl 4-ethoxy-2,3-difluorobenzoate (c).

Second Step 10.0 g of the benzoate (c) obtained in First Step, 20.1 g of Lawesson's reagent and 100 mL of mesitylene were added to a 300 mL three-neck flask replaced inside by nitrogen and were refluxed for 6 hours. After cooling to room temperature, water was added. The organic layer was separated and aqueous layer was extracted in toluene. The organic layers combined were washed with saturated aqueous solution of sodium bicarbonate, and dried over anhydrous sodium sulfate. The solvent was distilled off under reduced pressure to give 6.11 g of O-4-(4-propylcyclohexyl)phenyl 4-ethoxy-2,3-difluorothiobenzoate (d).

Third Step

In a 300 mL three-neck flask, 3.43 g of N-bromosuccinimide and 80 mL of methylene chloride were added and stirred at −60° C. under nitrogen atmosphere. 8.3 g of 70% hydrogen fluoride-pyridine was slowly added thereto and stirred at the same temperature for 10 minutes. Then 4.4 g of the benzoate (d) obtained in Second Step, which was dissolved in 40 mL of methylene chloride, was slowly added dropwise and stirred at the same temperature for 3 hours. After the reaction mixture was warmed to room temperature, saturated aqueous solution of sodium carbonate was added dropwise, and stirred overnight. The organic layer was separated and aqueous layer was extracted in methylene chloride. The organic layers combined were washed with saturated aqueous solution of sodium hydrogen sulfite, 3N hydrochloric acid, and saturated aqueous solution of sodium bicarbonate, and dried over anhydrous sodium sulfate. The solvent was distilled off under reduced pressure to give 3.53 g of 2,3-difluoro-1-(4-(4-propylcyclohexyl)phenyloxy)difluoromethyl-4-ethoxybenzene (66). The compound was colorless crystals having a nematic phase.

C 21.5° C. N 118° C. I.

1H-NMR (CDC13) δ: 7.38–7.35 (q, 1H), 7.25–7.15 (q, 4H), 6.75–6.71 (m, 1H), 4.16–4.12 (q, 2H), 2.48–2.41 (m,1H), 1.89–1.84 (m, 4H), 1.48–1.19 (m, 10H), 1.09–1.01 (m, 2H), 0.91–0.88 (t, 3H).

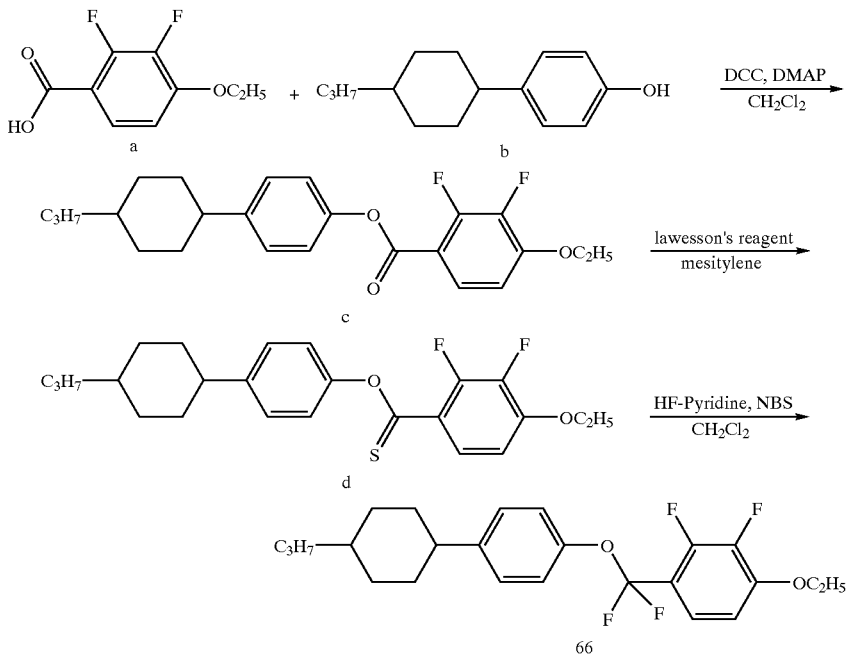

Example 2

Preparation of 2,3-difluoro-1-(4-(4-propylcyclohexyl)-1-cyclohexenyloxy)difluoromethyl-4-methoxybenzene (Compound expressed by formula (1) wherein Ra is n-propyl, Rb is methoxy, l=1, m=n=0, ring $A_1$ is 1,4-cyclohexane, $Z_1$ is a single bond, $A_2$ is 1-cyclohexene-1,4-diyl, and both $Y_1$ and $Y_2$ are fluorine; Compound No. 51)

First Step

In a 100 mL three-neck flask, 7.20 g of 2,3-difluoro-4-methoxybenzoic acid (e) was dissolved in 30 mL of toluene, 6.87 g of thionyl chloride was added thereto and refluxed for 3 hours. Toluene and thionyl chloride were distilled off, and then 17.0 g of 4-(4-propylcyclohexyl)-1-trimethylsilyloxycyclohexene (f) and 0.40 g of mercury chloride (II) were added thereto and stirred at 90° C. for 2 hours. After cooling to room temperature, water was added. The organic layer was separated and was washed with saturated aqueous solution of sodium bicarbonate and water, dried over anhydrous sodium sulfate. The solvent was distilled off under reduced pressure to give 13.8 g of 4-(4-propylcyclohexyl)cyclohexene-1-yl 4-methoxy-2,3-difluorobenzoate (g).

bicarbonate, and dried over anhydrous sodium sulfate. The solvent was distilled off under reduced pressure to give 0.22 g of 2,3-difluoro-1-(4-(4-propylcyclohexyl)1-cyclohexenyloxy)difluoromethyl-4-methoxybenzene (51). The compound was colorless crystals having a nematic phase.

C 94° C. N 99° C. I.

1H-NMR (CDC13) δ: 7.36–7.32 (m, 1H), 6.76–6.73 (t, 1H), 4.47–4.46 (q, 1H), 3.93 (s, 3H), 2.48–2.41 (m, 2H), 2.07–0.97 (m, 19H), 0.88–0.84 (t, 3H).

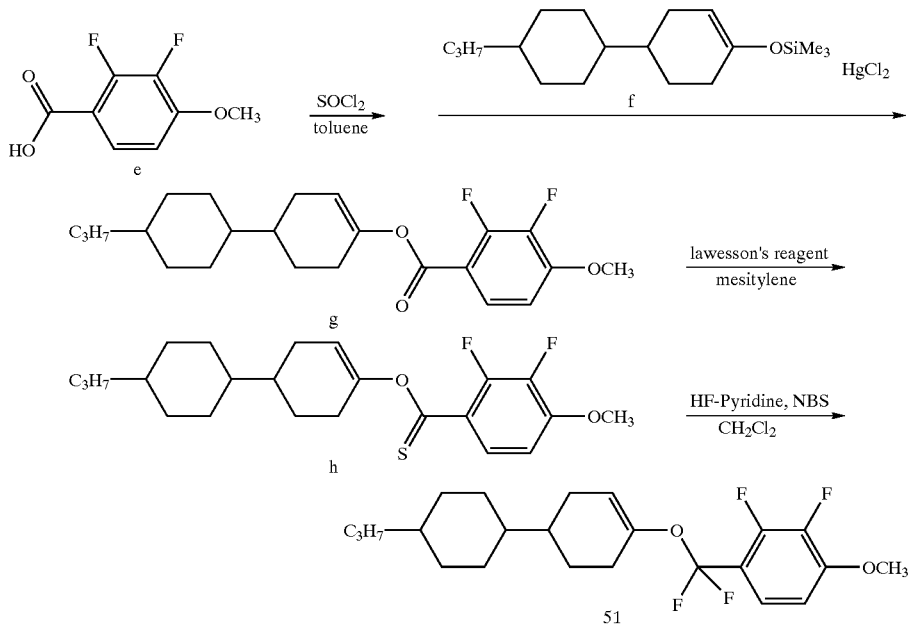

Second Step 11.7 g of the benzoate (g) obtained in First Step, 24.7 g of Lawesson's reagent and 120 mL of mesitylene were added in a 300 mL three-neck flask replaced inside by nitrogen and refluxed under heat for 6 hours. After cooling to room temperature, water was added. The organic layer was separated and water layer was extracted in toluene. The organic layers combined were washed with saturated aqueous solution of sodium bicarbonate and dried over anhydrous sodium sulfate. The solvent was distilled off under reduced pressure to give 0.53 g of O-4-(4-propylcyclohexyl)cyclohexene-1-yl 4-methoxy-2,3-difluorothiobenzoate (h).

Third Step

In a 300 mL three-neck flask, 0.46 g of N-bromosuccinimide and 11 mL of methylene chloride were added and stirred at −60° C. under nitrogen atmosphere. 1.12 g of 70% hydrogen fluoride-pyridine was slowly added thereto and stirred at the same temperature for 10 minutes. Then, 0.53 g of the benzoate (h) obtained in Second Step dissolved in 40 mL of methylene chloride was slowly added dropwise and stirred at the same temperature for 3 hours. After the reaction mixture was warmed to room temperature, saturated sodium carbonate aqueous solution was added dropwise and stirred overnight. The organic layer was separated and aqueous layer was extracted in methylene chloride. The organic layers combined were washed with saturated aqueous solution of sodium hydrogen sulfite, 3N hydrochloric acid, and saturated aqueous solution of sodium Example 3

Preparation of 2,3-difluoro-1-(4-(4-propylcyclohexyl)cyclohexyloxy)difluoromethyl-4-methoxybenzene (Compound expressed by formula (1) wherein Ra is n-propyl, Rb is methoxy, l=1, m=n=0, ring $A_1$ is trans-1,4-cyclohexane, $Z_1$ is single bond, ring $A_2$ is trans-1,4-xylohexane, and both $Y_1$ and $Y_2$ are fluorine; Compound No.41)

First Step

In a 1 L three-neck flask, 30.6 g of 2,3-difluoro-4-methoxybenzoic acid (e) and 37.3 g of trans-4-(trans-propylcyclohexyl)cyclohexanol (i) were dissolved in 1 L of methylene chloride. 16.4 g of 4-dimethylaminopyridine was added and stirred at room temperature for 1 hour. A solution in which 31.3 g of N,N-dicyclohexylcarbodiimide was dissolved in 500 mL of methylene chloride was added thereto and stirred overnight. Diethyl ether was added and urea precipitated was filtered off. Saturated aqueous solution of sodium chloride was added and stirred for 1 hour. The organic layer separated was washed with 3N hydrochloric acid, saturated aqueous solution of sodium bicarbonate, and dried over anhydrous sodium sulfate. The solvent was distilled off under reduced pressure to give 41.4 g of trans-4-(trans-4-propylcyclohexyl)cyclohexyl 4-methoxy-2,3-difluorobenzoate (j).

Second Step 41.4 g of the benzoate (j) obtained in First Step, 90.2 g of Lawesson's reagent and 400 mL of mesitylene were added in a 1L three-neck flask replaced inside by nitrogen and refluxed under heat for 6 hours. After cooling to room temperature, water was added. The organic layer was separated and aqueous layer was extracted in toluene. The organic layers combined were washed with saturated aqueous solution of sodium bicarbonate and dried over anhydrous sodium sulfate. The solvent was distilled off under reduced pressure to give 29.8 g of O-trans-4-(trans-4-propylcyclohexyl)cyclohexyl 4-methoxy-2,3-difluorothiobenzoate (k).

Third Step

In a 300 mL three-neck flask, 4.43 g of N-bromosuccinimide and 150 mL of methylene chloride were added and stirred at −60° C. under nitrogen atmosphere. 10.7 g of 70% hydrogen fluoride-pyridine was slowly added thereto and stirred for 10 minutes at the same temperature. Then, 5.00 g of the benzoate (k) obtained in Second Step was dissolved in 50 mL of methylene chloride and slowly added dropwise and stirred for 3 hours at the same temperature. The reaction mixture was warmed to room temperature, saturated aqueous solution of sodium carbonate was added dropwise and stirred overnight. The organic layer was separated and aqueous layer was extracted in methylene chloride. The organic layers combined were washed with saturated aqueous solution of sodium hydrogen sulfite, 3N hydrochloric acid, and saturated aqueous solution of sodium bicarbonate, and were dried over anhydrous sodium sulfate. The solvent was distilled off under reduced pressure to give 3.34 g of 2,3-difluoro-1-(4-(4-propylcyclohexyl)cyclohexyloxy)difluoromethyl-4-methoxybenzene (41). The compound was colorless crystals.

C 133° C. I.

1H-NMR (CDC13) δ: 7.33–7.30 (m, 1H), 6.76–6.72 (m, 1H), 4.36–4.30 (m, 1H), 3.94 (s, 3H), 2.15–2.13 (d, 2H), 1.83–1.08 (m, 21H), 0.91–0.88 (t, 3H).

Example 4

Preparation of 2,3-difluoro-1-(4-(trans-4-propylcyclohexyl)-(2,3-difluorophenyloxy)difluoromethyl)-4-ethoxybenzene (Compound expressed by formula (1) wherein Ra is n-propyl, Rb is ethoxy, l=1, m=n=0, ring $A_1$ is trans-1,4-cyclohexane, $Z_1$ is a single bond, ring $A_2$ is 2,3-difluoro-1,4-phenylene, and both $Y_1$ and $Y_2$ are fluorine; Compound No.76)

First Step

In a 500 mL three-neck flask, 3.20 g of 2,3-difluoro-4-ethoxybenzoic acid (a) and 3.84 g of 2,3-difluoro-4-(trans-4-propylcyclohexyl)phenol (1) were dissolved in 230 mL of methylene chloride. 0.70 g of 4-dimethylaminopyridine was added thereto and stirred at room temperature for 1 hour. A solution in which 3.54 g of N,N-dicyclohexylcarbodiimide was dissolved in 90 mL of methylene chloride was added thereto and stirred overnight. Diethyl ether was added and urea precipitated was filtered off. Saturated aqueous solution of sodium chloride was added and stirred for 1 hour. After organic layer was separated, the organic layer was washed with 3N hydrochloric acid and saturated aqueous solution of sodium bicarbonate, and dried over anhydrous sodium sulfate. The solvent was distilled off under reduced pressure to give 6.60 g of 2,3-difluoro-4-(trans-4-propylcyclohexyl)phenyl 4-ethoxy-2,3-difluorobenzoate (m).

Second Step 6.60 g of the benzoate (m) obtained in First Step, 12.2 g of Lawesson's reagent and 70 mL of mesitylene were added in a 300 mL three-neck flask replaced inside by nitrogen, and refluxed under heat for 6 hours. After cooling to room temperature, organic layer was separated. Aqueous layer was extracted in toluene, the organic layer combined were washed with saturated aqueous solution of sodium bicarbonate and dried over anhydrous sodium sulfate. The solvent was distilled off under reduced pressure to give 1.95 g of O-2,3-difluoro-4-(trans-4-propylcyclohexyl)phenyl 4-ethoxy-2,3-difluorothiobenzoate (n)

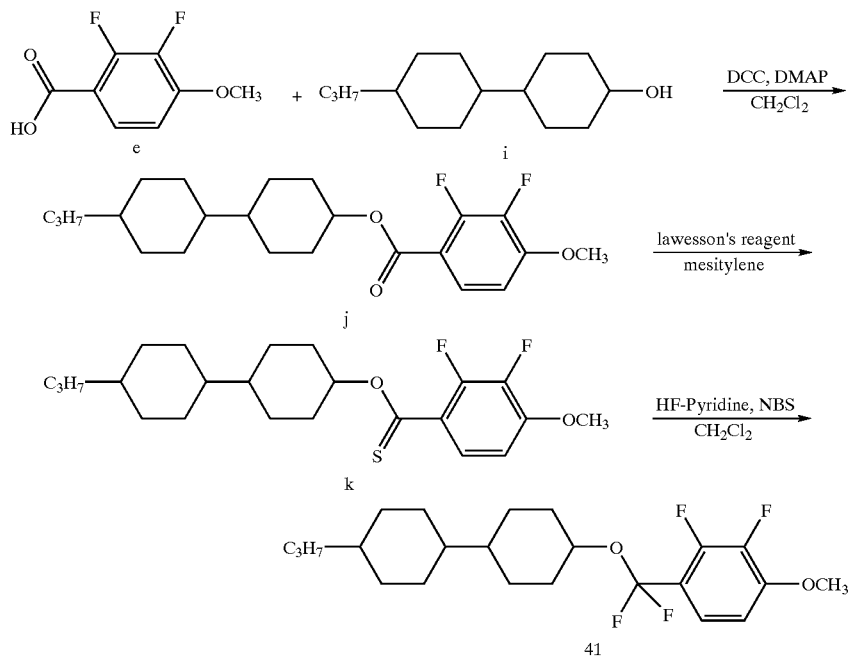

Third Step

In a 300 mL three-neck flask, 1.58 g of N-bromosuccinimide and 40 mL of methylene chloride were added and stirred at −60° C. under nitrogen atmosphere. 3.7 g of 70% hydrogen fluoride-pyridine was slowly added and stirred for 10 minutes at the same temperature. Then 1.73 g of the benzoate (n) obtained in Second Step dissolved in 20 mL of methylene chloride was slowly added dropwise and stirred for 3 hours at the same temperature. The reaction mixture was warmed to room temperature, saturated aqueous solution of sodium carbonate was added dropwise, and stirred overnight. After organic layer was separated, aqueous layer was extracted in methylene chloride. The organic layers were washed with saturated aqueous solution of sodium hydrogen sulfite, 3N hydrochloric acid and saturated aqueous solution of sodium bicarbonate, and dried over anhydrous sodium sulfate. The solvent was distilled off under reduced pressure to give 1.46 g of 2,3-difluoro-1-(4-(trans-4-propylcyclohexyl)-(2,3-difluorophenyloxy)difluoromethyl)-4-ethoxybenzene (76). The compound was colorless crystals having a nematic phase.

C 59.5° C. N 119° C. I.

1H-NMR (CDC13) δ: 7.43–7.40 (m, 1H), 7.11–7.09 (m, 1H), 6.97–6.95 (m, 1H), 6.79–6.76 (m, 1H), 4.19–4.15 (q, 2H), 2.84–2.79 (m, 1H), 1.88–1.86 (d, 4H), 1.50–1.20 (m, 11H), 1.11–1.05 (m, 2H), 0.92–0.89 (t, 3H).

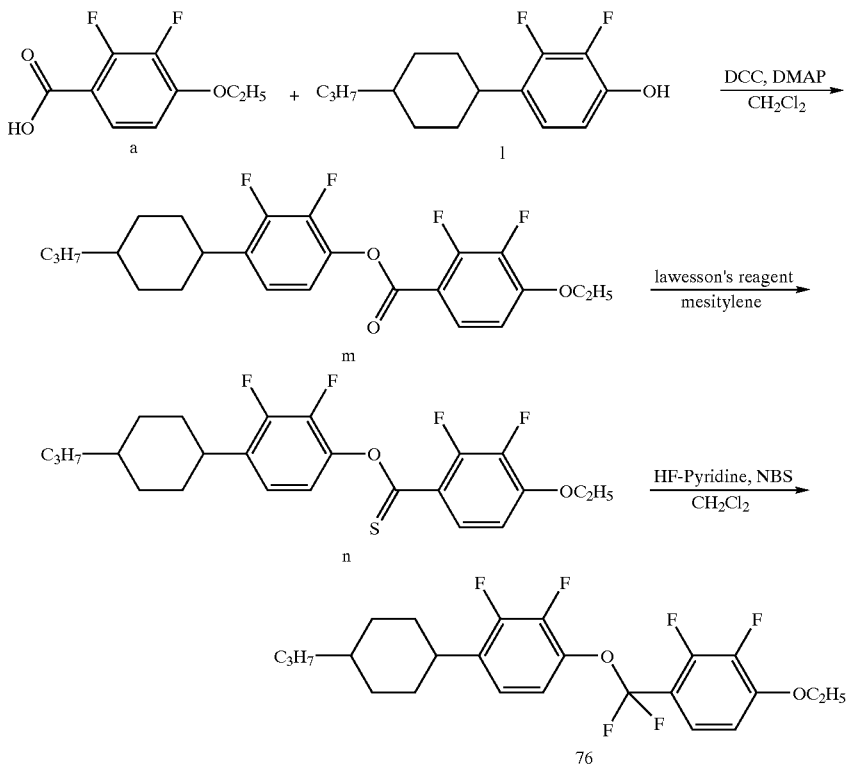

Compounds 1 to 220 can be synthesized in a similar manner.

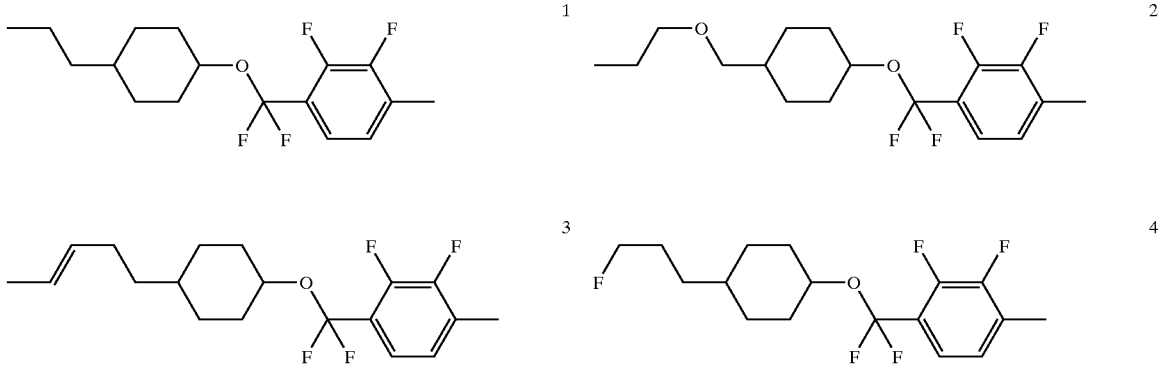

-continued
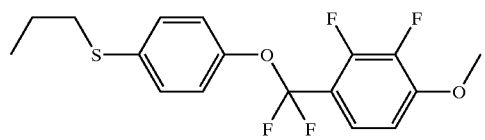  25
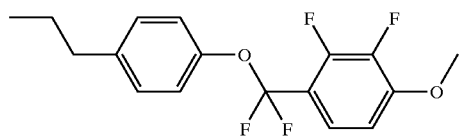  26
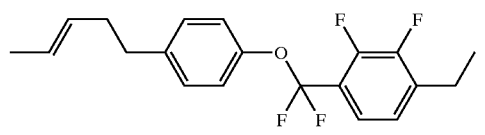  27
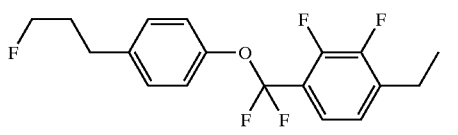  28
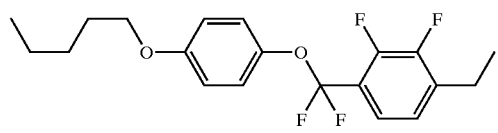  29
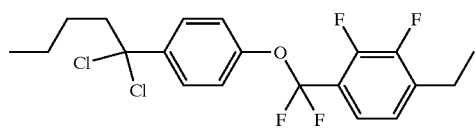  30
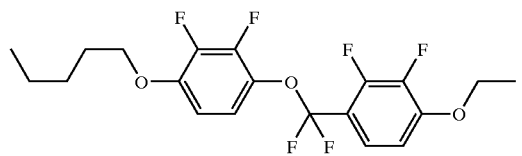  31
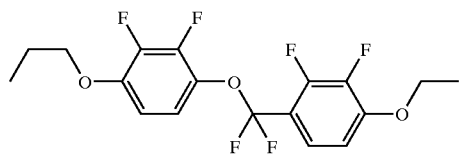  32
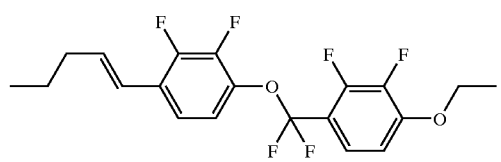  33
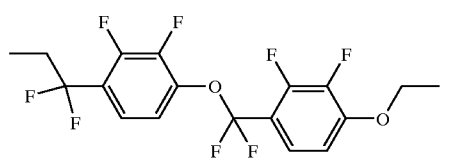  34
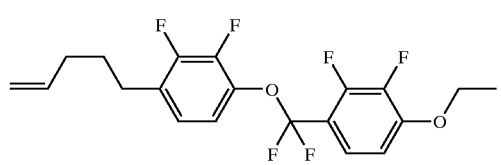  35
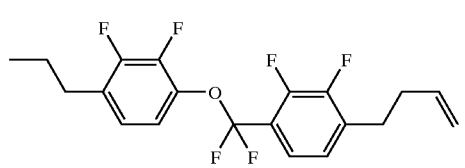  36
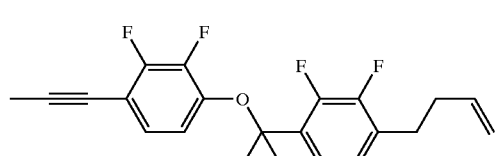  37
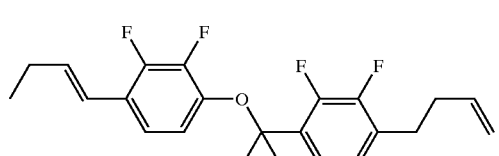  38
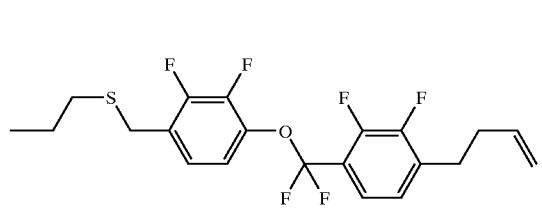  39
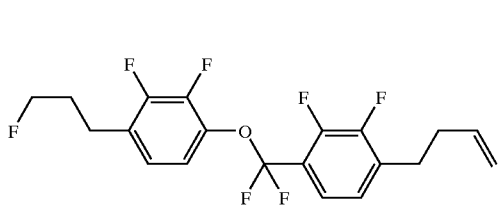  40
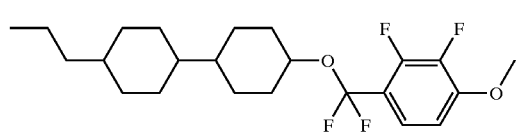  41
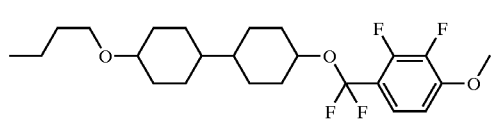  42
Δε = −2.22, Δn = 0.107
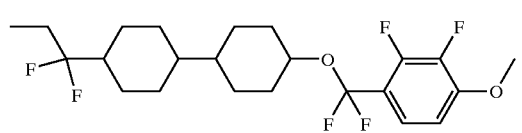  43
44

-continued
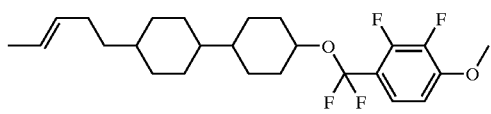 45
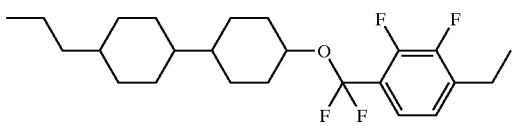 46
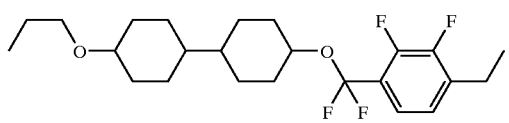 47
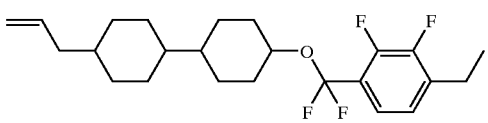 48
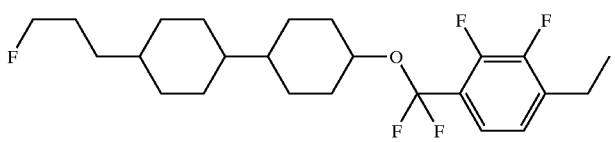 49
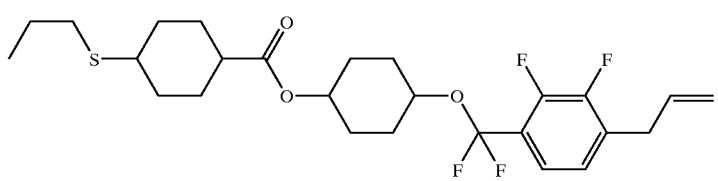 50
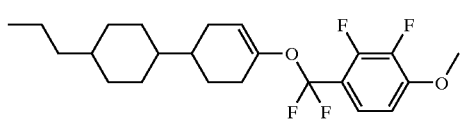 51
Δε = -4.18
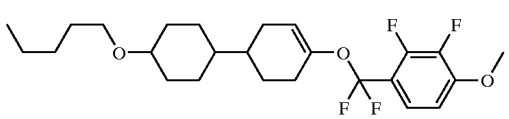 52
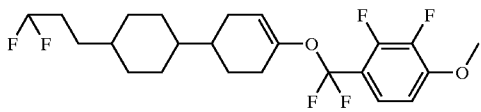 53
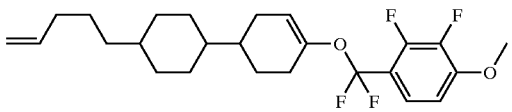 54
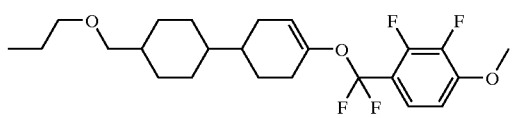 55
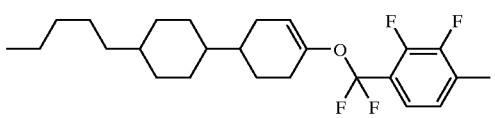 56
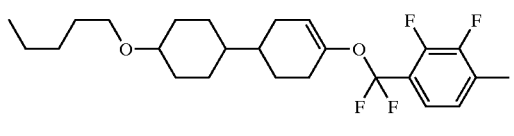 57
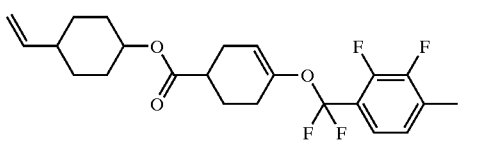 58
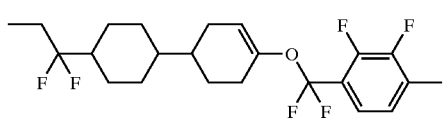 59
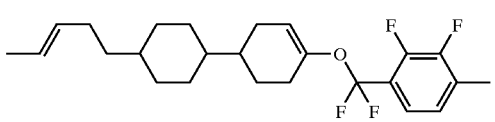 60
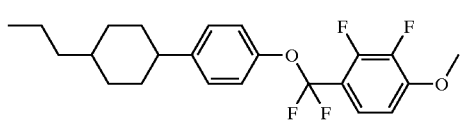 61
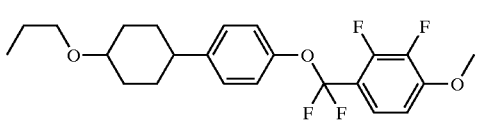 62
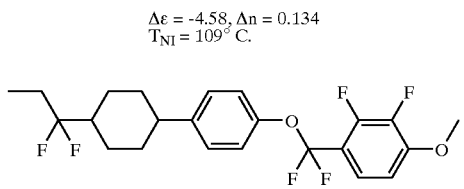 63
Δε = -4.58, Δn = 0.134
$T_{NI}$ = 109° C.
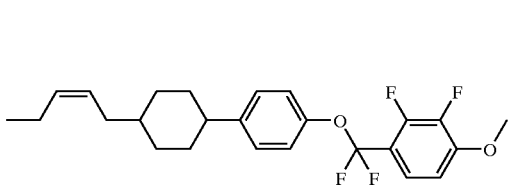 64

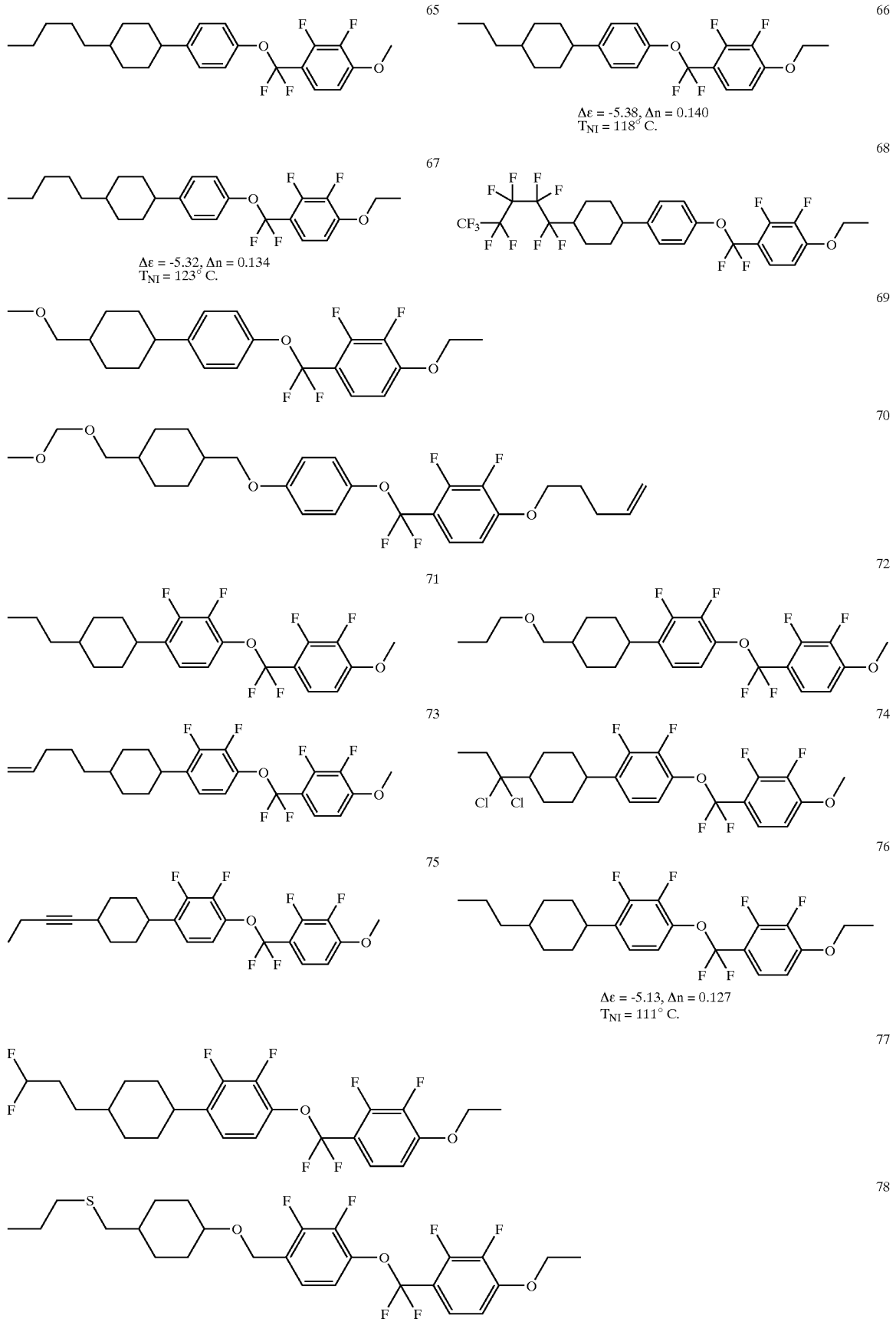

-continued
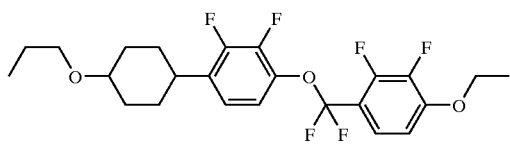  79
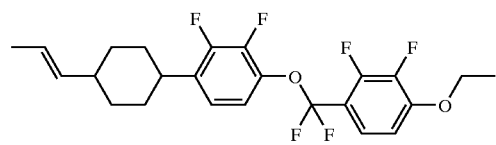  80
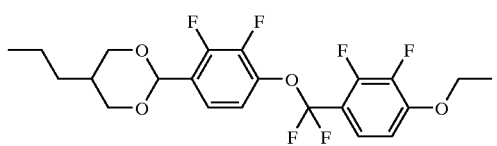  81
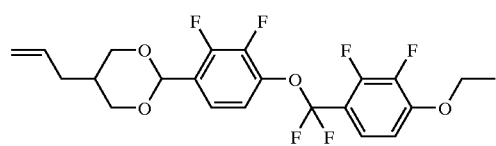  82
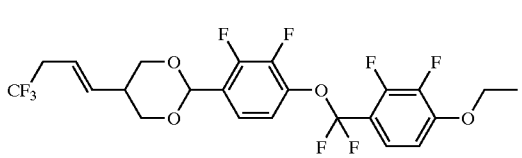  83
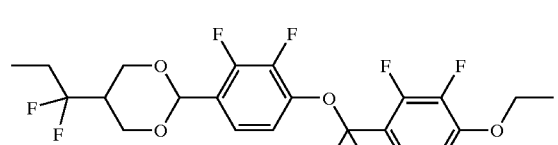  84
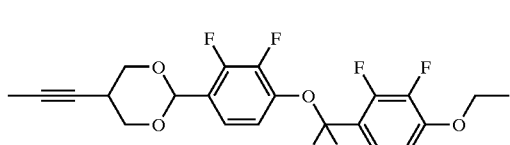  85
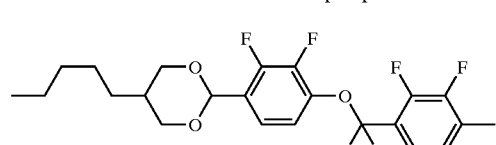  86
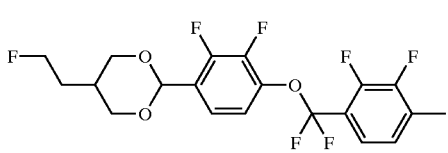  87
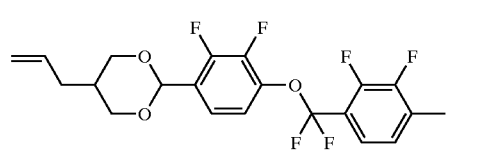  88
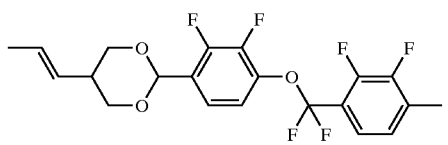  89
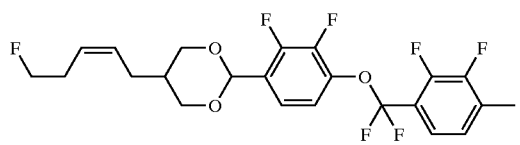  90
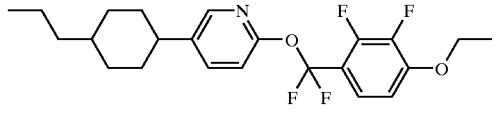  91
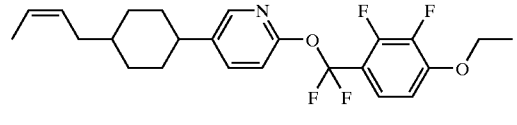  92
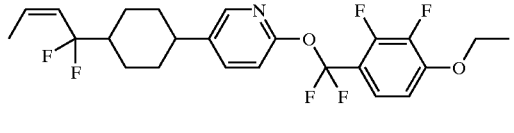  93
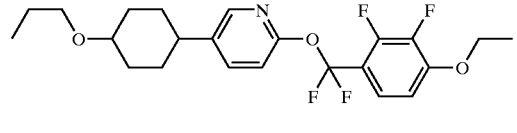  94
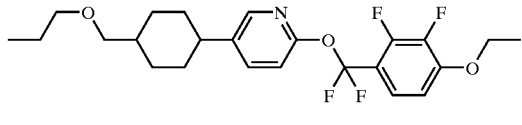  95
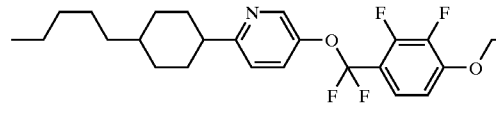  96
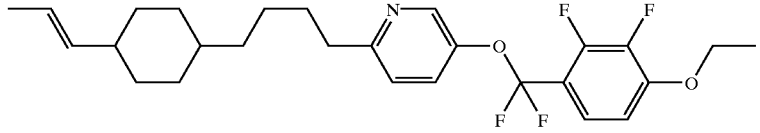  97
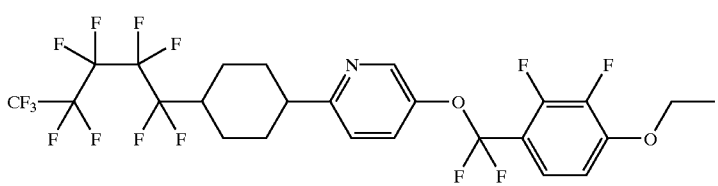  98

-continued
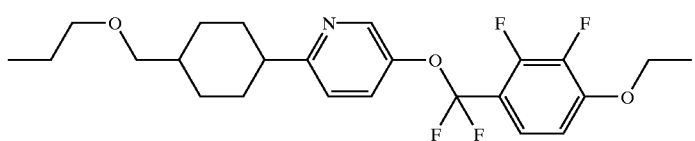
99
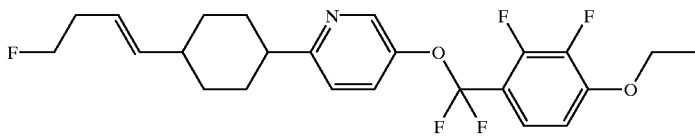
100
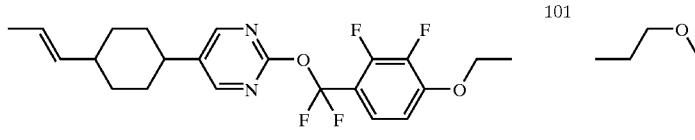
101
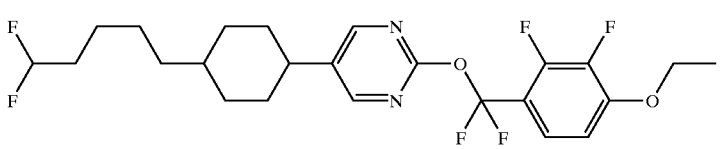
103
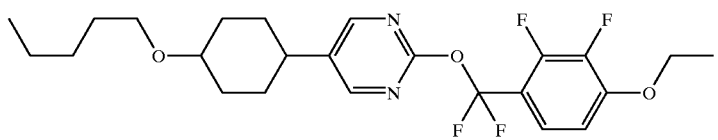
104
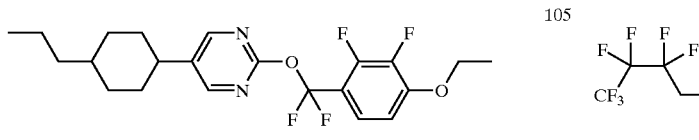
105
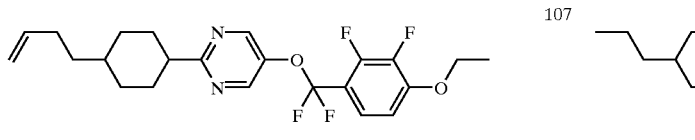
107
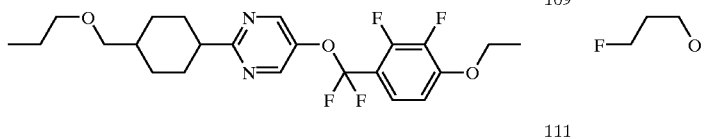
109
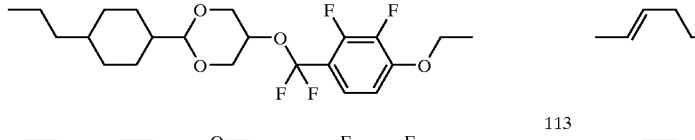
111
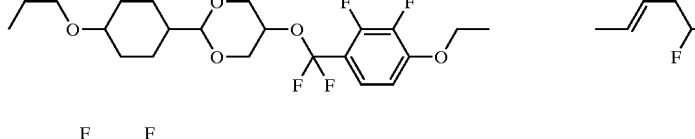
113
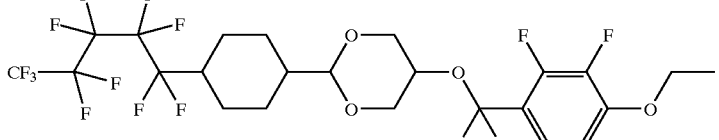
115

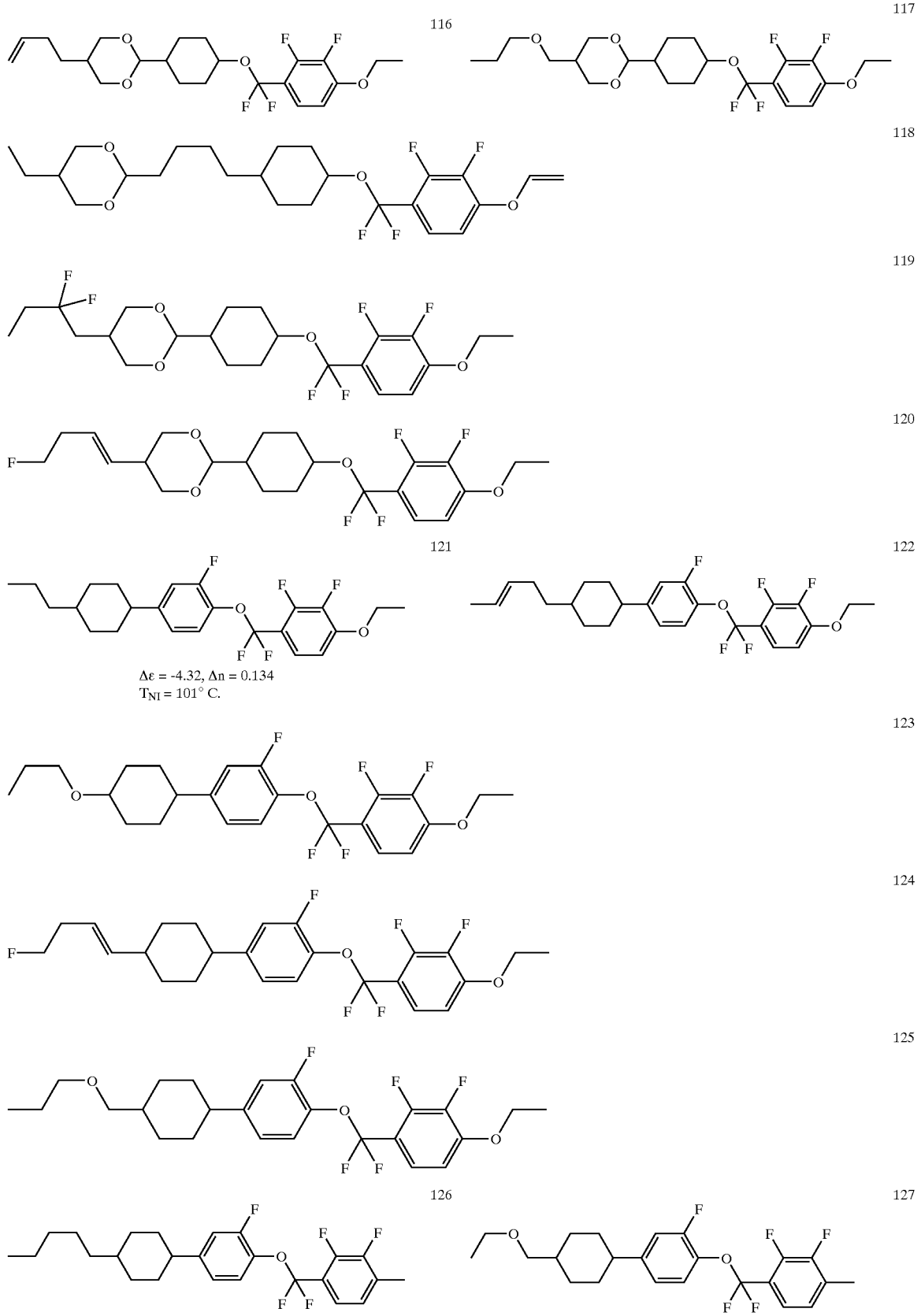

-continued
128
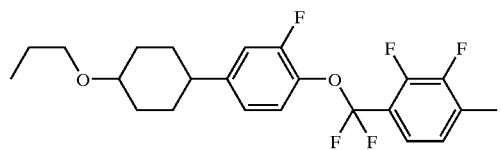
129
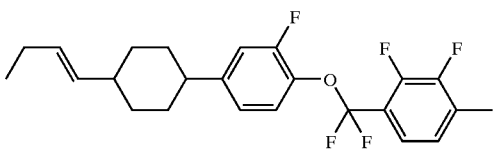
130
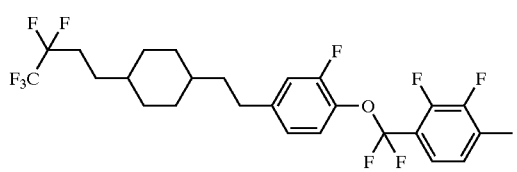
131
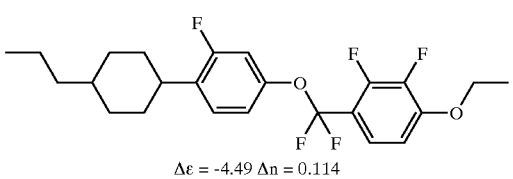
Δε = -4.49 Δn = 0.114
$T_{NI}$ = 80.6° C.
132
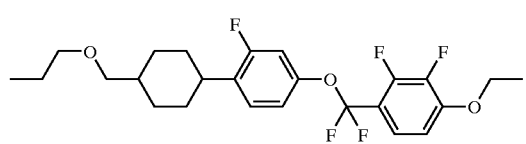
133
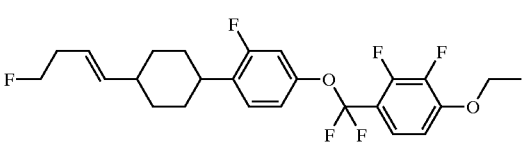
134
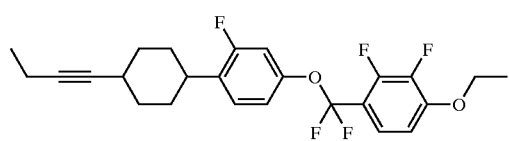
135
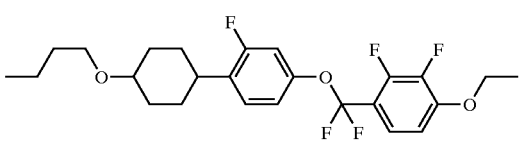
136
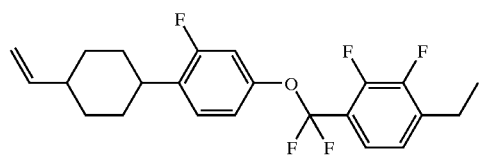
137
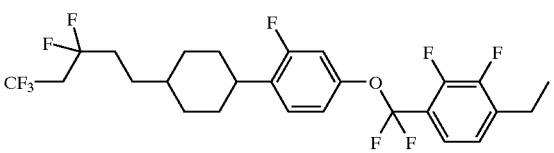
138
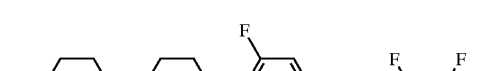
139
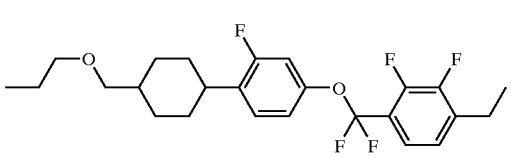
140
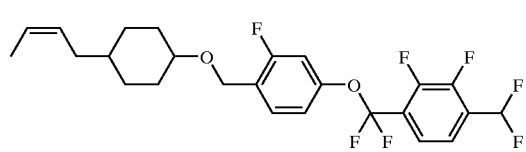
141
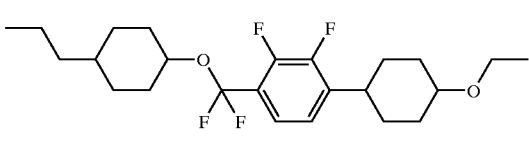
142
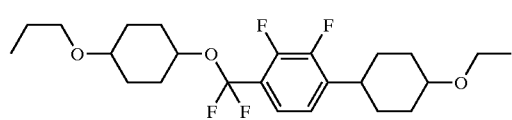
143
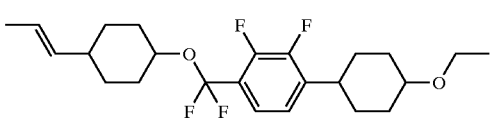
144
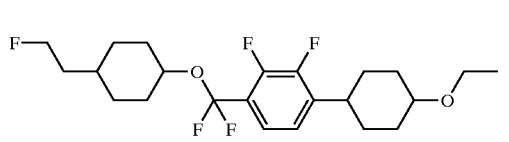
145
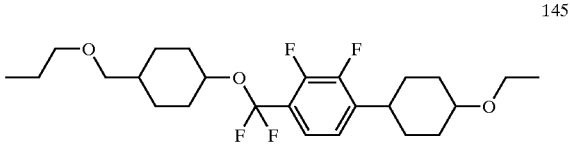
146
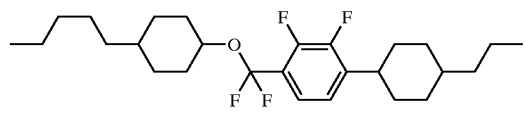
147
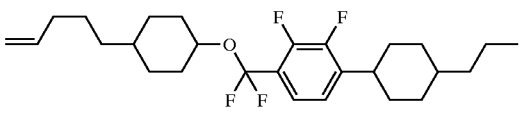

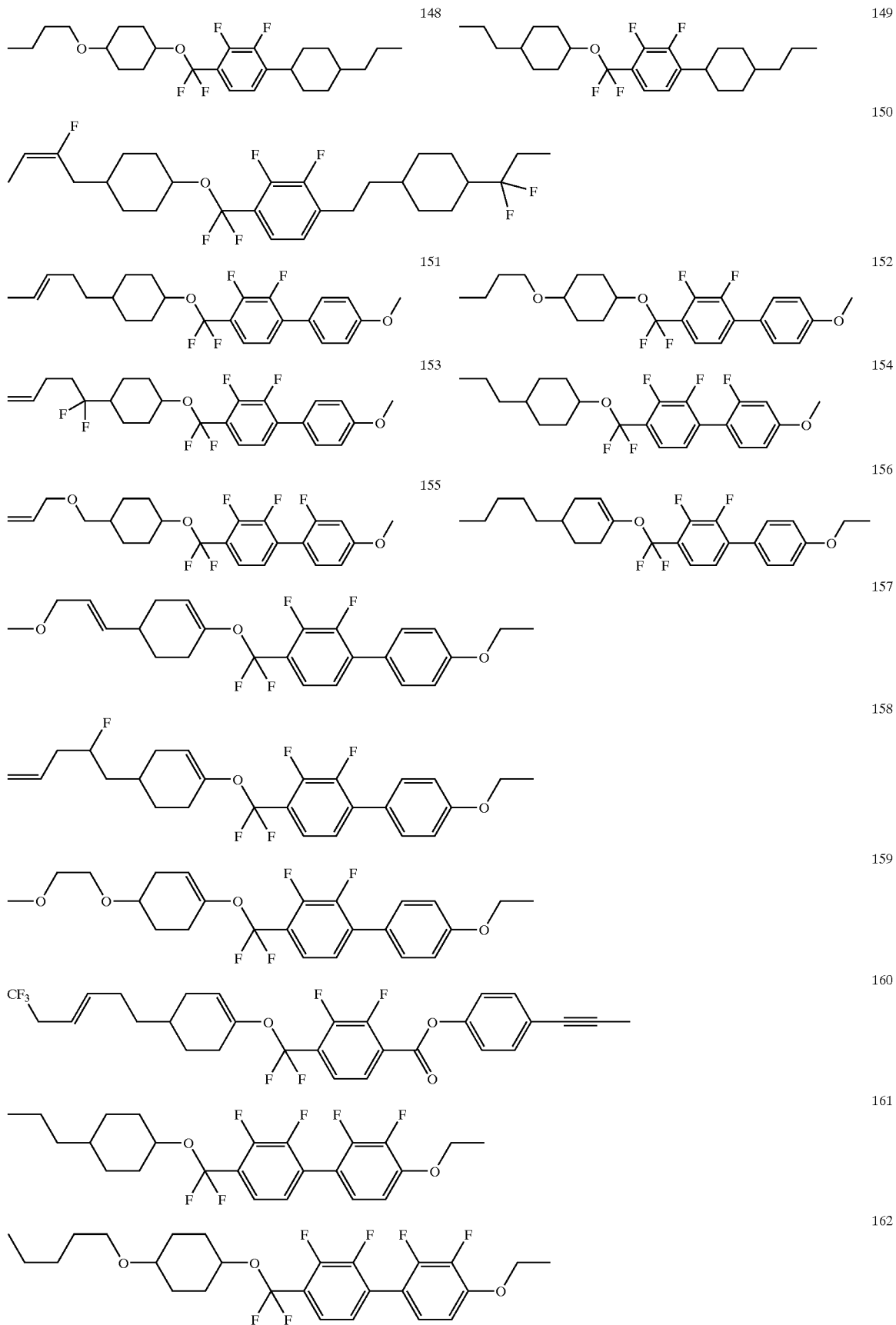

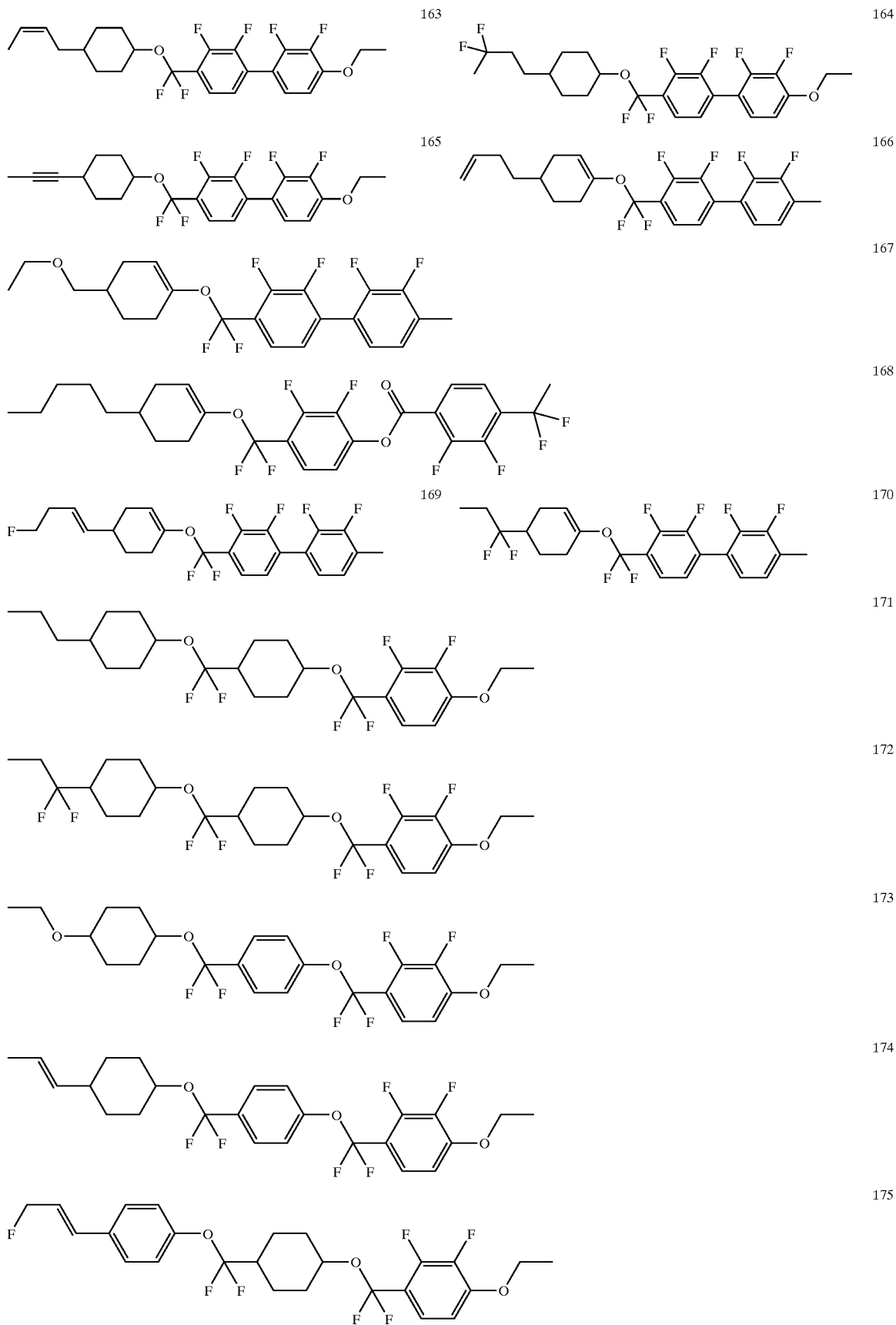

176
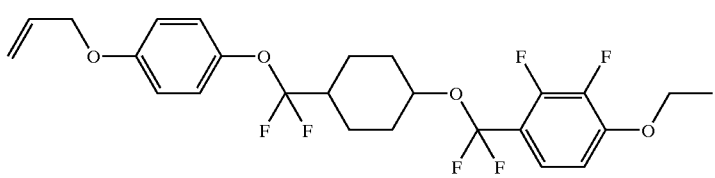
177
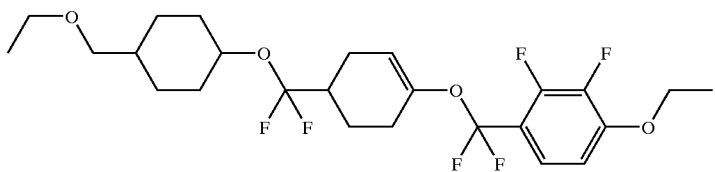
178
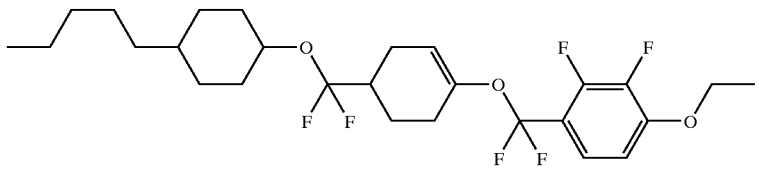
179
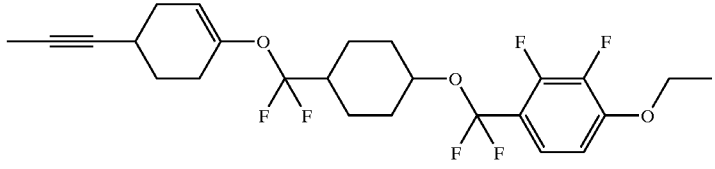
180
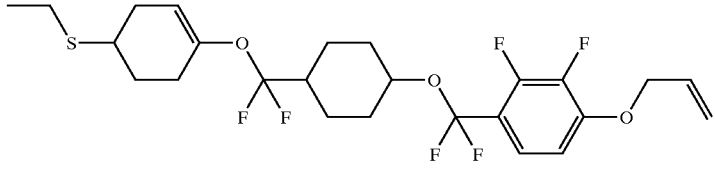
181
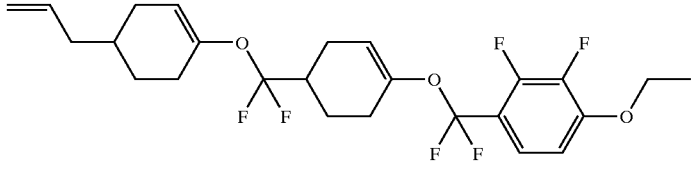
182
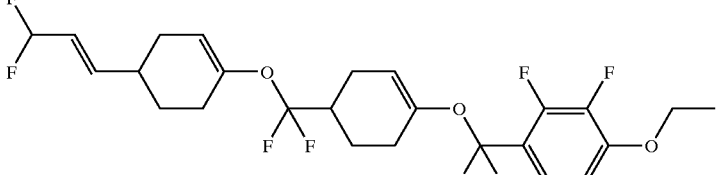
183
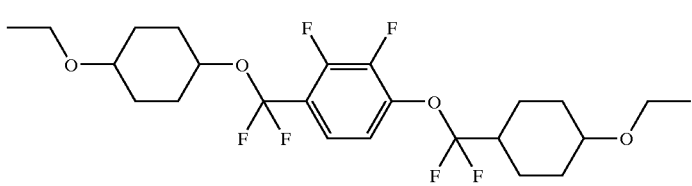
184
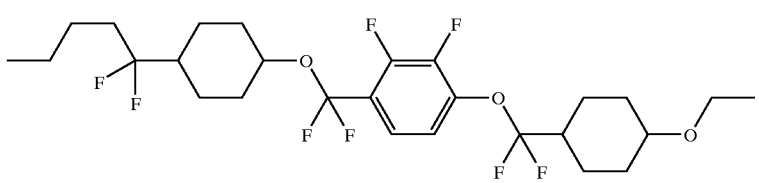

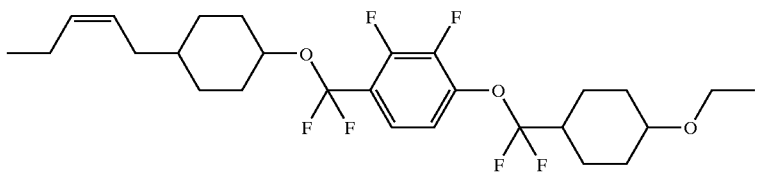
185
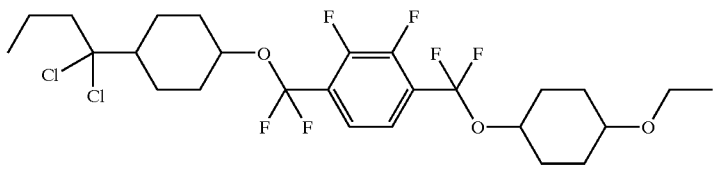
186
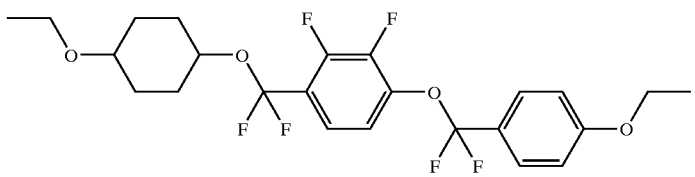
187
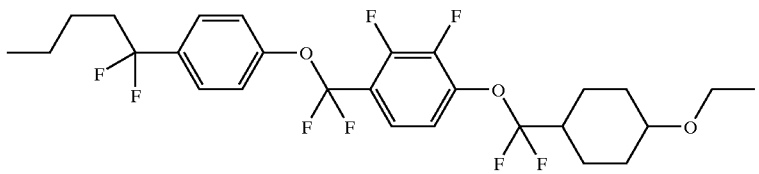
188
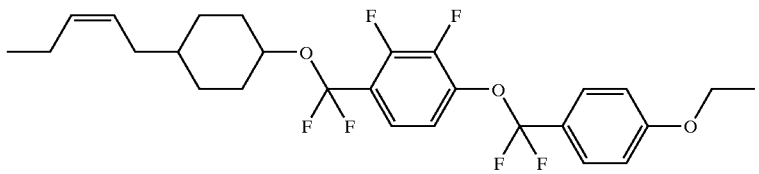
189
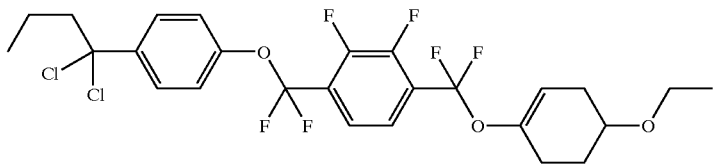
190
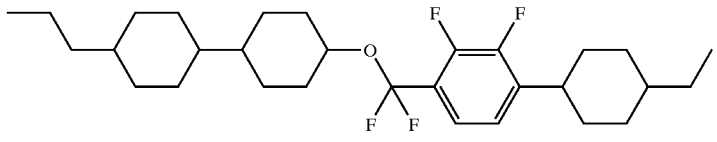
191
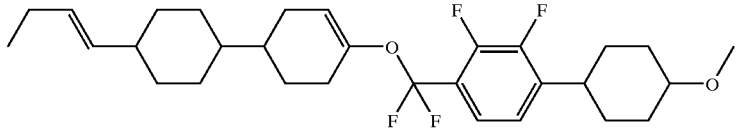
192
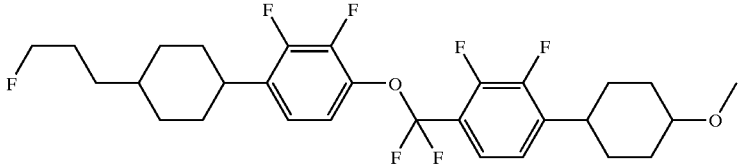
193

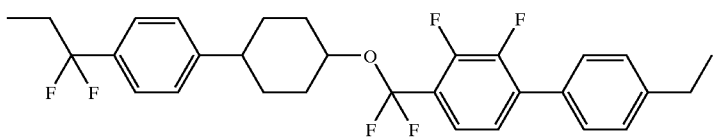
194
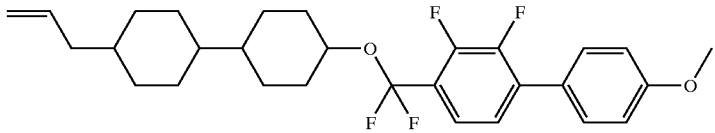
195
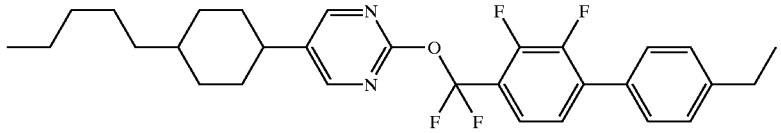
196
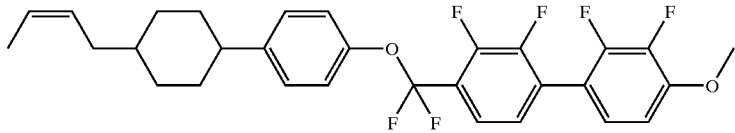
197
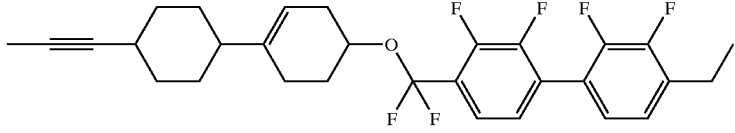
198
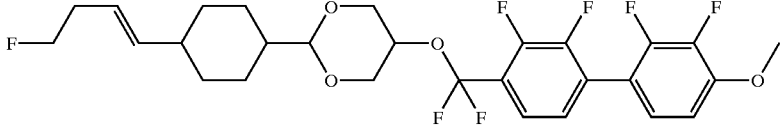
199
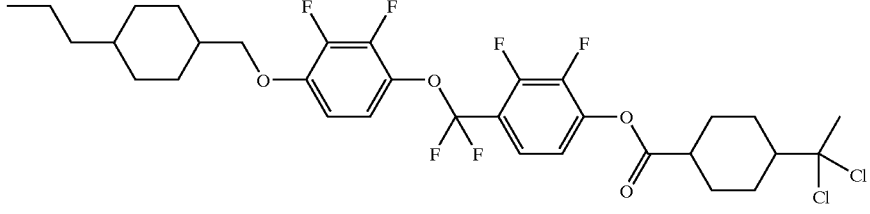
200
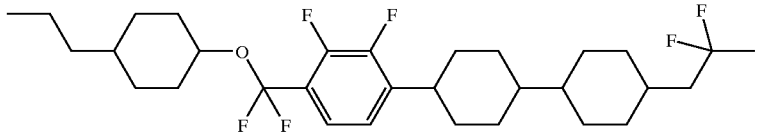
201
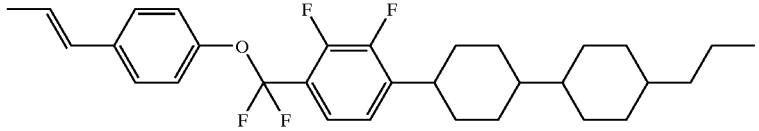
202
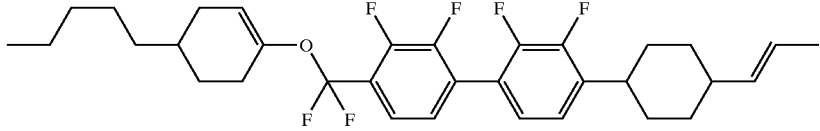
203

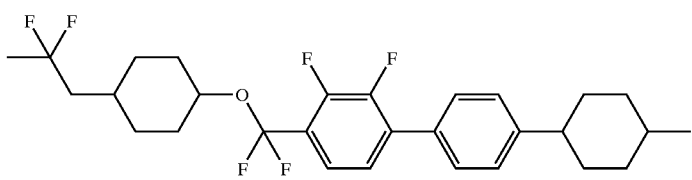
204
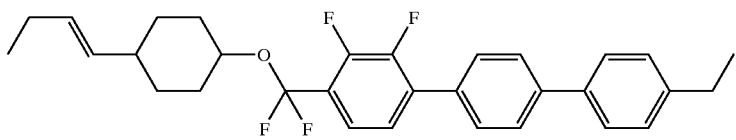
205
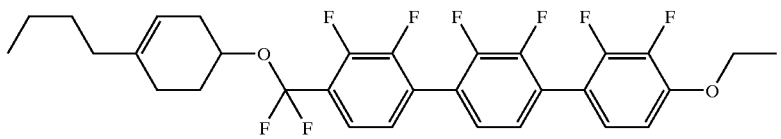
206
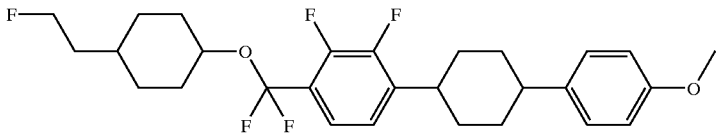
207
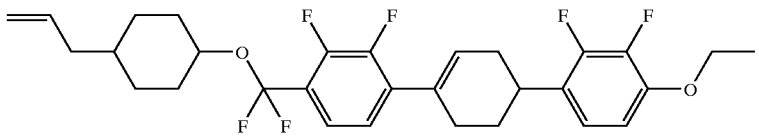
208
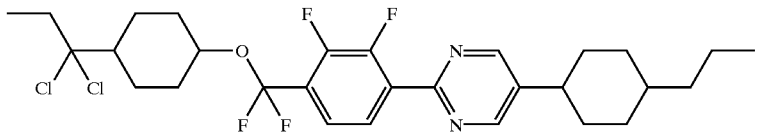
209
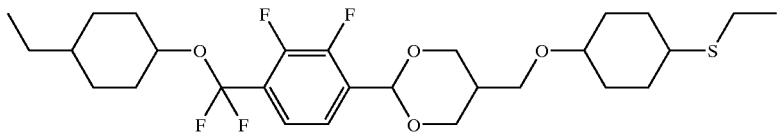
210
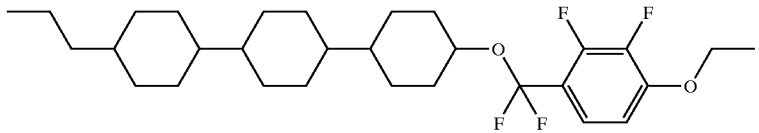
211
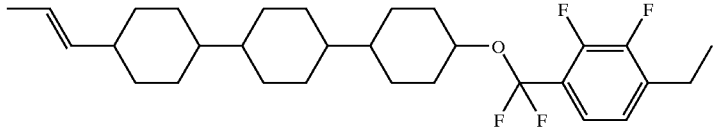
212
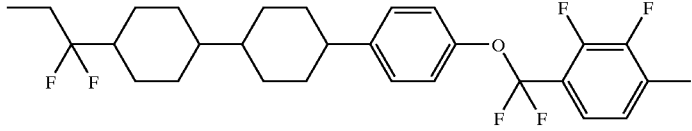
213
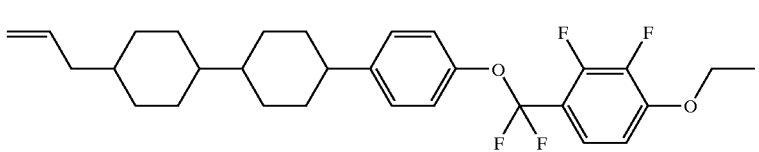
214

-continued

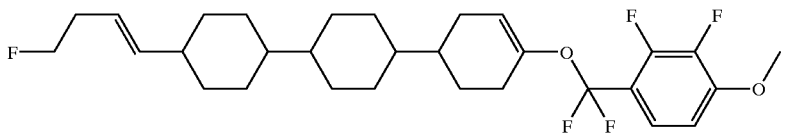

215

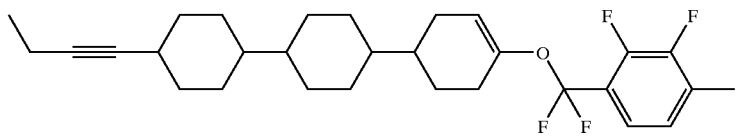

216

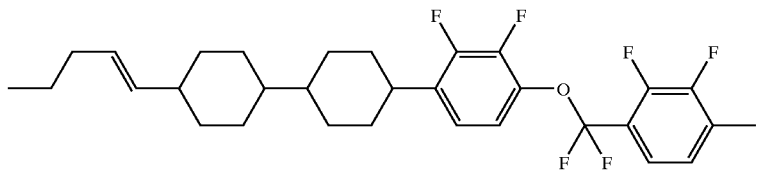

217

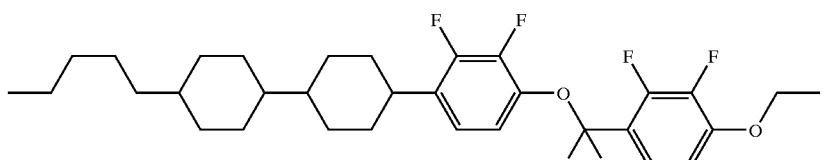

218

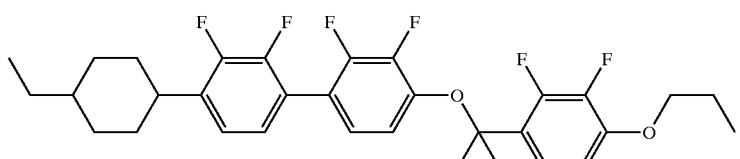

219

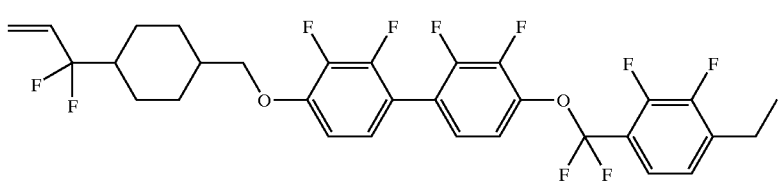

220

As examples of the liquid crystal compositions of this invention prepared as described above, the following examples of composition (Use Examples) 1 to 20 can be illustrated.

Here, each compound in the Use Examples is expressed by the symbols of a left side terminal group, a bonding group, a ring structure, and a right side terminal group, according to the definitions shown in Table 1. The amount of compound means % by weight unless otherwise noted.

Characteristics data of exemplified compositions are shown by TNI (nematic-isotropic liquid transition temperature or a clearing point), η (viscosity: measured at 20.0° C.), Δn (an optical anisotropy value: measured at 25.0° C.), Δ∈ (a dielectric anisotropy value: measured at 25.0° C.), and Vth (threshold voltage: measured at 25.0° C.).

TABLE 1

Method for Designating Compounds by Using Symbols
$R\text{-}(A_1)\text{-}Z_1\text{-}\ldots\text{-}Z_n\text{-}(A_n)\text{-}X$

| 1) Left side terminal group R- | Symbol |
|---|---|
| $C_nH_{2n+1}$— | n- |
| $C_nH_{2n+1}O$— | nO— |

TABLE 1-continued

Method for Designating Compounds by Using Symbols
$R\text{-}(A_1)\text{-}Z_1\text{-}\ldots\text{-}Z_n\text{-}(A_n)\text{-}X$

| | |
|---|---|
| $C_nH_{2n+1}OC_mH_{2m}$— | nOm- |
| $CH_2\!=\!CH$— | V— |
| $CH_2\!=\!CHC_nH_{2n}$— | Vn- |
| $C_nH_{2n+1}CH\!=\!CH$— | nV— |
| $C_nH_{2n+1}CH\!=\!CHC_mH_{2m}$— | nVm- |
| $C_nH_{2n+1}CH\!=\!CHC_mH_{2m}CH\!=\!CHC_kH_{2k}$— | nVmVk- |

| 2) Ring structure -(A$_1$)-, -(A$_n$)- | Symbol |
|---|---|
| 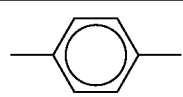 | B |
| 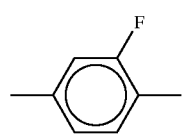 | B(F) |

TABLE 1-continued

Method for Designating Compounds by Using Symbols
R-(A$_1$)-Z$_1$- . . . -Z$_n$-(A$_n$)-X

| Structure | Symbol |
|---|---|
| (benzene with F at one position) | B(2F) |
| (benzene with 2F, 3F) | B(2F,3F) |
| (benzene with 2F, 5F) | B(2F,5F) |
| (benzene with 2CN, 3CN) | B(2CN,3CN) |
| (benzene with F,F,F) | B(F,F) |
| (cyclohexane) | H |
| (dioxane) | G |
| (cyclohexene) | ch |

3) Bonding group -Z$_1$-, -Z$_n$-    Symbol

| Group | Symbol |
|---|---|
| —C$_2$H$_4$— | 2 |
| —C$_4$H$_8$— | 4 |
| —COO— | E |
| —C≡C— | T |
| —CH=CH— | V |
| —CF$_2$O— | CF2O |
| —OCF$_2$— | OCF2 |

4) Right side terminal group -X    Symbol

| Group | Symbol |
|---|---|
| —F | —F |
| —Cl | -CL |
| —CN | —C |
| —CF$_3$ | —CF3 |
| —OCF$_3$ | —OCF3 |
| —OCF$_2$H | —OCF2H |
| —C$_n$H$_{2n+1}$ | -n |
| —OC$_n$H$_{2n+1}$ | —On |
| —COOCH$_3$ | -EMe |

TABLE 1-continued

Method for Designating Compounds by Using Symbols
R-(A$_1$)-Z$_1$- . . . -Z$_n$-(A$_n$)-X

| Group | Symbol |
|---|---|
| —C$_n$H$_{2n}$CH=CH$_2$ | -nV |
| —C$_m$H$_{2m}$CH=CHC$_n$H$_{2n+1}$ | -mVn |
| —C$_m$H$_{2m}$CH=CHC$_n$H$_{2n}$F | -mVnF |
| —CH=CF$_2$ | —VFF |
| —C$_n$H$_{2n}$CH=CF$_2$ | -nVFF |

5) Example of designation

Example 1    3-H2B(F,F)B(F)—F (structure: C$_3$H$_7$—cyclohexane—C$_2$H$_4$—benzene(F,F)—benzene(F)—F)

Example 2    1V2—BEB(F,F)—C (structure: CH$_3$CH=CHCH$_2$CH$_2$—benzene—COO—benzene(F,F)—CN)

Example 3    3-HB(F)TB-2

(structure: C$_3$H$_7$—cyclohexane—benzene(F)—C≡C—benzene—C$_2$H$_5$)

Use Example 1

| Compound | % |
|---|---|
| 3-HBOCF2B(2F,3F)—O2 | 7.0% |
| 5-HBOCF2B(2F,3F)—O2 | 7.0% |
| 3-HBOCF2B(2F,3F)—O1 | 7.0% |
| 5-HBOCF2B(2F,3F)—O1 | 7.0% |
| 4-HEB—O2 | 20.0% |
| 5-HEB—O1 | 20.0% |
| 3-HEB—O2 | 18.0% |
| 5-HEB—O2 | 14.0% |

$T_{NI}$ = 91.1(° C.)
η = 27.3 (mPa · s)
Δn = 0.10

Use Example 2

| Compound | % |
|---|---|
| 3-HB(2F,3F)OCF2B(2F,3F)—O2 | 5.0% |
| 5-HB(2F,3F)OCF2B(2F,3F)—O2 | 5.0% |
| 3-HB(2F,3F)OCF2B(2F,3F)-1 | 5.0% |
| 3-HH-2 | 5.0% |
| 3-HH-4 | 6.0% |
| 3-HH—O1 | 4.0% |
| 3-HH—O3 | 5.0% |
| 5-HH—O1 | 4.0% |
| 3-HB(2F,3F)—O2 | 12.0% |
| 5-HB(2F,3F)—O2 | 11.0% |
| 3-HHB(2F,3F)—O2 | 14.0% |

Use Example 3

| | |
|---|---|
| 3-HHB(2F,3F)-2 | 24.0% |

$T_{NI} = 76.5(°C.)$
$\Delta n = 0.081$
$\Delta\epsilon = -3.8$

Use Example 4

| | |
|---|---|
| 3-BOCF2B(2F,3F)—O2 | 5.0% |
| 5-BOCF2B(2F,3F)—O2 | 5.0% |
| 3-HH-5 | 5.0% |
| 3-HH-4 | 5.0% |
| 3-HH—O1 | 6.0% |
| 3-HH—O3 | 6.0% |
| 3-HB—O1 | 5.0% |
| 3-HB—O2 | 5.0% |
| 3-HB(2F,3F)—O2 | 10.0% |
| 3-HHB(2F,3F)—O2 | 12.0% |
| 5-HHB(2F,3F)—O2 | 13.0% |
| 3-HHB(2F,3F)-2 | 4.0% |
| 2-HHB(2F,3F)-1 | 4.0% |
| 3-HHEH-3 | 5.0% |
| 3-HHEH-5 | 5.0% |
| 4-HHEH-3 | 5.0% |

Use Example 5

| | |
|---|---|
| 3-HchOCF2B(2F,3F)—O2 | 7.0% |
| 5-HchOCF2B(2F,3F)—O2 | 7.0% |
| 3-HchOCF2B(2F,3F)—O1 | 7.0% |
| 5-HchOCF2B(2F,3F)—O1 | 7.0% |
| 4-HEB—O2 | 20.0% |
| 5-HEB—O1 | 20.0% |
| 3-HEB—O2 | 18.0% |
| 5-HEB—O2 | 14.0% |

$T_{NI} = 84.8(°C.)$
$\eta = 27.9(mPa \cdot s)$
$\Delta n = 0.103$

Use Example 5

| | |
|---|---|
| 3-HBOCF2B(2F,3F)—O2 | 6.0% |
| 5-HBOCF2B(2F,3F)—O2 | 6.0% |
| 3-HBOCF2B(2F,3F)-1 | 6.0% |
| 5-HBOCF2B(2F,3F)-1 | 6.0% |
| 3-HH-2 | 5.0% |
| 3-HH-4 | 6.0% |
| 3-HH—O1 | 4.0% |
| 3-HH—O3 | 5.0% |
| 5-HH—O1 | 4.0% |
| 3-HB(2F,3F)—O2 | 12.0% |
| 5-HB(2F,3F)—O2 | 11.0% |
| 3-HHB(2F,3F)—O2 | 14.0% |
| 5-HHB(2F,3F)—O2 | 15.0% |

$T_{NI} = 86.3(°C.)$
$\Delta n = 0.088$
$\Delta\epsilon = -4.3$

Use Example 6

| | |
|---|---|
| 3-HchOCF2B(2F,3F)—O2 | 4.0% |
| 3-HchOCF2B(2F,3F)-1 | 4.0% |
| 5-HchOCF2B(2F,3F)-1 | 4.0% |
| 3-HH-5 | 5.0% |
| 3-HH-4 | 5.0% |
| 3-HH—O1 | 6.0% |
| 3-HH—O3 | 6.0% |
| 3-HB—O1 | 5.0% |
| 3-HB—O2 | 5.0% |
| 3-HB(2F,3F)—O2 | 10.0% |
| 5-HB(2F,3F)—O2 | 10.0% |
| 5-HHB(2F,3F)—O2 | 13.0% |
| 3-HHB(2F,3F)-2 | 4.0% |
| 2-HHB(2F,3F)-1 | 4.0% |
| 3-HHEH-3 | 5.0% |
| 3-HHEH-5 | 5.0% |
| 4-HHEH-3 | 5.0% |

$T_{NI} = 76.0(°C.)$
$\Delta n = 0.077$
$\Delta\epsilon = -3.0$

Use Example 7

| | |
|---|---|
| 3-HBOCF2B(2F,3F)—O1 | 4.0% |
| 5-HBOCF2B(2F,3F)—O1 | 4.0% |
| 3-HBOCF2B(2F,3F)-1 | 5.0% |
| 5-HBOCF2B(2F,3F)-1 | 5.0% |
| 3-HchOCF2B(2F,3F)—O2 | 5.0% |
| 5-HchOCF2B(2F,3F)—O2 | 5.0% |
| 4-HEB—O2 | 20.0% |
| 5-HEB—O1 | 20.0% |
| 3-HEB—O2 | 18.0% |
| 5-HEB—O2 | 14.0% |

$T_{NI} = 86.2(°C.)$
$\eta = 26.9(mPa \cdot s)$
$\Delta n = 0.103$

Use Example 8

| | |
|---|---|
| 3-HchOCF2B(2F,3F)—O1 | 6.0% |
| 5-HchOCF2B(2F,3F)—O1 | 6.0% |
| 3-HHOCF2B(2F,3F)—O1 | 6.0% |
| 5-HHOCF2B(2F,3F)-1 | 6.0% |
| 3-HH-2 | 5.0% |
| 3-HH-4 | 6.0% |
| 3-HH—O1 | 4.0% |
| 3-HH—O3 | 5.0% |
| 5-HH—O1 | 4.0% |
| 3-HB(2F,3F)—O2 | 12.0% |
| 5-HB(2F,3F)—O2 | 11.0% |
| 3-HHB(2F,3F)—O2 | 14.0% |
| 5-HHB(2F,3F)—O2 | 15.0% |

$T_{NI} = 84.2(°C.)$
$\Delta n = 0.082$
$\Delta\epsilon = -3.9$

Use Example 9

| | |
|---|---|
| 3-HHOCF2B(2F,3F)—O1 | 6.0% |
| 5-HHOCF2B(2F,3F)-1 | 6.0% |
| 3-HH-5 | 5.0% |
| 3-HH-4 | 5.0% |
| 3-HH—O1 | 6.0% |

-continued

| | |
|---|---|
| 3-HH—O3 | 6.0% |
| 3-HB—O1 | 5.0% |
| 3-HB—O2 | 5.0% |
| 3-HB(2F,3F)—O2 | 10.0% |
| 5-HB(2F,3F)—O2 | 10.0% |
| 5-HHB(2F,3F)—O2 | 13.0% |
| 3-HHB(2F,3F)-2 | 4.0% |
| 2-HHB(2F,3F)-1 | 4.0% |
| 3-HHEH-3 | 5.0% |
| 3-HHEH-5 | 5.0% |
| 4-HHEH-3 | 5.0% |

$T_{NI} = 79.5(°C.)$
$\Delta n = 0.075$
$\Delta\epsilon = -2.8$

Use Example 10

| | |
|---|---|
| 3-HBOCF2B(2F,3F)—O1 | 7.0% |
| 5-HBOCF2B(2F,3F)—O1 | 7.0% |
| 3-HBOCF2B(2F,3F)-1 | 7.0% |
| 5-HBOCF2B(2F,3F)-1 | 7.0% |
| 3-HchOCF2B(2F,3F)—O2 | 7.0% |
| 5-HchOCF2B(2F,3F)—O2 | 7.0% |
| 4-HEB—O2 | 20.0% |
| 5-HEB—O1 | 20.0% |
| 3-HEB—O2 | 18.0% |

$T_{NI} = 89.8(°C.)$
$\eta = 31.5(mPa \cdot s)$
$\Delta n = 0.113$

Use Example 11

| | |
|---|---|
| 3-BOCF2B(2F,3F)—O2 | 4.0% |
| 5-BOCF2B(2F,3F)—O2 | 4.0% |
| 3-BOCF2B(2F,3F)-1 | 4.0% |
| 3-HH-2 | 5.0% |
| 3-HH-4 | 6.0% |
| 3-HH—O1 | 4.0% |
| 3-HH—O3 | 5.0% |
| 5-HH—O1 | 4.0% |
| 5-HB(2F,3F)—O2 | 11.0% |
| 3-HHB(2F,3F)—O2 | 14.0% |
| 5-HHB(2F,3F)—O2 | 15.0% |
| 3-HHB(2F,3F)-2 | 24.0% |

Use Example 12

| | |
|---|---|
| 3-HBOCF2B(2F,3F)—O2 | 4.0% |
| 3-HBOCF2B(2F,3F)—O1 | 4.0% |
| 3-HBOCF2B(2F,3F)-1 | 4.0% |
| 3-HH-5 | 5.0% |
| 3-HH-4 | 5.0% |
| 3-HH—O1 | 6.0% |
| 3-HH—O3 | 6.0% |
| 3-HB—O1 | 5.0% |
| 3-HB—O2 | 5.0% |
| 3-HB(2F,3F)—O2 | 10.0% |
| 5-HB(2F,3F)—O2 | 10.0% |
| 5-HHB(2F,3F)—O2 | 13.0% |
| 3-HHB(2F,3F)-2 | 4.0% |
| 2-HHB(2F,3F)-1 | 4.0% |
| 3-HHEH-3 | 5.0% |
| 3-HHEH-5 | 5.0% |
| 4-HHEH-3 | 5.0% |

$T_{NI} = 79.3(°C.)$

-continued $\Delta n = 0.079$
$\Delta\epsilon = -3.2$

Use Example 13

| | |
|---|---|
| 3-chOCF2B(2F,3F)B(2F,3F)—O2 | 4.0% |
| 3-BOCF2B(2F,3F)B(2F,3F)—O2 | 4.0% |
| 3-HchOCF2B(2F,3F)-1 | 4.0% |
| 5-HchOCF2B(2F,3F)—O1 | 4.0% |
| 3-BB(2F,3F)—O2 | 12.0% |
| 3-BB(2F,3F)—O4 | 10.0% |
| 5-BB(2F,3F)—O4 | 10.0% |
| 2-BB(2F,3F)B-3 | 25.0% |
| 3-BB(2F,3F)B-5 | 13.0% |
| 5-BB(2F,3F)B-5 | 14.0% |

Use Example 14

| | |
|---|---|
| 3-HOCF2B(2F,3F)B(2F,3F)—O2 | 4.0% |
| 3-HB(2F,3F)OCF2B(2F,3F)—O2 | 4.0% |
| 3-HB—O2 | 10.0% |
| 5-HB-3 | 8.0% |
| 5-BB(2F,3F)—O2 | 10.0% |
| 3-HB(2F,3F)—O2 | 10.0% |
| 5-HB(2F,3F)—O2 | 8.0% |
| 3-HHB(2F,3F)—O2 | 12.0% |
| 5-HHB(2F,3F)—O2 | 4.0% |
| 5-HHB(2F,3F)-1O1 | 4.0% |
| 2-HHB(2F,3F)-1 | 5.0% |
| 3-HHB(2F,3F)-1 | 5.0% |
| 3-HBB-2 | 6.0% |
| 5-B2BB(2F,3F)—O2 | 10.0% |

Use Example 15

| | |
|---|---|
| 3-HchOCF2B(2F,3F)—O1 | 5.0% |
| 1V2-BEB(F,F)—C | 5.0% |
| 3-HB—C | 20.0% |
| V2-HB—C | 6.0% |
| 1-BTB-3 | 5.0% |
| 2-BTB-1 | 10.0% |
| 1O1-HH-3 | 3.0% |
| 3-HH-4 | 11.0% |
| 3-HHB-1 | 11.0% |
| 3-HHB-3 | 3.0% |
| 3-H2BTB-2 | 4.0% |
| 3-H2BTB-3 | 4.0% |
| 3-H2BTB-4 | 4.0% |
| 3-HB(F)TB-2 | 6.0% |
| 3-HHB—C | 3.0% |

$T_{NI} = 86.6(°C.)$
$\eta = 16.1(mPa \cdot s)$
$\Delta n = 0.156$
$\Delta\epsilon = 6.7$
$V_{th} = 2.36(V)$ Pitch was 11.2 μm when 0.8 part by weight of CM33 was added to 100 parts by weight of the composition above.

Use Example 16

| | |
|---|---|
| 3-HBOCF2B(2F,3F)—O2 | 5.0% |
| 2O1-BEB(F)—C | 5.0% |
| 3O1-BEB(F)—C | 12.0% |
| 5O1-BEB(F)—C | 4.0% |
| 1V2-BEB(F,F)—C | 10.0% |
| 3-HEB—O4 | 4.0% |
| 3-HH—EMe | 6.0% |
| 3-HB—O2 | 18.0% |
| 7-HEB—F | 2.0% |
| 3-HHEB—F | 2.0% |
| 5-HHEB—F | 2.0% |
| 3-HBEB—F | 4.0% |
| 2O1-HBEB(F)—C | 2.0% |
| 3-HB(F)EB(F)—C | 2.0% |
| 3-HB(F)EB(F,F)—C | 2.0% |
| 3-HHB—F | 4.0% |
| 3-HHB—O1 | 4.0% |
| 3-HHB-3 | 4.0% |
| 3-HEBEB—F | 2.0% |
| 3-HEBEB-1 | 2.0% |
| 3-HHB(F)—C | 4.0% |
| $T_{NI} = 75.3(° C.)$ | |
| $\eta = 37.9(mPa \cdot s)$ | |
| $\Delta n = 0.118$ | |
| $\Delta\epsilon = 23.9$ | |
| $V_{th} = 1.04(V)$ | |

Use Example 17

| | |
|---|---|
| 5-HBOCF2B(2F,3F)—O1 | 4.0% |
| 5-HBOCF2B(2F,3F)-1 | 4.0% |
| 1V2-BEB(F,F)—C | 6.0% |
| 3-HB—C | 18.0% |
| 2-BTB-1 | 10.0% |
| 5-HH—VFF | 30.0% |
| 1-BHH—VFF | 8.0% |
| 1-BHH-2VFF | 11.0% |
| 3-H2BTB-2 | 5.0% |
| 3-HHB-1 | 4.0% |
| $T_{NI} = 75.8(° C.)$ | |
| $\eta = 13.6(mPa \cdot s)$ | |
| $\Delta n = 0.122$ | |
| $\Delta\epsilon = 5.9$ | |
| $V_{th} = 2.29(V)$ | |

Use Example 18

| | |
|---|---|
| 3-HBOCF2B(2F,3F)—O2 | 5.0% |
| 5-HBOCF2B(2F,3F)—O2 | 5.0% |
| 7-HB(F)—F | 5.0% |
| 5-H2B(F)—F | 5.0% |
| 3-HB—O2 | 10.0% |
| 3-HH-4 | 5.0% |
| 2-HHB(F)—F | 10.0% |
| 3-HHB(F)—F | 10.0% |
| 3-H2HB(F)—F | 5.0% |
| 2-HBB(F)—F | 3.0% |
| 3-HBB(F)—F | 3.0% |
| 5-HBB(F)—F | 6.0% |
| 2-H2BB(F)—F | 5.0% |
| 3-H2BB(F)—F | 6.0% |
| 3-HHB-1 | 8.0% |
| 3-HHB—O1 | 5.0% |
| 3-HHB-3 | 4.0% |
| $T_{NI} = 89.2(° C.)$ | |
| $\eta = 20.2(mPa \cdot s)$ | |
| $\Delta n = 0.099$ | |
| $\Delta\epsilon = 2.2$ | |
| $V_{th} = 3.05(V)$ | |

Pitch was 76.3 μm when 0.3 part by weight of CN was added to 100 parts by weight of the composition above.

Use Example 19

| | |
|---|---|
| 3-HHOCF2B(2F,3F)—O1 | 5.0% |
| 7-HB(F,F)—F | 5.0% |
| 3-H2HB(F,F)—F | 12.0% |
| 4-H2HB(F,F)—F | 6.0% |
| 3-HHB(F,F)—F | 10.0% |
| 3-HBB(F,F)—F | 10.0% |
| 3-HHEB(F,F)—F | 10.0% |
| 4-HHEB(F,F)—F | 3.0% |
| 5-HHEB(F,F)—F | 3.0% |
| 2-HBEB(F,F)—F | 3.0% |
| 3-HBEB(F,F)—F | 5.0% |
| 5-HBEB(F,F)—F | 3.0% |
| 3-HGB(F,F)—F | 15.0% |
| 3-HBCF2OB—OCF3 | 4.0% |
| 3-HHBB(F,F)—F | 6.0% |
| $T_{NI} = 78.1(° C.)$ | |
| $\eta = 34.6(mPa \cdot s)$ | |
| $\Delta n = 0.086$ | |
| $\Delta\epsilon = 12.5$ | |
| $V_{th} = 1.57(V)$ | |

Use Example 20

| | |
|---|---|
| 5-HBOCF2B(2F,3F)—O1 | 5.0% |
| 5-HchOCF2B(2F,3F)—O1 | 5.0% |
| 2-HHB(F)—F | 2.0% |
| 3-HHB(F)—F | 2.0% |
| 5-HHB(F)—F | 2.0% |
| 2-HBB(F)—F | 6.0% |
| 3-HBB(F)—F | 6.0% |
| 2-H2BB(F)—F | 9.0% |
| 3-H2BB(F)—F | 9.0% |
| 3-HBB(F,F)—F | 25.0% |
| 5-HBB(F,F)—F | 19.0% |
| 1O1-HBBH-4 | 5.0% |
| 1O1-HBBH-5 | 5.0% |
| $T_{NI} = 96.8(° C.)$ | |
| $\eta = 37.0(mPa \cdot s)$ | |
| $\Delta n = 0.134$ | |
| $\Delta\epsilon = 6.0$ | |
| $V_{th} = 2.52(V)$ | |

Pitch was 78.4 μm when 0.2 part by weight of CM43L was added to 100 parts by weight of the composition above.

Liquid crystalline compounds of this invention have a negative and extremely large dielectric anisotropy value and a small optical anisotropy value at the same time. Further, the liquid crystalline compounds of this invention have good compatibility with other liquid crystal materials. Accordingly, the liquid crystal compositions having a low threshold voltage and a small optical anisotropy value can be realized by using the liquid crystalline compounds of this invention as a component of the liquid crystal compositions. Further, excellent liquid crystal display devices can be provided by using the composition.

The liquid crystalline compounds of this invention can preferably be used as a component of the liquid crystal compositions not only for IPS mode or VA mode but also for ECB (electrically controlled birefringence) mode or GH (guest-host) mode. They can also be preferably used as a component of liquid crystal compositions for TN (twisted nematic) mode, STN (super twisted nematic) mode and AM (active matrix) mode.

What is claimed is:

1. A liquid crystalline compound expressed by formula (1)

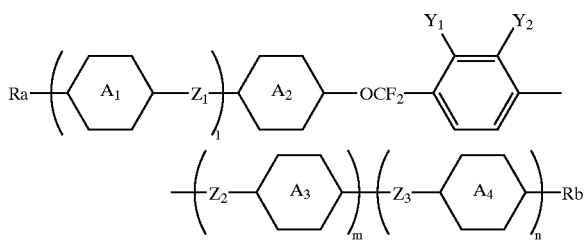

(1)

wherein Ra and Rb each independently represents a linear or branched alkyl having 1 to 10 carbon, any methylene in the alkyl may be replaced by —O—, —S—, —CH═CH—, or —C≡C—, but —O— is not successive, and any hydrogen in the alkyl may be replaced by halogen; rings $A_1$ to $A_4$ each independently represents trans-1,4-cyclohexylene, cyclohexene-1,4-diyl, pyridine-2,5-diyl, pyrimidine-2,5-diyl, or 1,4-phenylene, wherein at least one hydrogen in these rings may be replaced by halogen, and any nonadjacent methylene in cyclohexane ring may be replaced by —O—; $Y_1$ and $Y_2$ each independently represents F or Cl; $Z_1$, $Z_2$ and $Z_3$ each independently represents a single bond, —$CH_2CH_2$—, —$(CH_2)_4$—, —COO—, —OCO—, —$CH_2O$—, —$OCH_2$—, —$CF_2O$—, or —$OCF_2$—; and l, m and n each independently is 0, 1 or 2, and the sum of l+m+n is 3 or less;

provided that $A_2$ is not 2,3-difluoro-1,4-phenylene or 2-fluoro-1,4-phenylene when the sum of l+m+n is 2, and $A_2$ is not trans-1,4-cyclohexylene, 1,4-phenylene, 2-fluoro-1,4-phenylene, or 2,3-difluoro-1,4-phenylene when the sum of l+m+n is 0.

2. A liquid crystalline compound described in claim 1, wherein in formula (1), $Y_1$ and $Y_2$ are fluorine.

3. A liquid crystalline compound described in claim 1, wherein in formula (1), $Y_1$ and $Y_2$ are fluorine and ring $A_2$ is trans-1,4-cyclohexylene.

4. A liquid crystalline compound described in claim 1, wherein in formula (1), $Y_1$ and $Y_2$ are fluorine and ring $A_2$ is cyclohexene-1,4-diyl.

5. A liquid crystalline compound described in claim 1, wherein in formula (1), $Y_1$ and $Y_2$ are fluorine and ring $A_2$ is 1,4-phenylene in which hydrogen in the ring may be replaced by fluorine.

6. A liquid crystalline compound described in claim 1, wherein, in formula (1), l=1, m=n=0, ring $A_1$ and ring $A_2$ are trans-1,4-cyclohexylene, $Z_1$ is a single bond, and $Y_1$ and $Y_2$ are fluorine.

7. A liquid crystalline compound described in claim 1, wherein in formula (1), l=1, m=n=0, ring $A_1$ is trans-1,4-cyclohexylene, and ring $A_2$ is cyclohexene-1,4-diyl, $Z_1$ is a single bond, and $Y_1$ and $Y_2$ are fluorine.

8. A liquid crystalline compound described in claim 1, wherein in formula (1), l=1, m=n=0, ring $A_1$ is trans-1,4-cyclohexylene, ring $A_2$ is 1,4-phenylene in which hydrogen in the ring may be replaced by fluorine, $Z_1$ is a single bond, and $Y_1$ and $Y_2$ are fluorine.

9. A liquid crystalline compound described in claim 1, wherein in formula (1), l=n=0, m=1, ring $A_2$ is trans-1,4-cyclohexylene, $A_3$ is 1,4-phenylene in which hydrogen in the ring may be replaced by fluorine, $Z_2$ is a single bond, and $Y_1$ and $Y_2$ are fluorine.

10. A liquid crystalline compound described in claim 1, wherein in formula (1), l=n=0, m=1, ring $A_2$ is cyclohexene-1,4-diyl, ring $A_3$ is 1,4-phenylene in which hydrogen in the ring may be replaced by fluorine, $Z_2$ is a single bond, and $Y_1$ and $Y_2$ are fluorine.

11. A liquid crystalline compound described in claim 1, wherein in formula (1), l=m=1, n=0, and $Y_1$ and $Y_2$ are fluorine.

12. A liquid crystalline compound described in claim 1, wherein in formula (1), l=2, m=n=0, and $Y_1$ and $Y_2$ are fluorine.

13. A liquid crystal composition which comprises at least two components, at least one of which is a liquid crystalline compound described in any one of claims 1 to 12.

14. A liquid crystal composition characterized in that it comprises, as a first component, at least one liquid crystalline compound described in any one of claims 1 to 12, and comprises, as a second component, at least one compound selected from the group of compounds consisting of formulae (2), (3) and (4),

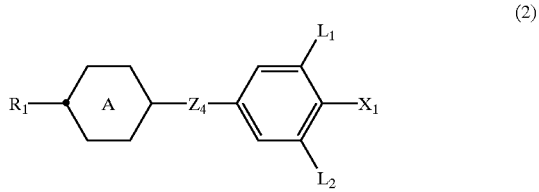

(2)

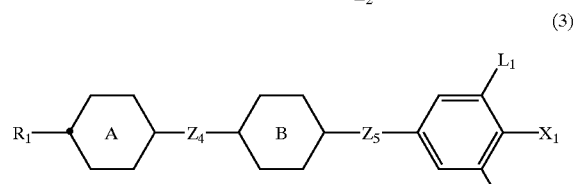

(3)

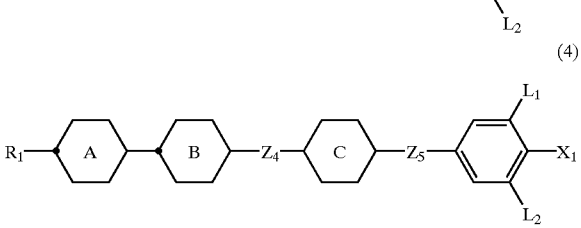

(4)

wherein $R_1$ represents alkyl having 1 to 10 carbon, any nonadjacent —$CH_2$— in the alkyl may be replaced by —O— or —CH═CH—, and any hydrogen in the alkyl may be replaced by fluorine; $X_1$ represents fluorine, chlorine, —$OCF_3$, —$OCF_2H$, —$CF_3$, —$CF_2H$, —$CFH_2$, —$OCF_2CF_2H$ or —$OCF_2CFHCF_3$; $L_1$ and $L_2$ each independently represents hydrogen or fluorine; $Z_4$ and $Z_5$ each independently represents —$(CH_2)_2$—, —$(CH_2)_4$—, —COO—, —$CF_2O$—, —$OCF_2$—, —CH═CH— or a single bond; ring A and ring B each independently represents trans-1,4-cyclohexylene, 1,3-dioxane-2,5-diyl or 1,4-phenylene in which hydrogen may be replaced by fluorine, ring C represents trans-1,4-cyclohexylene or 1,4-phenylene in which hydrogen may be replaced by fluorine.

15. A liquid crystal composition characterized in that it comprises, as a first component, at least one liquid crystalline compound described in any one of claims 1 to 12, and as a second component, at least one compound selected from the group of compounds consisting of formulae (5) and (6), (5)

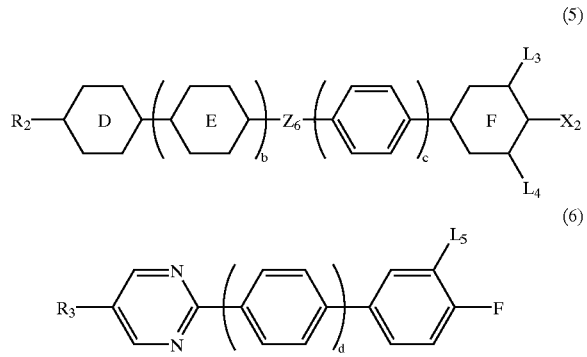

(6)

wherein $R_2$ and $R_3$ each independently represents alkyl having 1 to 10 carbon, any nonadjacent —$CH_2$— in the alkyl may be replaced by —O— or —CH=CH—, and any hydrogen in the alkyl may be replaced by fluorine; $X_2$ represents —CN or —C≡C—CN; ring D represents trans-1,4-cyclohexylene, 1,4-phenylene, 1,3-dioxane-2,5-diyl, or pyrimidine-2,5-diyl; ring E represents trans-1,4-cyclohexylene, 1,4-phenylene in which hydrogen may be replaced by fluorine, or pyrimidine-2,5-diyl; ring F represents trans-1,4-cyclohexylene or 1,4-phenylene; $Z_6$ represents —$(CH_2)_2$—, —COO—, —$CF_2O$—, —$OCF_2$— or a single bond; $L_3$, $L_4$ and $L_5$ each independently represent hydrogen or fluorine; b, c and d each independently 0 or 1.

16. A liquid crystal composition characterized in that it comprises, as a first component, at least one liquid crystalline compound described in any one of claims 1 to 12, and as a second component, at least one compound selected from the group of compounds consisting of formulae (7), (8) and (9), (7)

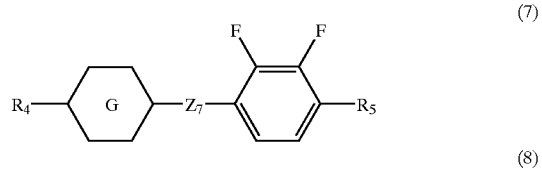

(8)

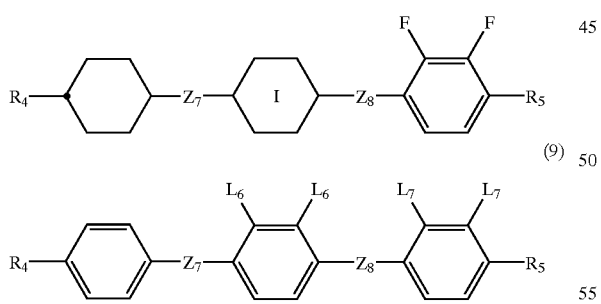

(9)

wherein $R_4$ and $R_5$ each independently represents alkyl having 1 to 10 carbon, any nonadjacent —$CH_2$— in the alkyl may be replaced by —O— or —CH=CH—, and any hydrogen in the alkyl may be replaced by fluorine; ring G and ring I each independently represents trans-1,4-cyclohexylene or 1,4-phenylene; $L_6$ and $L_7$ each independently represents hydrogen or fluorine but both of them are not hydrogen at the same time; $Z_7$ and $Z_8$ each independently represents —$(CH_2)_2$—, —COO— or a single bond.

17. A liquid crystal composition characterized in that it comprises, as a first component, at least one liquid crystalline compound described in any one of claims 1 to 12, and as a second component, at least one compound selected from the group of compounds consisting of formulae (2), (3) and (4), and as a third component, at least one compound selected from the group of compounds consisting of formulae (10), (11) and (12), (2)

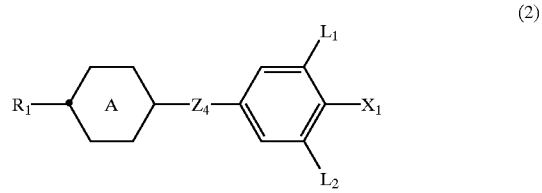

(3)

(4)

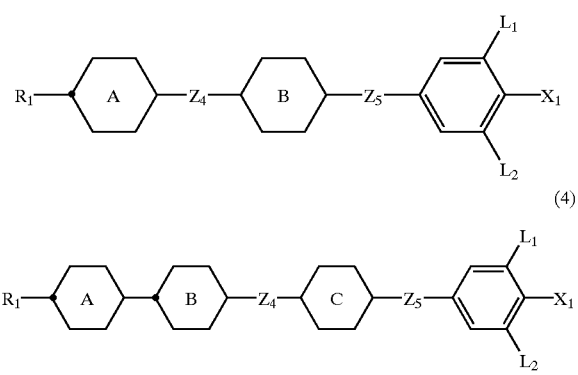

wherein $R_1$ represents alkyl having 1 to 10 carbon, any nonadjacent —$CH_2$— in the alkyl may be replaced by —O— or —CH=CH—, and any hydrogen in the alkyl may be replaced by fluorine; $X_1$ represents fluorine, chlorine, —$OCF_3$, —$OCF_2H$, —$CF_3$, —$CF_2H$, —$CFH_2$, —$OCF_2CF_2H$ or —$OCF_2CFHCF_3$; $L_1$ and $L_2$ each independently represents hydrogen or fluorine; $Z_4$ and $Z_5$ each independently represents —$(CH_2)_2$—, —$(CH_2)_4$—, —COO—, —$CF_2O$—, —$OCF_2$—, —CH=CH— or a single bond; ring A and ring B each independently represents trans-1,4-cyclohexylene, 1,3-dioxane-2,5-diyl or 1,4-phenylene in which hydrogen may be replaced by fluorine, ring C represents trans-1,4-cyclohexylene or 1,4-phenylene in which hydrogen may be replaced by fluorine, (10)

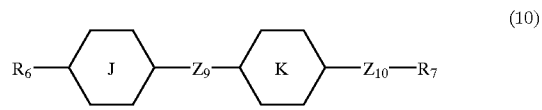

(11)

(12)

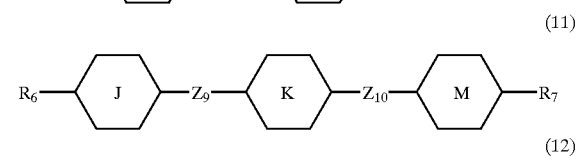

wherein $R_6$ and $R_7$ each independently represents alkyl having 1 to 10 carbon, any nonadjacent —$CH_2$— in the alkyl may be replaced by —O— or —CH=CH—, and any hydrogen in the alkyl may be replaced by fluorine; ring J, ring K and ring M each independently represents trans-1,4-cyclohexylene, pyrimidine-2,5-diyl, or 1,4-phenylene in which hydrogen may be replaced by fluorine; $Z_9$ and $Z_{10}$ each independently represents —C≡C—, —COO—, —(CH$_2$)$_2$—, —CH=CH— or a single bond.

18. A liquid crystal composition characterized in that it comprises, as a first component, at least one liquid crystalline compound described in any one of claims 1 to 12, and as a second component, at least one compound selected from the group of compounds consisting of formulae (7), (8) and (9), and as a third component, at least one compound selected from the group of compounds consisting of formulae (10), (11) and (12),

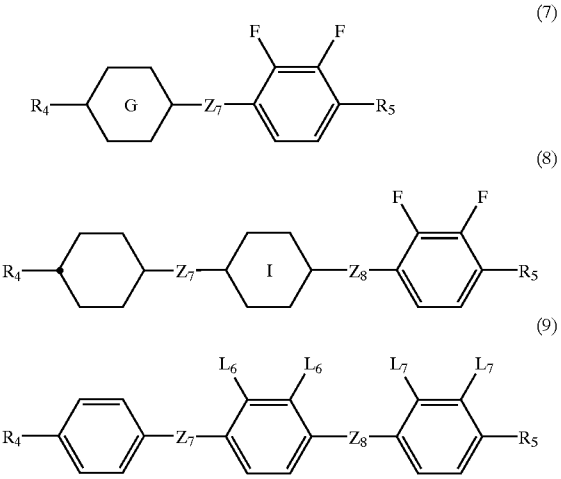

wherein R$_4$ and R$_5$ each independently represents alkyl having 1 to 10 carbon, any nonadjacent —CH$_2$— in the alkyl may be replaced by —O— or —CH=CH—, and any hydrogen in the alkyl may be replaced by fluorine; ring G and ring I each independently represents trans-1,4-cyclohexylene or 1,4-phenylene; L$_6$ and L$_7$ each independently represents hydrogen or fluorine but both of them are not hydrogen at the same time; Z$_7$ and Z$_8$ each independently represents —(CH$_2$)$_2$—, —COO— or a single bond,

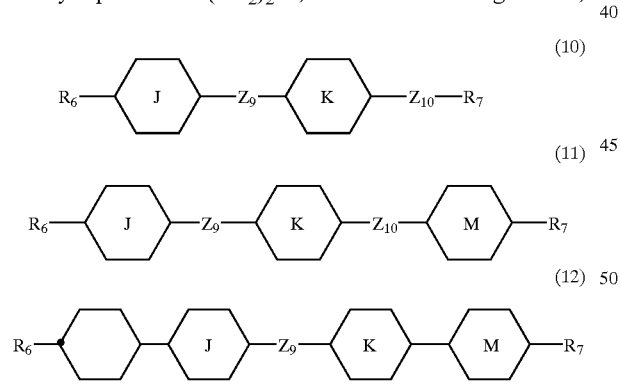

wherein R$_6$ and R$_7$ each independently represents alkyl having 1 to 10 carbon, any nonadjacent —CH$_2$— in the alkyl may be replaced by —O— or —CH=CH—, and any hydrogen in the alkyl may be replaced by fluorine; ring J, ring K and ring M each independently represents trans-1,4-cyclohexylene, pyrimidine-2,5-diyl, or 1,4-phenylene in which hydrogen may be replaced by fluorine; Z$_9$ and Z$_{10}$ each independently represents —C≡C—, —COO—, —(CH$_2$)$_2$—, —CH=CH— or a single bond.

19. A liquid crystal composition characterized in that it comprises, as a first component, at least one compound described in any one of claims 1 to 12, and as a second component, at least one compound selected from the group of compounds consisting of formulae (2), (3) and (4), and as a third component, at least one compound selected from the group of compounds consisting of formulae (7), (8) and (9)

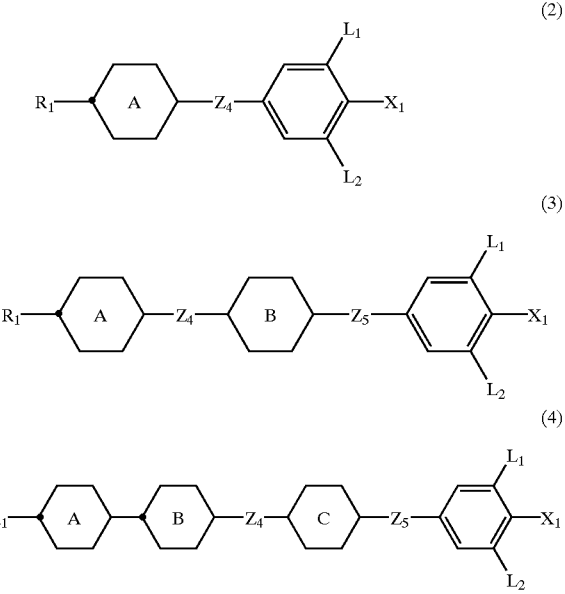

wherein R$_1$ represents alkyl having 1 to 10 carbon, any nonadjacent —CH$_2$— in the alkyl may be replaced by —O— or —CH=CH—, and any hydrogen in the alkyl may be replaced by fluorine; X$_1$ represents fluorine, chlorine, —OCF$_3$, —OCF$_2$H, —CF$_3$, —CF$_2$H, —CFH$_2$, —OCF$_2$CF$_2$H or —OCF$_2$CFHCF$_3$; L$_1$ and L$_2$ each independently represents hydrogen or fluorine; Z$_4$ and Z$_5$ each independently represents —(CH$_2$)$_2$—, —(CH$_2$)$_4$—, —COO—, —CF$_2$O—, —OCF$_2$—, —CH=CH— or a single bond; ring A and ring B each independently represents trans-1,4-cyclohexylene, 1,3-dioxane-2,5-diyl or 1,4-phenylene in which hydrogen may be replaced by fluorine, ring C represents trans-1,4-cyclohexylene or 1,4-phenylene in which hydrogen may be replaced by fluorine,

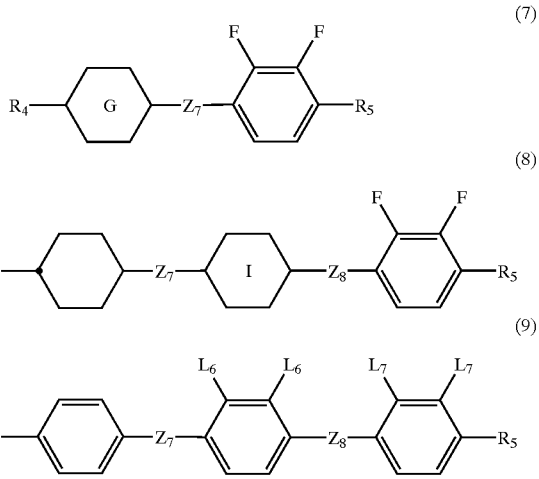

wherein R$_4$ and R$_5$ each independently represents alkyl having 1 to 10 carbon, any nonadjacent —CH$_2$— in the alkyl may be replaced by —O— or —CH=CH—, and any hydrogen in the alkyl may be replaced by fluorine; ring G and ring I each independently represents trans-1,4-cyclohexylene or 1,4-phenylene; $L_6$ and $L_7$ each independently represents hydrogen or fluorine but both of them are not hydrogen at the same time; $Z_7$ and $Z_8$ each independently represents —$(CH_2)_2$—, —COO— or a single bond.

20. A liquid crystal composition characterized in that it comprises, as a first component, at least one compound described in any one of claims 1 to 12, and as a second component, at least one compound selected from the group of compounds consisting of formulae (2), (3) and (4), and as a third component, at least one compound selected from the group of compounds consisting of formulae (5) and (6), and as a fourth component, at least one compound selected from the group of compounds consisting of formulae (7), (8) and (9)

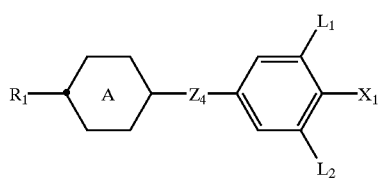

(2)

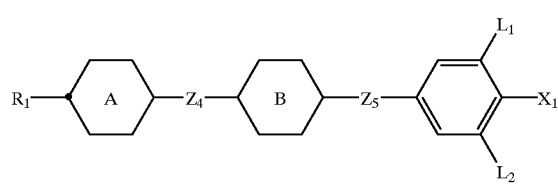

(3)

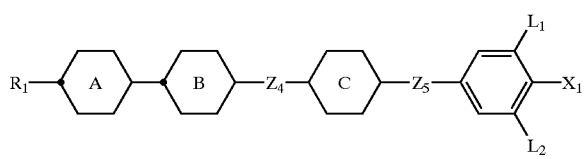

(4)

wherein $R_1$ represents alkyl having 1 to 10 carbon, any nonadjacent —$CH_2$— in the alkyl may be replaced by —O— or —CH=CH—, and any hydrogen in the alkyl may be replaced by fluorine; $X_1$ represents fluorine, chlorine, —$OCF_3$, —$OCF_2H$, —$CF_3$, —$CF_2H$, —$CFH_2$, —$OCF_2CF_2H$ or —$OCF_2CFHCF_3$; $L_1$ and $L_2$ each independently represents hydrogen or fluorine; $Z_4$ and $Z_5$ each independently represents —$(CH_2)_2$—, —$(CH_2)_4$—, —COO—, —$CF_2O$—, —$OCF_2$—, —CH=CH— or a single bond; ring A and ring B each independently represents trans-1,4-cyclohexylene, 1,3-dioxane-2,5-diyl or 1,4-phenylene in which hydrogen may be replaced by fluorine, ring C represents trans-1,4-cyclohexylene or 1,4-phenylene in which hydrogen may be replaced by fluorine,

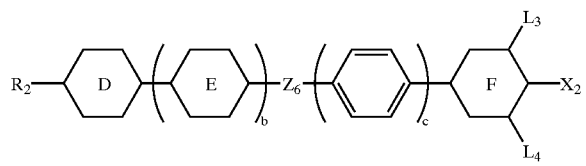

(5)

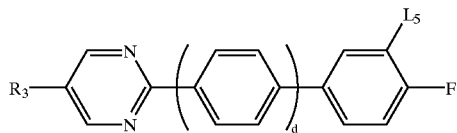

(6)

wherein $R_2$ and $R_3$ each independently represents alkyl having 1 to 10 carbon, any nonadjacent —$CH_2$— in the alkyl may be replaced by —O— or —CH=CH—, and any hydrogen in the alkyl may be replaced by fluorine; $X_2$ represents —CN or —C≡C—CN; ring D represents trans-1,4-cyclohexylene, 1,4-phenylene, 1,3-dioxane-2,5-diyl, or pyrimidine-2,5-diyl; ring E represents trans-1,4-cyclohexylene, 1,4-phenylene in which hydrogen may be replaced by fluorine, or pyrimidine-2,5-diyl; ring F represents trans-1,4-cyclohexylene or 1,4-phenylene; $Z_6$ represents —$(CH2)_2$—, —COO—, —$CF_2O$—, —$OCF_2$— or a single bond; $L_3$, $L_4$ and $L_5$ each independently represents hydrogen or fluorine; b, c and d each independently 0 or 1,

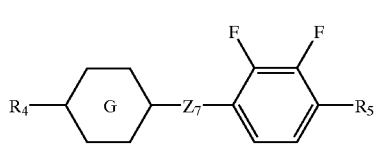

(7)

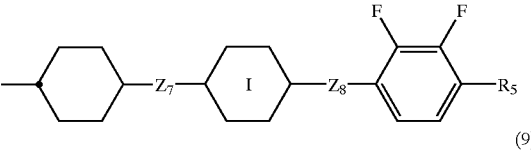

(8)

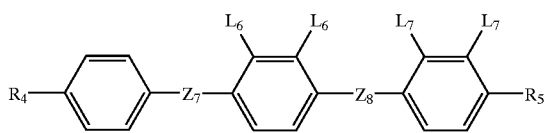

(9)

wherein $R_4$ and $R_5$ each independently represents alkyl having 1 to 10 carbon, any nonadjacent —$CH_2$— in the alkyl may be replaced by —O— or —CH=CH—, and any hydrogen in the alkyl may be replaced by fluorine; ring G and ring I each independently represents trans-1,4-cyclohexylene or 1,4-phenylene; $L_6$ and $L_7$ each independently represents hydrogen or fluorine but both of them are not hydrogen at the same time; $Z_7$ and $Z_8$ each independently represents —$(CH_2)_2$—, —COO— or a single bond.

21. A liquid crystal composition described in claim 13, which further comprises one or more optically active compounds.

22. A liquid crystal display device which comprises the liquid crystal composition described in claim 13.

* * * * *